(12) United States Patent
Salinas

(10) Patent No.: US 8,375,019 B2
(45) Date of Patent: **\*Feb. 12, 2013**

(54) METHODS AND SYSTEMS OF CONTENT MOBILIZATION, MOBILE SEARCH, AND VIDEO EDITING THROUGH A WEB INTERFACE

(76) Inventor: Robert Salinas, Palm Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/288,039

(22) Filed: Nov. 3, 2011

(65) Prior Publication Data

US 2012/0204107 A1 Aug. 9, 2012

Related U.S. Application Data

(63) Continuation of application No. 12/207,632, filed on Sep. 10, 2008, now Pat. No. 8,108,342.

(60) Provisional application No. 60/970,995, filed on Sep. 10, 2007.

(51) Int. Cl.
*G06F 7/00* (2006.01)
(52) U.S. Cl. ...................................................... 707/706
(58) Field of Classification Search .................. 707/621, 707/706, 736, 809
See application file for complete search history.

*Primary Examiner* — Truong Vo
(74) *Attorney, Agent, or Firm* — Kenyon D. Potter

(57) ABSTRACT

This invention relates to computer implemented methods and systems for content mobilization, and in particular, methods and systems for mobilization of video, music, photos and other media, including processes for application in mobile search, mobile messaging, mobile editing of media, and combinations thereof. Upon a user of a mobile device selecting a web content item corresponding to a media file, the media file is dynamically transcoded based on the mobile device to receive the media and sent to the mobile device.

10 Claims, 57 Drawing Sheets

2050 Media center (continued)

800 [ 801... 8NN Combined image files (e.g. Slideshows without audio track) ]

Examples:

801: 401c 401c 401c ... 401c

802: 401a 401a 401a ... 401a

803: 401a 401a 401a 401a 402a 402a 402a ... 402a 403a 403a 403a ... 403a 4NNa 4NNa 4NNa ... 4NNa

804: 401c 401c 401c 401c 402c 402c 402c ... 402c 403c 403c 403c ... 403c 4NNc 4NNc 4NNc ... 4NNc

805: 401a 402a 403a 4NNa ... 401b 402b 403b ... 4NNa 401c 402c 403c ... 4NNc

800 [ 801... 8NN Combined video files (e.g. Videos with or without audio track) ]

Examples:

801: 501.1c 501.3c ... 501.NNNc

802: 501.1a 501.3a ... 501.NNNa

803: 501.1a 501.4a 501.7a ... 501.NNNa

804: 501.1c 501.4c 501.7c ... 501.NNNc

805: 501.1c 501.4c 501.NNNc ... 501.1a 501.4a 501.NNNa ... 502.1b 502.4b ... 502.NNNb

FIG. 5B

Send Video Preview v1.0

STEP ONE: Choose recipients for your message

Groups - Manage
(Check box to send to entire group)

☐ Friends (7)  ☐ Family (3)  ☐ Staff (4)
☐ Customers (14)  ☐ Neighbors (2)  ☐ Colleagues (3)

Contacts - Manage

☐ Robert Salinas  ☐ Kenyon Potter  ☐ Amado Salinas
☐ Iain Glendinning  ☐ Sam Johnson  ☐ Irma Salinas
☐ John Smith  ☐ Bob Jones  ☐ Robert Potter
☐ Jane Doe  ☐  ☐

Mobile Number: (   )    -

Network: [ Unknown (US) ▼ ]

Username (if Sidekick:) [          ]

STEP TWO: Enter your subject and your message

Subject: [          ]

Message: [          ]

Shorten Video to: [ 5 ▼ ] seconds

SELECT VIDEO

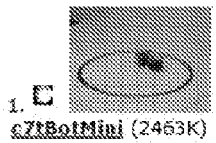
1. ☐
c7tBotMini (2463K)

2. ☐
FunniestSt (710K)

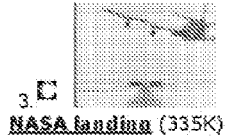
3. ☐
NASA landing (335K)

STEP THREE: Press the button below to send

[ Send To Mobile Phone ]

FIG. 10C

Edit Video Start / Stop Points, Frame Rate and Bit Rate v1.0

STEP ONE: Choose recipients for your message

Groups - Manage
(Check box to send to entire group)
- ☐ Friends (7)   ☐ Family (3)   ☐ Staff (4)
- ☐ Customers (14)   ☐ Neighbors (2)   ☐ Colleagues (3)

Contacts - Manage
- ☐ Robert Salinas   ☐ Kenyon Potter   ☐ Amado Salinas
- ☐ Iain Glendinning   ☐ Sam Johnson   ☐ Irma Salinas
- ☐ John Smith   ☐ Bob Jones   ☐ Robert Potter Mobile Number: ( ___ ) ___ - ____
Network: Unknown (US)
Username (if Sidekick:)

STEP TWO: Enter your subject and your message

Subject:
Message:

Start Time: 0 Minutes, 1 Seconds
Duration: 0 Minutes, 15 Seconds
Bit Rate: 12k (Low Quality) - Small Filesize
Frame Rate: 5 fps

SELECT VIDEO

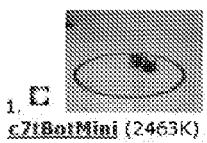
1. ☐ c7tBotMini (2463K)

2. ☐ FunniestSt (710K)

3. ☐ NASA landing (335K)

STEP THREE: Press the button below to send:

[Send To Mobile Phone]

FIG. 10D

MOBILZR v3.1 (Content Mobilization Engine)

METHODS AND SYSTEMS OF CONTENT MOBILIZATION, MOBILE SEARCH, AND VIDEO EDITING THROUGH A WEB INTERFACE

PRIORITY CLAIM

This application is a continuation of U.S. patent application Ser. No. 12/207,632, filed on Sep. 10, 2008 now U.S. Pat. No. 8,108,342, which claims the benefit U.S. Provisional Application No. 60/970,995, filed on Sep. 10, 2007. Non-provisional patent application Ser. No. 12/207,632 and Provisional Patent application No. 60/970,995 are hereby incorporated by reference in their entirety.

COPYRIGHT RIGHTS

A portion of the disclosure of this patent document contains material which is subject to (copyright or mask work) protection. The (copyright or mask work) owner has no objection to the facsimile reproduction by any-one of the patent document or the patent disclosure, as it appears in the Patent and Trademark Office patent file or records, but otherwise reserves all (copyright or mask work) rights whatsoever.

FIELD OF THE INVENTION

This invention relates to computer implemented methods and systems for content mobilization, and in particular, methods and systems for mobilization of video, music, photos and other media, including processes for mobile search, mobile messaging, building a mobile content library, and combinations thereof.

This invention also relates to computer implemented methods and systems for editing video and other media, and in particular, methods and systems for clipping, transcoding, splicing, and other processes of editing video and other media.

DEFINITIONS

The following abbreviations and defined terms apply to methods or systems of the inventions described in this document.ABbreviations include but are not limited to acronyms and short hand expressions:

| | |
|---|---|
| AMR | adaptive multirate (audio) |
| CCTV | closed circuit TV |
| DLP | digital light processing |
| DPI | dot per inch |
| DSL | digital subscriber line |
| DTV | digital television |
| FPD | flat panel display |
| FPS | frames per second |
| FTP | file transfer protocol |
| GUI | graphical user interface |
| HDTV | high definition television |
| HH | hour(s) |
| HTML | hypertext markup language |
| HTTP | hypertext transfer protocol |
| IM | instant messag(ing) |
| IP | internet protocol |
| IR | infrared |
| ISP | internet service provider |
| LAN | Local area network |
| LCD | Liquid crystal display |
| LED | Liquid emitting diode (display) |
| MIDI | musical instrument digital interface |
| MIME | Multipurpose Internet Mail Extensions |
| MMS | multimedia messaging service |
| OEM | original equipment manufacturer |
| PAN | personal area network |
| PDA | personal digital assistant |
| PIN | personal identification number |
| PPI | pixels per inch |
| PPT | Powerpoint file |
| PPS | Powerpoint Slideshow |
| QCIF | Quarter Common Intermediate Format |
| QVGA | Quarter Video Graphics Array |
| QXGA | Quantum eXtended Graphics Array |
| RDF | resource description framework. |
| RFI | request for information |
| RSS | RDF Site Summary or Rich Site Summary (an XML format for syndicating web content) |
| RTSP | real time streaming protocol |
| SD | secure digital (memory) |
| SVGA | Super Visual Graphics Array |
| SXGA | Super Extended Graphics Array |
| SaaS | Software as a Service |
| SMS | short messaging service |
| SS | second (time) |
| SSR | Small screen rendering |
| TEL | telephone |
| TFT | thin film transistor |
| TV | television |
| URL/I | uniform resource locator/identifier |
| ° | degree (geographical) |
| ' | minute (geographical) |
| " | second (geographical) |
| VGA | Video Graphics Array |
| W3C | World Wide Web Consortium |
| WAP | wireless application protocol |
| WAV | wave file |
| WIFI | wireless fidelity |
| WMF | Windows media format |
| WML | wireless markup language |
| XGA | extended graphics array |
| XML | extensible markup language |
| XHTML | XML-compliant version of HTML |

Definitions and defined terms include but are not limited to the following:

The term "displayed object" means any object displayed on a device whatsoever including but not limited to one or more items of text, markup language (including HTML, XML, WML, and so on); one or more documents (including RTF, DOC, PDF, and so on); one or more images (including pictures, photos, stills, charts, and so on); and other objects (including text boxes, tables, frames, maps, banners, RSS, and so on); or any combination of objects. The term "displayed object" also means any object that represents any web resource whatsoever and in whatever form including but not limited to audio objects, e.g. music; motion picture or video objects without sound track, e.g. cartoons, animations, silent films, and so on; motion picture or video objects with sound track, e.g. movies, TV shows, music videos, and so on; and/or multimedia objects, e.g. slides with audio, film or video with sound track, presentation with voice over, and so on.

The term "media" means any digital media whatsoever including but not limited to one or more lists, stories, headlines, scores, and so on; one or more songs, tunes, music, and so on; one or more videos, movies, segments, clips, and so on; one or more photos, images, pictures, and so on; one or more items of text, markup language, and so on; or any combination of media. The term "media" also means other forms of content including interactive content such as games, simulations, contests, puzzles, polls, quizzes, surveys, stories where users elect the ending, and so on. For example, digital media text may include text in one or more formats: TXT, RTF, DOC, HTML, XML, and so on. In another example, digital music media may include music in one or more formats:

MIDI, MPEG e.g. MP3, WAV, WMF, AMR, and so on. In still another example, digital photo media may include photos, images, pictures and so on, in one or more of the formats: JPEG, GIF, BMP, TIFF, PPT, PPS, PNG and so on. In yet still another example, digital video media may include video in one or more formats: animated GIF, MOV, WMF, EPS, SWF, FLA, 3GP, and so on.

The term "media center" means any storage of digital media whatsoever including but not limited to an online or offline repository of digital media. For example, an online repository of digital media may include an online service accessible through the internet, wireless networks, or any network whatsoever. For example, an offline repository may include any electronic device whatsoever including a mobile phone or other mobile device. The term "media center" also means any online storage of any combination or grouping of media files including but not limited to media files representing digital content owned by user and uploaded to the media center; digital content acquired online by user whether by purchase, license, promotion, and so on; digital content comprising advertising, marketing, or promotional messages, and so on.

The term "MIME types" is an Internet standard for describes message content types. MIME messages can contain text, images, audio, video, and other application-specific data. A registry of MIME types is maintained by the Internet Assigned Numbers Authority (IANA). Standards relating to MIME types are developed by the Internet Engineering Task Force (IETF) in the following Request for Comment (RFC) documents:

| | |
|---|---|
| RFC-822 | Standard for ARPA Internet text messages |
| RFC-2045 | MIME Part 1: Format of Internet Message Bodies |
| RFC-2046 | MIME Part 2: Media Types |
| RFC-2047 | MIME Part 3: Header Extensions for Non-ASCII Text |
| RFC-2048/4289 | MIME Part 4: Registration Procedures |
| RFC-2049 | MIME Part 5: Conformance Criteria and Examples |
| RFC-3459 | Critical Content Multi-purpose Internet Mail Extensions (MIME) |
| RFC-3829 | MIME Type Registrations for 3rd Generation Partnership Project (3GPP) |
| Multimedia files | |
| RFC-4393 | MIME Type Registrations for 3GPP2 Multimedia Files |
| RFC-4337 | MIME Type Registration for MPEG-4 |

The term "group" or "grouping" means any list, collection, mix, assembly, compilation, or collection of any digital media whatsoever. A group or grouping of digital media may comprise one item, several items or many items. In another context, the term "group" or "grouping" also means a group of recipients of one or messages such as a SMS message, a MMS message, and so on.

The term "playlist" means any grouping of media including any form of digital media whatsoever including but not limited to one or more songs or music, one or more videos, one or more photos, pictures or images, one or more items of text, or any combination of media. The term "playlist" also means lists of items (including text or multimedia) comprising scores, highlights, headlines, stock valuations, business metrics, search results, nearby stores or locations, operating hours, real estate comparables, price comparisons, etc. The term "playlist" also means forms of interactive media that may require user response(s) such as quizzes, polls, contests, puzzles, games, and so on. These playlists may take the form of TEXT, multimedia (TEXT, MUSIC and/or VIDEO), or TEXT or THUMBNAILS with LINKS to multimedia, and so on. For example, a playlist may include music in any formats such as MIDI, MPEG e.g. MP3, WAV, WMA, AMR, and so on. For example, a playlist may include pictures, photos, slides, stills, and so on in any format such as JPEG, GIF, BMP, TIFF, PPT, PPS, PNG and so on. For example, a playlist may include videos, clips, trailers, and so on, in any format such as MOV, WMF, EPS, SWF, PNG, G3P, and so on. However, playlist may include any type of media whatsoever including but not limited to a list of items with links to other media. Examples include a list of items comprising text with links to additional text or to photos, music, or videos; the list of items may include a series of images with links to additional text or to photos, music or videos; the list of items may include a series of images with accompanying text with each images and/or text having links to photos, music or videos. In the context of pictures, photos, slides, stills, and so on, the terms "slideshow", "photo album", or "face book" may be interchanged with "playlist". In the context of video, the term "movie", "video", "videoshow", "video recording", or "podcast" may be interchanged with "playlist".

The term "screen" means any visual display including but not limited to a CRT, LED, LCD, FPD, TV, HDTV, projection screen, etc., and is used interchangeably with the term "visual display". A screen is capable of displaying M pixels by N lines whereby a screen with 800 pixels by 600 lines is capable of displaying 800 distinct dots on each of 600 lines, or about 480,000 pixels The term "screen resolution" means the clarity or sharpness of a display and is signified by the number of dots (pixels) on the entire screen and denoted by M pixels×N lines and is contrasted with unitized "resolution" which is signified by DPI or PPI.

The term "full size screen" means any visual display capable of a screen resolution of at least 800 pixels by 600 lines (e.g. SVGA), and typically has 1024 by 768 pixels (e.g. XGA), or 1248 by 1024 pixels (e.g. SXGA), 2048 by 1536 pixels (e.g. QXGA), and so on. The term "full size screen" also means any visual display regardless of type of hardware including but not limited a CRT, LED, LCD, FPD, TV, HDTV, projection screen, and so on.

The term "miniature size screen" is any screen that has fewer pixels than a full size screen including but not limited to 640×480 pixels (e.g. VGA), 320×240 pixels (e.g. QVGA), or 352×288 pixels (e.g. CIF), or 176×144 pixels (e.g. QCIF), and so on. The term "miniature screen" also means any visual display including but not limited a LED, LCD, FPD, TV, HDTV, and so on.

The term "mobilize" means conversion of one or more webpages that are capable of being displayed on a computer with a full size screen, e.g. desktop, laptop or notebook, to a one or more webpages that can be displayed on at least one mobile device with a miniature screen, e.g. PDA, mobile phone, smart phone, and so on. The term "mobilize" also means the conversion of one or more webpages that are capable of being displayed on a computer with a full size screen to one or more webpages that can be displayed on both a computer with a full size screen and at least one mobile device with a miniature screen, or that can be displayed on a computer with a full size screen and multiple mobile devices with miniature screens. The term "mobilize" also means creation of one or more webpages that are capable of being displayed on at least one mobile device with a miniature screen, e.g. PDA, mobile phone, smart phone, and so on, with or without benefit of one or more pre-existing webpages as a starting point. As used herein, the term "conversion" includes but is not limited to selecting, arranging, and/or adapting content from one or more existing webpages for display on mobile devices, substituting existing representations of such content with images, pictures, iconographics and/or symbols, and supplementing existing content with additional content such as text, pictures, and so on. As used herein, the term "creation" includes but is not limited to selecting, arranging, and/or adapting content from any source (digital or non-digital) for display on mobile devices.

The term "area code" means digits 1-3 of a 10-digit telephone number representing a unique code that corresponds to a particular geographic area, e.g. 415 is the area code for the city of San Francisco, Calif. In a full telephone number, the digits of "area code" typically precede the digits of the "exchange code". The term "area code" may also be known as "city code" and these terms may be used interchangeably.

The term "day" is any day or date whatsoever and can mean any period of time having a 24-hour duration including but not limited to a calendar day, a working day, a day of week, a day of month, a day of year, any holiday, e.g. Valentine's day, New Year's Eve, New Year's Day, Christmas Eve, Christmas Day, Independence Day. and so on. The "term" day may also mean "date" or "calendar date" and these terms may be used interchangeably. See also "time of day" defined below.

The term "country code" means the number, e.g. typically 2 digits, that precedes the telephone number and is a unique code that corresponds to a particular country.

The term "delivery" means delivery in any form whatsoever including but not limited to delivery by voice messages, text messages, IM, email with or without attached documents, multi-media including streaming, tickers, RSS, WAP, internet, messaging service, narrowcast, and so on, and may utilize any communication protocol such as IP, mobile IP, FTP, HTTP, HTTPS, and so on.

The term "device" means any electronic device including but not limited to mobile electronic devices or immobile electronic devices that are capable of either one-way or two-way communications including but not limited to cellular phones, handheld radios, pagers, laptop computers, notebook computers, ultra-compact computers, desktop computers, set-top boxes, cable boxes, satellite phones, video phones, PDAs, MP3 players, devices on-board vehicles including but not limited to planes, ships, cars or trucks, and so on, and RFID devices attached to other tangible items such as products, packaging, shelves, displays, signs, exhibits, and so on.

The term "exchange code" means digits 4-6 of a 10-digit telephone number or digits 1-3 of a 7-digit telephone number. In the latter context, the term "exchange code" may also be known as a "prefix", e.g. NXX, and these terms may be used interchangeably. In a full telephone number, the digits of "exchange code" typically follow the digits of the "area code".

The term "identifier" means any information in any form whatsoever that uniquely identifies a device including but not limited to a telephone number, a device identification number, a device's name, a user's name, a street address, a pre-assigned identification number, a user-defined passcode, a pre-assigned or user-defined username, birthplace, and so on.

The term "internet service provider" means any person or entity whatsoever that provides an access point to the internet including but not limited to telephone companies (including cellular and broadband), telecommunications companies, cable companies, media companies and any other commercial organizations as well as universities and other institutions, not-for-profits, community associations, government entities, and so on.

The term "message" means information in any form whatsoever including but not limited to a text message, picture, photo, cartoon, audio, video, animation, presentation, and so on, and any combination of these forms include multi-media message, audio-video, voice over animation, voice over presentation, pictures or photos with captions, cartoons with captions or call-outs, and so on. For example, a message may be a SMS message, a MMS message, an email, an IM, a voice message, or any other type of electronic message. A message can be an advertisement or promotional information pushed by an advertiser to a user's mobile device, a message requested by the user of the device, or any message initiated by any person, organization, or entity. A message may be initiated in response to a specific request or in response to an automated protocol.

The term "narrowcast" means transmission of a RF signal, or the act of transmitting a RF signal, from a source resulting in receipt of the RF signal in relatively small geographical area. A narrowcast can be from any RF source whatsoever including but not limited to a single cell tower, a transmitter, a base station, a repeater station, a two-way radio, a bluetooth source, a RFID source, a NFC source, any electronic device capable of RF transmission, and so on. The geographical area of a narrowcast typically has a maximum range of up to 10 kilometers but may have a lesser or greater range.

The term "near field communication" means transmission of a RF signal, or the act of transmitting a RF signal, from a source resulting in receipt of the RF signal in a small or very small spatial area. A near field communication can be from any source such as an electronic device, a POS device, a RFID source, a NFC source, a microchip, and so on, or any source attached to or embedded in another electronic device. The spatial area of a near field communication typically has a maximum range up to 1 meter but may have a lesser or greater range.

The term "network" means any communications network, any subnetwork (aka "subnet") or any combination of these, including but not limited to ethernet, LAN, WAN, PAN, internet, intranet, extranet, wired network, wireless network, telephone network, cellular network, cable network, satellite network, a mesh of network connections or access points, and so on, including but limited to transmission via conventional electrical conductors, twisted pair, Cat-V, Cat-10, or Cat-100 cables, coaxial cables, fiberoptic cables, DSL, broadband, light transmission, laser transmission, and RF transmission at any frequency, and so on.

The term "purchase" means any type of acquisition whatsoever including but not limited to outright purchase, subscriptions, payment plans, and so on. The term "purchase" also means both paid acquisitions, e.g. purchases, paid subscriptions, and so on, and non-paid acquisitions (with or without registration) such as downloads, trial versions, shareware, freeware, music or video clips, movie trailers, promotional media, and so on.

The term "telephone number" means a number that corresponds to a particular electronic device including but not limited to a mobile phone, PDA, an electronic device connected to a landline, and so on. A telephone number typically corresponds to an electronic device that is capable of voice communications but also correspond to an electronic device that is capable of voice, facsimile, text, and/or video communications.

The term "time" means the duration of time as measured in seconds from an established point in time to the current time of day as measured in years, days, hours, minutes, seconds, or any combination of these, where a year comprises about 365.25 days, a day comprises 24 hours, an hour comprises 60 minutes, and a minute comprises 60 seconds. By convention, time is often measured as the number of seconds from beginning of Jan. 6, 1980. The term "time" can also mean anything that represents time or has temporal significance, e.g. time of day, time of month, time of year, summer time, and holiday's including St. Valentine's day, New Year's eve, Christmas, the time between thanksgiving and Christmas, etc. See also the term "time of day" defined below.

The term "time of day" means the time of day in any form whatsoever including time of day as measured in hours, or a combination of hours and minutes, e.g. HH:MM, or a combination of hours, minutes, and seconds, e.g. HH:MM:SS, from the beginning of the current day where a day comprises 24 hours, an hour comprises 60 minutes and a minute comprises 60 seconds. The term "time of day" may also be measured in a portion of a 24-hour period that occurs each day such as morning, afternoon, evening, night, breakfast, lunch, dinner, dawn, sunrise, dusk, sunset, and so on.

The term "wireless service provider" means any person or entity whatsoever that provides access to the internet and/or other network(s) including but not limited to telephone companies (including cellular and broadband), telecommunications companies, cable companies, media companies and any other commercial organizations as well as universities and other institutions, not-for-profits, community associations, government entities, and so on. Access may be WIFI (including any type of 802.11 network, e.g. 802.11b, 802.11a, 11g, dual-band, etc.), bluetooth (including any type of personal area network), broadband, or any other wireless protocol and may be connected through a wireless access point, a host device with wireless capability, or any other means of access such as a publicly accessible grid of devices (or mesh).

BACKGROUND OF THE PRESENT INVENTION

Prior methods of moving digital media and data from one computer to another computer required a physical connection, e.g. a communications cable or a portable storage medium or a network. For example, media and data could be transferred with a communications cable and specialized software called PC Link. For example, media and data could be transferred with a portable storage medium such as CF, SD, and so on. As an alternative, media and data could be transferred using a network and required communications devices, e.g. a network card, modem, and so on, and specialized communications software. With the advent of wireless networks, e.g. WIFI, Bluetooth, etc., digital media and data could be transferred without a physical connection. However, the sending computer and the receiving computers still require modems or their wireless equivalent.

Similarly, prior methods of moving digital media and data from a computer to a mobile device required a communications device on-board the mobile device. For example, some mobile devices, e.g. notebooks, have traditional modems and/or wireless equivalents such as Bluetooth to connect to the internet. For example, other mobile devices, e.g. mobile phones, have radio frequency (RF) transmitters and receivers to connect to wireless networks such as PCS, GSM, 3G, and so on.

Due to the potential demand for substantial network bandwidth, wireless providers are encouraging the return to use of physical connections for transference of media and data to mobile phones as an alternative to wireless networks. For example, media and data may also be transferred to mobile devices using physical connections, e.g. a communications cable (e.g. USB or Firewire) or a storage card (e.g. CF or SD), and specialized communications software. Prior methods teach users to depend on physical connections, and thus, forsake an essential part of cell phone mobility.

Initially, network capacity was a perceived problem for transmission of music and video media. The demand for network capacity was alleviated in part by the increasing bandwidth capacity of wireless networks, e.g. 3G. Yet, wireless providers still consider network capacity to be a problem for transmission of music and video media despite plan for increased network capacity, e.g. 5G, 10G, etc. One issue that affects bandwidth is the predominance of "streaming" media, e.g. real time radio and newcasts, via the internet. Streaming media requires bandwidth each time the media is played whereas downloaded media only requires bandwidth when it is initially downloaded.

Even if network bandwidth were not a problem, a mobile device still requires sufficient on-board memory to store media, e.g. a playlist. Unlike many newer mobile devices with removable storage cards, older mobile phones do not have substantial onboard memory. Thus, on-board memory remains an issue for transference of media, including music media.

Although most wireless carriers allow download or streaming videos to capable mobile phones on their networks, the mobile services of carriers are actually very limited. For example, carriers offer services such as messaging, email, and web browsing but not internet search. Although carriers offer keyword search, the search functionality is generally limited to their walled garden and none offers internet search such as internet videos, music, and other media. For example, carriers do not offer search of internet websites such as Flickr or YouTube.com but users have to utilize the browser and "go to url" to find internet search because that functionality does not exist within their walled gardens.

Although wireless carriers often distribute third party content and media, carriers do not typically create original content and restrict the distribution of user created content to specific communication channels. Further, carriers do not offer services for editing content regardless of whether content is original content, third party content, or user created content. For example, carriers do not offer services for editing documents (e.g. doc or ppt files) or media files (e.g. videos). Even the new mobile service for sharing live video offered by ATT Wireless does not allows editing of video. Hence, the extent of services offered by carriers is very limited.

Many online services offer users the ability to download music to their computers through the internet and then transfer to mobile devices, e.g. a mobile phone, using a physical connection. For example, such an online service is offered by Yahoo! Music of Santa Clara, Calif. Another online service offered by Digeo, Inc. of Kirkland, Wash. allows users the ability to download music directly to their mobile phone over the wireless provider network. However, the service allows only downloads of radio programs or downloads of newly purchased digital media. In addition, the Apple Inc. of Cupertino, Calif., allows downloads of music directly to its new iPhone using the iTunes service and videos directly from the youtube service. However, the iPhone restricts the user's ability to download music and videos from other websites. Other online services allow streaming of videos to various devices that have installed applications or embedded viewers for viewing streaming video. Such devices include desktops, notebooks and some mobile devices, e.g. smartphones. For example, YouTube and many other online services allow streaming of videos to such devices (but not all mobile phones). A few online services allow either download or streaming of videos to some mobile phones (but not all mobile phones) because these services require an application on the mobile phone. For example, cellfish.com and mywaves.com allow either downloads or streaming to mobiles phones (but not all mobile phones). In addition, several services such as mywaves.com allow users to 'search' for videos on the desktop and make them accessible to the user. However, these online services are not true search of the internet but are in reality querying a database having a limited number of 100's of videos. Further, none of the online services allows users to search for videos from their mobile phones except for blueapple.mobi delivers a video of only 5 fps and also in reality querying a database.

Owners of content sites have existing media libraries that they wish to mobilize. The prior art methods, such as that used by YouTube and others, requires owners of websites to convert the video and then put it into their mobile system for people to view. The video is not available to view until it is converted and added to their mobile system. Their mobile videos do not reflect their full content library. However, there may not be interest in every media file (especially user created content) uploaded by every user of a content site. Thus, mobilizing their whole content library is inefficient and resources are wasted in mobilizing every media file. Even if a relatively small content site could afford to mobilize every file in a batch process, new files are continuously being added, and thus, the mobile content would not be up to date.

Still other online services eliminate the need for installed applications and are known as "software as a service" (SaaS). For example, companies are offering enterprise applications as online services such as that offered by salesforce.com of San Francisco, Calif. In another example, companies are offering consumer applications for editing documents such as Virtual Office offered by office.com of Washington, D.C. Virtual Office enables editing of typical office documents by providing the online functionality of a word processor, spreadsheet, presentation editors, etc. but does not include a module for editing video and other media. Still other examples include Jumpcut, Grouper, and Motionbox for editing video via a web browser using a Flash player of the type made under the Macromedia tradename. However, none of these online services allows users to edit videos or other media without an installed application such as a Flash player embedded in the browser or otherwise installed on the device. One service Grouper gave up video editing on the desktop due to a lack of users which teaches away from a mass market consumer service. Further, no browser for mobile phones (other than smartphones) supports a Flash application which typically requires a Flash player. Moreover, even if one version of a browser or other mobile application such as Flash Lite did support some Flash applications through a web interface, the browser or mobile application may not support every Flash application such as those for editing video(s) or media without a full Flash player and/or periodically requiring an update to the browser or mobile application, and thus, leading to maintenance and support issues.

Heretofore, no online service enables users the ability to search the internet for any available videos (e.g. breaking news, live broadcasts, user created videos, archived videos, and so on) at one or more websites and deliver them (or clips of them) to any web-enabled mobile phone. Currently, mobile users of existing online services are offered only a limited selection of videos (from hundreds to thousands) which are transcoded and stored in advance for retrieval by a user's query. No existing online service enables mobile users to perform a keyword search of in real time for videos and other media accessible on the internet (up to millions of videos).

Heretofore, no online service enables users the ability to edit video and/or other media without installing an application. Currently, users have to download media from an online source to a local device, e.g. desktop or laptop, in order to edit the media using a program installed on their computers. Further, an application embedded in a browser such as a Flash player is still an application. Since prior methods necessitate installation of a program, it is difficult to use on all portable devices due to hardware constraints including available memory and operating system compatibility as well as carrier restrictions on applications. This is particularly difficult for mobile devices such as mobile phones. Even if a program can be installed on a portable device, prior methods necessitate download of the media file from an online source even if the post-edited media file will be uploaded to an online source, and thus, the prior methods are inefficient.

Thus, a long felt need is an online service that allows users to search for videos and other media through a web interface on any mobile phone as well as to retrieve and play any media item from the search results and/or to send the retrieved media item to any mobile phone.

Another long felt need is an online service to edit videos and other media through any web interface using any device including desktops, notebooks, and mobile phones without the need to install any application.

SUMMARY OF THE INVENTION

This invention relates to computer implemented methods and systems for content mobilization, and in particular, methods and systems for mobilization of video, music, photos and other media, including processes for mobile search, mobile messaging, building a mobile content library, and combinations thereof.

This invention also relates to computer implemented methods and systems for editing video and other media, and in particular, methods and systems for clipping, transcoding, splicing, and other processes of editing video and other media.

An object of the present invention is to enable a user to acquire internet-accessible media files in their entirely and/or create clips from such media files using a web interface on any web-enabled device including mobile phones.

An object of the present invention is to enable a user to send clips from internet-accessible media files to any mobile phone using a web interface on any web-enabled device including mobile phones.

Another object of the present invention is to enhance the usability of any web-enabled computer or device (including mobile phones) by enabling a user to edit media files via a web interface. For example, the user would prefer to be able to edit media files via a web interface without the need to download or install a special application on the device.

Another object of the present invention is to allow a user to edit media files stored in that user's online repository using a web interface. For example, a user may retrieve a media file, edit it to create a media file of shorter length or smaller size, and then save the edited media file.

Another object of the present invention is to retrieve media from an internet accessible location and send media (or a clip from the media) to mobile device(s) including mobile phone(s).

Another object of the present invention is enable a users to store copies of internet accessible media, or clips of the media, or links to media if accessible only in streaming format such as webcasts, podcasts, and so on. For example, a user could enter a URL or a website with keywords obtain search results and then select a clip from the streaming media.

Another object of the present invention is user-driven mobilization system wherein media is mobilized as requested by users which provides efficient mobilization process.

One embodiment of the invention involves a method comprising a step of uploading media from a user's computer to an online repository or media center, and a subsequent step of sending a MMS message to that user's mobile phone. For example, the step may include user uploading one or more songs to the online repository or media center, and the subsequent step may include user sending MMS message containing these songs to that user's mobile device as a playlist. An alternative embodiment of the invention includes a method having a step of purchasing media file(s) and saving media file(s) in an online or offline repository or media center, and a subsequent step of sending a MMS message containing these media to that user's mobile device as a playlist. Another alternative embodiment of the invention includes a method having a step of acquiring internet-accessible media file(s) or clips from such media files, saving the original or edited media file(s) to the user's repository, and/or sending media files to mobile phones using MMS, Push, or other methods.

Another embodiment of the invention includes a method having an intermediate step of organizing media file(s) into one or more playlists. These media file(s) can be organized using multiple criteria including artist, genre, album, live shows, and so on. Alternatively, these media file(s) can be organized using by the user. For example, a user may group songs into playlists for different activities or moods such as "party mix", "study mix", "romantic mix", "workout mix", and so on. In another example, the songs or other media are automatically organized into playlists based using multiple criteria including artist, genre, album, and live shows as well as user preferences or behavior. In still another example, the media also include featured or promoted media. In yet still another example, the media also include media determined by one or more recommendor systems.

In these examples, each song in a playlist may be unique to that playlist or may be part of multiple playlists. In these examples, each playlist may be named by the user or be assigned a unique identifier. In these examples, each song may be uploaded and stored in varied media formats, e.g. MIDI, MP3, WAV, AMR and so on. In the preferred embodiment, each song is converted to a compressed media format such as AMR that is recognizable by mobile phones, and similarly, each picture or photo is converted to a compressed media format such as JPEG, GIF, animated GIF, and so on and each video or movie clip, trailer, promo, and so on is converted to a compressed media format such as 3gp. An example a grouping of media in a playlist is shown in Table 1 below.

TABLE 1

| | Playlist001 | |
| --- | --- | --- |
| Item | Song Title | Filename |
| 1 | song001 | song001.amr, .mp3, .mid, or .3gp |
| 2 | song002 | song002.amr, .mp3, .mid, or .3gp |
| 3 | song003 | song003.amr, .mp3, .mid, or .3gp |
| . | . | . |
| . | . | . |
| . | . | . |
| N | songNNN | songNNN.amr, .mp3, or .mid |

An example of a grouping of media in a slideshow (a type of "playlist") is shown in Table 2 below:

TABLE 2

| | Slideshow001 | |
| --- | --- | --- |
| Item | Slide Title | Filename |
| 1 | slide001 | slide001.gif, .3gp, .mpeg, or .pps |
| 2 | slide002 | slide002.gif, .3gp, .mpeg, or .pps |
| 3 | slide003 | slide003.gif, .3gp, .mpeg, or .pps |
| . | . | . |
| . | . | . |
| . | . | . |
| N | slideNNN | slideNNN.gif, .3gp, .mpeg, .pps |

An example of a grouping of media in a videoshow (a type of "playlist") comprising a collection of video clips, movie clips, ad, or podcasts is shown in Table 3 below:

TABLE 3

| | Videoshow001 | |
| --- | --- | --- |
| Item | Clip Title | Filename |
| 1 | clip001 | clip001.3gp, .mpeg |
| 2 | clip002 | clip002.3gp, .mpeg |
| 3 | clip003 | clip003.3gp, .mpeg |
| . | . | . |
| . | . | . |
| . | . | . |
| N | clipNNN | slideNNN.3gp, .mpeg |

An example of a grouping of media in a medialist (a type of generalized "playlist") comprising a collection or list of items of media including stories, reports, scores, headlines, stock valuations, business metrics, product descriptions, product pricing, bestsellers, showtimes, horoscopes, team members, contestants, candidates, nearby store locations, nearby friends or family, real estate comparables, and so on, is shown in Table 4 below:

TABLE 4

| | MediaList001 | |
| --- | --- | --- |
| Item | Clip Title | Filename |
| 1 | MediaList001 | medialist001.wml, .html, .gif, or .3gp |
| 2 | MediaList002 | medialist002.wml, .html, .gif, or .3gp |
| 3 | MediaList003 | medialist003.wml, .html, .gif, or .3gp |
| . | . | . |
| . | . | . |
| . | . | . |
| N | MediaListNNN | medialistNNN.wml, .html, .gif, or .3gp |

Continuing the examples where a user organized one or more media file(s) in a playlist, the user is presented with alternatives for organizing media. In one embodiment, the user is presented with a choice of one or more templates or forms which have varying levels, e.g. basic versus advanced, novice versus expert, and so on. In other embodiments, the templates or forms may be customizable by the user. For example, the template may allow the user to select a playlist at the time of uploading that user's media file. Alternatively, the user may upload that user's media file and select a playlist at a later time. As a further alternative, the user may elect not to organize media in any playlist or grouping, or to apply a default setting.

After the media are accessible in the online repository, one or more playlists would be sent to that user's mobile phone. In one embodiment, the playlist is sent to a mobile phone as a MMS message. In another embodiment, the playlist is sent to a mobile phone as an email or IM. In still another embodiment, the playlist is sent to a mobile phone using an alternative network protocol for wireless devices such as Bluetooth or WIFI (aka 802.11). In yet still another embodiment, the playlist is mobilized prior to sending to the mobile phone. For example, each media file processed for playing on a mobile phone (e.g. transcoded) and stored individually. In another example, several individual media files may be processed such that multiple media files (e.g. one or more audio files plus one or more image files or video files) are combined and stored as a composite media file. Media files may be stored in a web accessible location, or stored in a database or other location for subsequent retrieval. In this way, the user may be provided access to each of the individual media files using a web-enabled mobile phone, or the user may be provided access to one or more composite media files, or the user may be provided access to both individual files and the resulting media files. Since the media represented by the displayed object is one file, mobile phones will play the components of the playlist in sequence, and typically, without intervening pauses or stops. Thus, these methods make the mobile phone ideal for playlists whether they be comprised of music, photos, or video clips, or combinations of media.

In addition, a user (including an advertiser or marketer) may schedule the transmission of playlist(s). In one embodiment, the user schedules the time to send the MMS message applicable to each playlist, e.g. NOW, TODAY at NOON, TODAY at 5 PM, TOMORROW at 8 AM, FRIDAY at 8 PM. In still another embodiment, the user schedules a recurring MMS message for one or more playlists. In other embodiments, the user may opt-in to receive additional MMS messages comprising varied media files from third parties and the service may allow the user to schedule when to receive these additional MMS messages. These additional MMS messages may include announcements, promotions, licensed content, and so on.

Still yet another object of the invention is to improve efficiency of information distribution such as that media contain important information can be distributed interested users of mobile devices. Typically, real estate agents, political campaigns, and organizers and promoters of events, and media and entertainment companies, among others, create hardcopy "flyers", pamphlets, coupons, and similar materials for promotion purposes. In comparison to paper flyers, distributing digital information is inexpensive, requires less time and effort, and does not add to the waste stream. Although the internet partially obviates the need for hardcopy flyers, a need for mobile information still exists and browsing using a mobile phone has inherent limitations. In contrast, MMS messaging is both mobile and overcomes the inherent limitations of browsing. An example of a type of media that can be sent by MMS message to mobile phones is flyers, pamphlets, coupons, and other similar promotional materials.

Such promotional materials may be sent in varied media formats including images, videos, and so on. In one embodiment, one or more such promotional materials are additional MMS messages sent separately to a user's mobile phone. In another embodiment, one or more promotional messages are additional MMS messages sent to the user's mobile phone simultaneously with MMS messages scheduled or requested by the user. In still another embodiment, one or more such promotional messages are intermixed within a user's playlist in a single MMS message. The mobile phone of the user may or may allow user to skip the promotional message but a message produced with high quality content will be heard by many users.

Still yet another object of the invention is for advertising and promotion of manufacturers and vendors of any goods and services that are targeted to a specific geographic location(s) such as southern locations, northern locations, state specific, MSA specific, community specific, resort destination(s), rather than targeted to other users such as specific demographic, e.g. tweens, teenagers, 18-34 year-olds, baby boomers, and so on.

Still yet another object of the invention is integration of targeted media including but not limited to mobile advertising, marketing, campaigning, promotion and/or sales within a mobile communications device to add to the value of the device without detracting from the value of device as a communications tool. Although a message may be displayed on the device prior to making a connection to a network for purposes of communication, display of a message prior to making a connection may delay, and thus, detract from the value of the device as a communications tool. Yet, a message may also be displayed of the device without detracting from its value by being displayed when the user is dialing a telephone number and/or after termination of a communication. For example, if the message is a sound bite, it would fit in during dialing. A longer message could be paused during a communication and resumed when the communication is terminated.

The current invention overcomes the problem of detracting from the user's experience. In addition, the invention enhances conventional playlists with visual imagery such as slideshows or videos. For example, a user who is playing a playlist of music can be presented advertising in the form of a single image, slideshow, animation, video, or series of videos. The slideshow can include a combination of user's content, other content, and/or advertising content. The video can be silent or with an audio or soundtrack. Similarly, the audio can be with or without a slideshow or video show. For example, we can intermix targeted ads like on radio spots between songs. For example, another variation of the process could be allowing a user to select which files to include in a playlist and which images to include from uploaded media or using the any company logo or brand as a default. Another variation would be locating the cover art of the song and including that in the playlist. Still another variation is making a slide show out of uploaded pictures, e.g. family members, friends, classmates, etc. and/or combining music to it. Still another variation is creating a video out of a powerpoint presentation, e.g. PPS file. Another variation is taking a video and sequencing it into small video clips at appropriate break points, e.g. segments, chapters, scenes, etc.

BRIEF DESCRIPTION OF THE DRAWINGS

FIGS. 5A, 5B, and 5C are portions of a block diagram of a media center showing pictorial representations of media files.

FIGS. 7I and 7J are alternative flowcharts of processes to transmit playlist(s) comprising one or more media file(s) using MMS or the like.

FIG. 8 is a flowchart of a process to transmit playlist(s) comprising one or more media files using WAP or mobile web or the like.

FIGS. 10C through 10D are views of user interfaces for media editing and integrated interfaces for editing media and sending clips of media.

DETAILED DESCRIPTION OF THE INVENTION

With reference to FIGS. 1A through 1C, 2A through 2C, 3A through 3E, 4, and 5A through 5C, media files are depicted a pictorial diagrams.

Figure 1A:
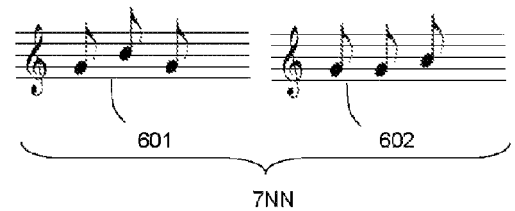
FIGS. 1A, 1B, and 1C are schematic diagrams of alternative combinations of audio files in a single media file.
Figure 1B:
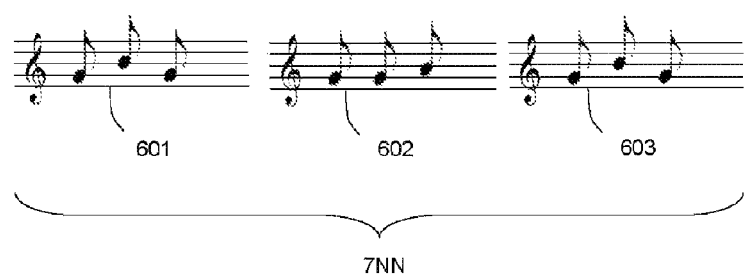
Figure 1C:
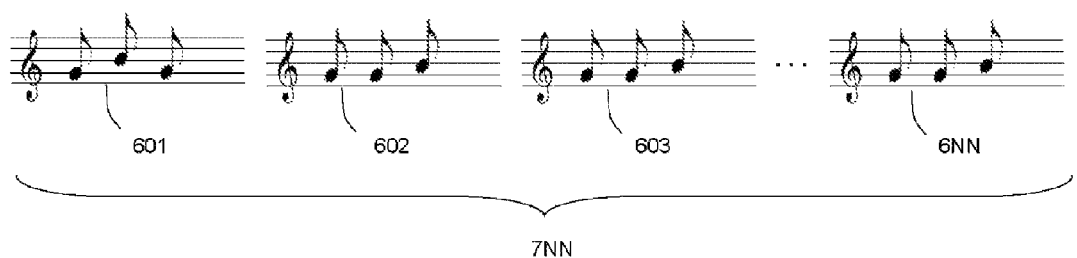

In FIG. 1A, the methods and systems of the invention describe a combination of two audio files 601 and 602 into a single media file 7NN. In FIG. 1B, the methods and systems of the invention describe a combination of three audio files 601, 602, and 603 into a single media file 7NN. In FIG. 1C, the methods and systems of the invention describe a combination of a plurality of audio files 601, 602, . . . , 6NN into a single media file 7NN. In one embodiment, the audio files are music files or songs. In another embodiment, one or more the audio files are advertisements, marketing messages or promotions. In still other embodiments, the audio files are segments of radio shows, chapters of talking books, or any other audio files whatsoever. The media file 7NN may be any file format capable of recording audio including but not limited to AAC, AMR, WAV, WMA, MP3, and 3GP.

Figure 2A:
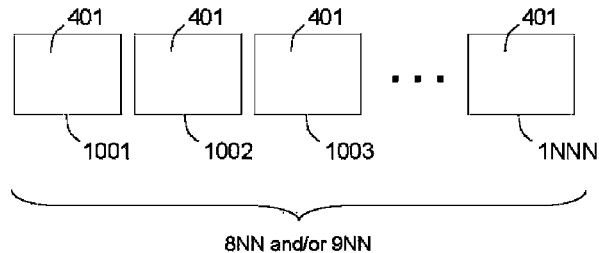
FIGS. 2A, 2B, and 2C are schematic diagrams of alternative combinations of image files in a single media file.
Figure 2B:
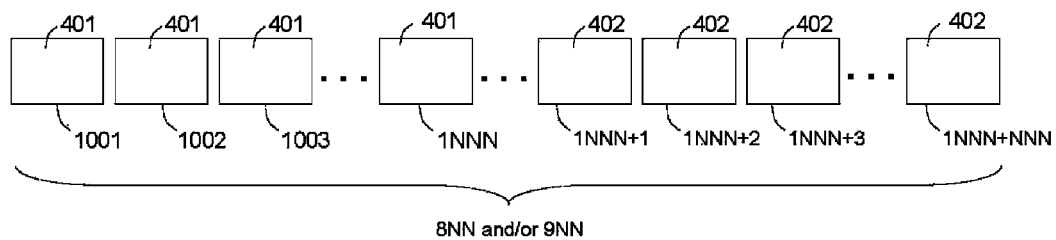
Figure 2C:
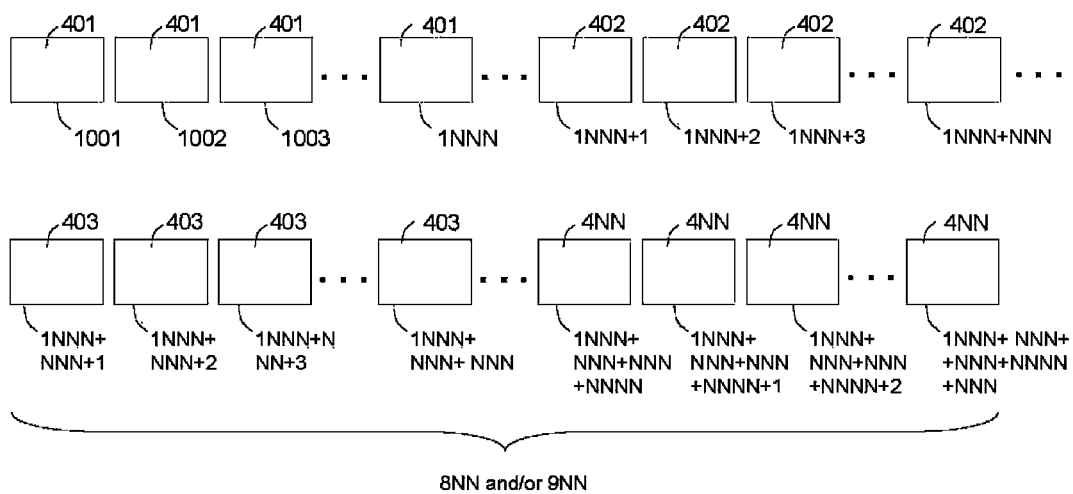

In FIG. 2A, the methods and systems of the invention include a combination of a sequence of repetitive images 401 comprising a series of frames 1001, 1002, 1003, . . . , 1NNN into a single media file 8NN. In FIG. 2B, the methods and systems of the invention include a combination of two sequences of repetitive images 401 and 402 comprising a series of frames 1001, 1002, 1003, . . . , 1NNN, . . . , 1NNN+1, 1NNN+2, 1NNN+3, . . . , 1NNN+NNN into a single media file 8NN. In FIG. 2C, the methods and systems of the invention include a combination of a plurality of sequences of repetitive images 401, 402, 403, . . . , 4NN comprising a series of frames 1001, 1002, 1003, . . . , 1NNN, . . . , 1NNN+1, 1NNN+2, 1NNN+3, . . . , 1NNN+NNN, 1NNN+NNN+1, 1NNN+NNN+2, 1NNN+NNN+3, . . . , 1NNN+NNN+NNN, . . . , 1NNN+NNN+NNN+NNNN, 1NNN+NNN+NNN+NNNN+1, 1NNN+NNN+NNN+NNNN+2, 1NNN+NNN+NNN+NNNN+3, 1NNN+NNN+NNN+NNNN+NNN into a single media file 8NN. In one embodiment, the image files 401, 402, 403, . . . , 4NN are photos or pictures. In another embodiment, one or more the image files are advertisements, marketing messages or promotions. In another embodiment, one or more of the images are slides from a slideshow. In still other embodiments, one or more of the images are stills from an animation, flashcards, trading cards, entries in a facebook, mugshots or most wanted fugitives, or any other image files whatsoever. The media file 8NN may be any file format capable of recording images including but not limited to PPS, WMF, MOV, MPEG4, and 3GP.

Figure 3A:
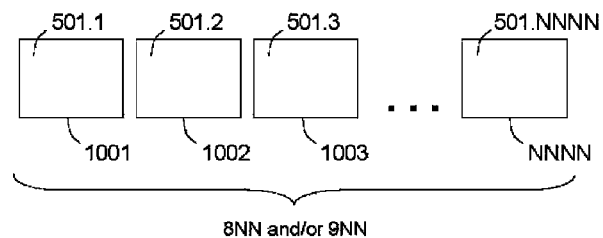
FIGS. 3A, 3B, 3C, 3D and 3E are schematic diagrams of alternative combinations of video files in a single media file.
Figure 3B:
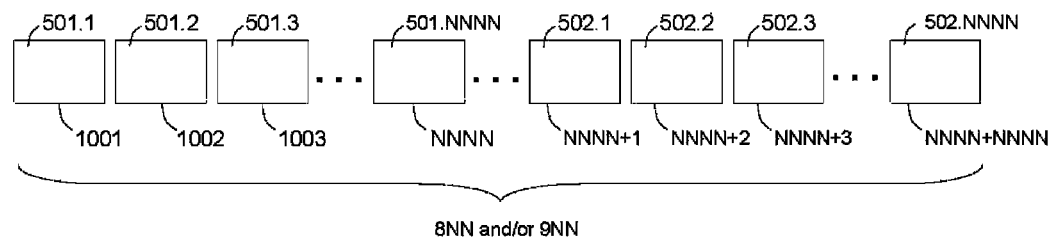
Figure 3C:
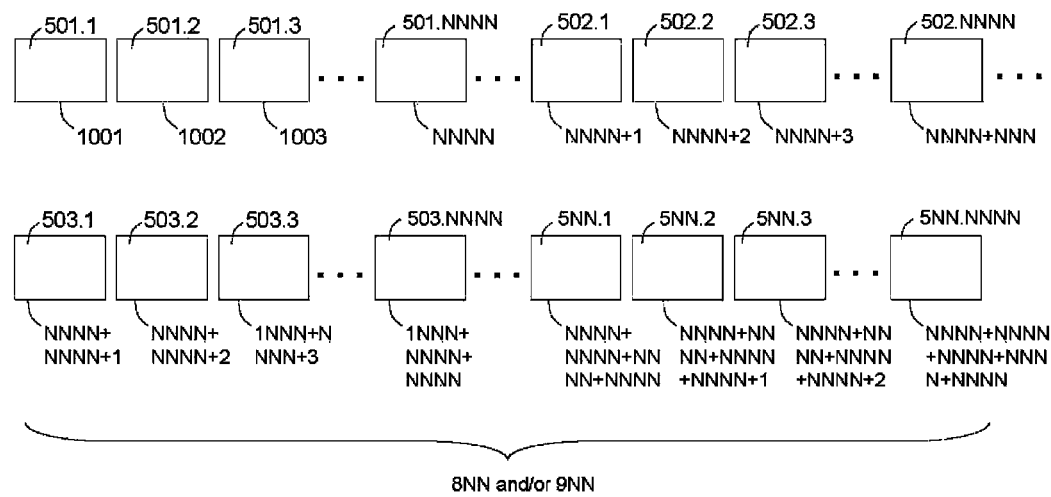

In FIG. 3A, the methods and systems of the invention include a combination of a sequence of frames 501.1, 501.2, 501.3, . . . 501.NNN comprising a series of frames 1001, 1002, 1003, . . . , 1NNN into a single media file 8NN and/or 9NN. In FIG. 3B, the methods and systems of the invention include a combination of two sequences of frames 501.1, 501.2, 501.3, . . . , 501.NNN, . . . , 502.1, 502.2, 502.3, . . . , 502.NNN comprising a series of frames 1001, 1002, 1003, . . . , 1NNN, . . . , 1NNN+1, 1NNN+2, 1NNN+3, . . . , 1NNN+NNN into a single media file 8NN and/or 9NN. In FIG. 3C, the methods and systems of the invention include a combination of a plurality of sequences of frames 501.1, 501.2, 501.3, . . . , 501.NNN, . . . , 502.1, 502.2, 502.3, . . . , 502.NNN, . . . , 503.1, 503.2, 503.3, . . . , 503.NNN, . . . , 5NN.1, 5NN.2, 5NN.3, . . . , 5NN.NNN comprising a series of frames 1001, 1002, 1003, . . . , 1NNN, . . . , 1NNN+1, 1NNN+2, 1NNN+3, . . . , 1NNN+NNN, 1NNN+NNN+1, 1NNN+NNN+2, 1NNN+NNN+3, . . . , 1NNN+NNN+NNN, . . . , 1NNN+NNN+NNN+NNNN, 1NNN+NNN+NNN+NNNN+1, 1NNN+NNN+NNN+NNNN+2, 1NNN+NNN+NNN+NNNN+3, 1NNN+NNN+NNN+NNNN+NNN into a single media file 8NN and/or 9NN. In one embodiment, a sequence of frames 5NN.1, 5NN.2, 5NN.3, . . . , 5NN.NN are a sequence of frames from a video clip or movie trailer. In another embodiment, one or more of the sequences of frames is a video advertisement, marketing messages or promotion. In still other embodiments, one or more of the sequences of frames is an animation, cartoon, simulation, movie, highlights, video on demand, live or recorded media, live of recorded play from video games or virtual worlds, or any video whatsoever. The media file 8NN may be any file format capable of recording images including but not limited to WMF, MOV, MPEG4, and 3GP.

Figure 3D:
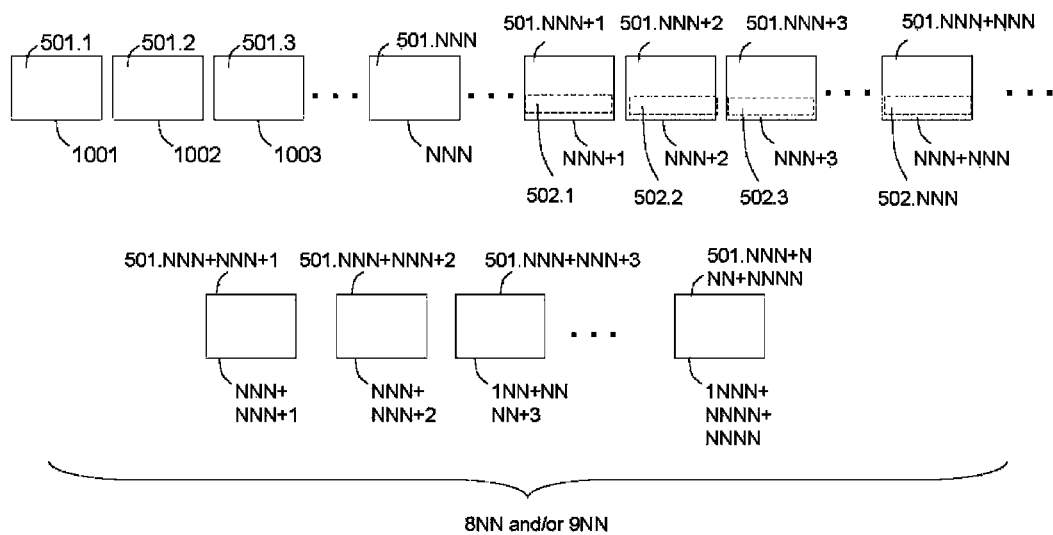

In FIG. 3D, the methods and systems of the invention include insertion of a relatively short sequence of frames 502.1, 502.2, 502.3, . . . , 502.NNN from a video clip 502 (or multiple video clips 502, 503, 504, . . . , 5NN) in a relatively long sequence of frames 501.1, 501.2, 501.3, . . . , 501.NNNN of a video 501 resulting in media file 8NN and/or 9NN. In one embodiment, the video 501 is an entire video and the video clip 502 is an advertisement, promotion or other type of message. For example, video 501 could be a movie, a TV show, a mobisode, a news or sports highlight, and so on. In another embodiment, the video 501 is itself a video clip having a relatively short duration. For example, in a typical scenario, the video 501 has a duration of at least 15 secs and the video clip 502 has a duration from 5-10 secs. Depending on the particular context, the video clip 502 may have any duration from about 1 sec up to the duration of the video 501 itself. For example, the video clip 502 could run the entire duration of the video 501, e.g. a split screen or scrolling feed. In another example, the video clip 502 could be as short as 2-3 sec. if the video 501 has a relatively short duration itself, e.g. less than 10 sec. In at least one embodiment, each frame of video clip 502 is inserted as a partial overlay of one or more frames in video 501. For example, video clip 502 may be inserted as a full frame, a partial frame cropped the video having the form of a rectangle (e.g. a banner or box), or a miniaturized frame (e.g. PIP or split screen) and the overlay may have zero transparency, full transparency, or partial transparency. In various embodiments, the video 501 and/or the video clip 502 may be recordings of live action, computer generated animations, simulations, or the like, or a combination of recordings and computer generated video.

Figure 3E:
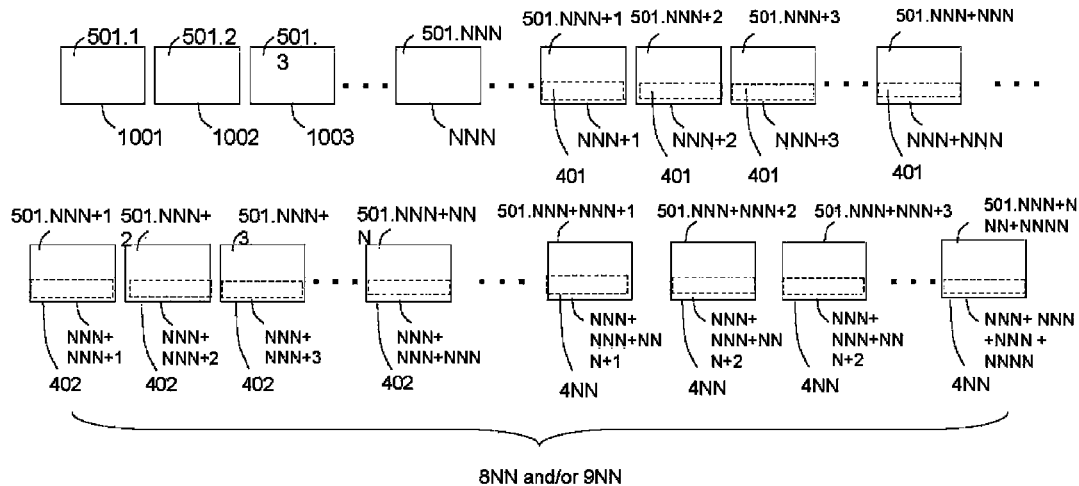
Figure 4A:
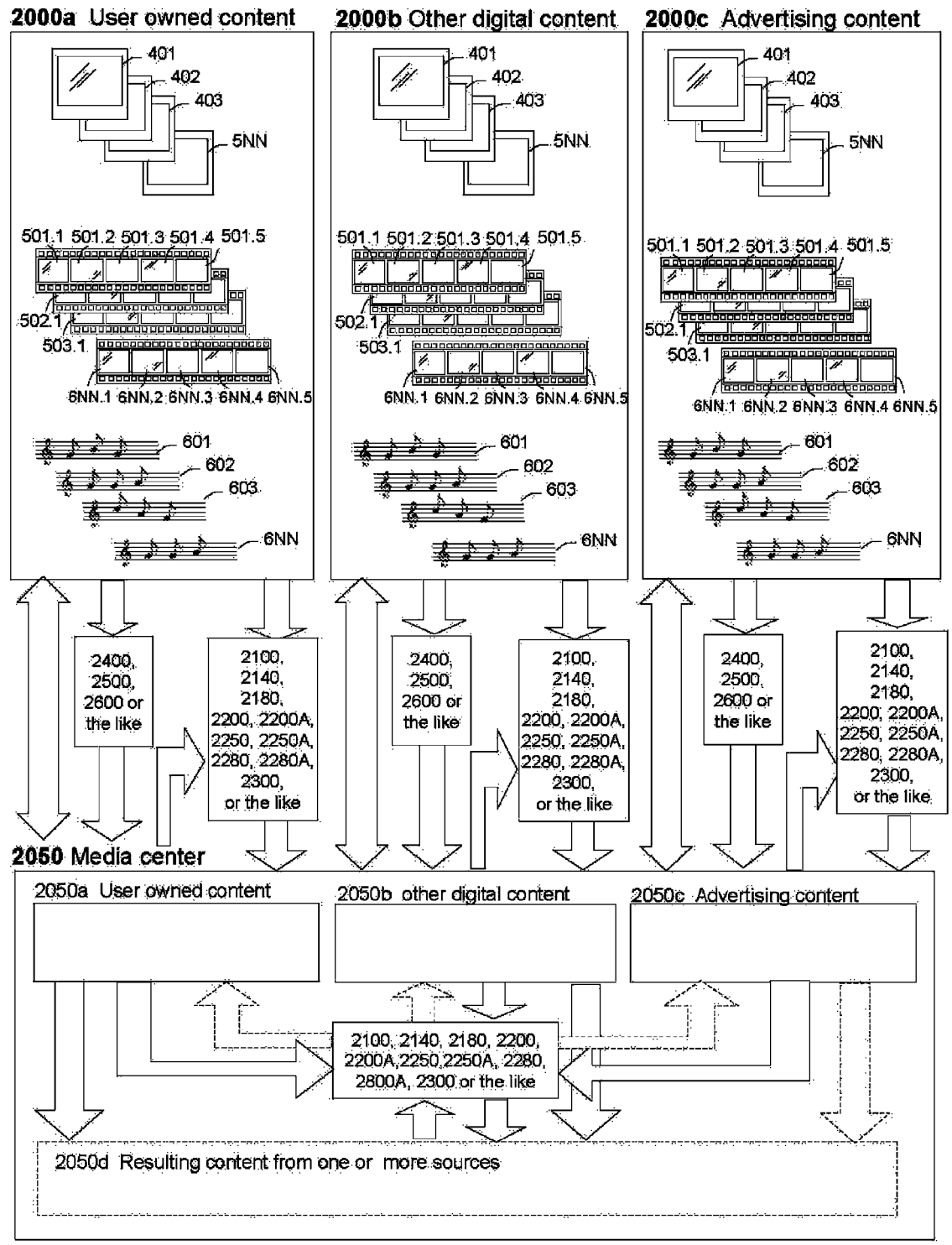
FIG. 4A is a block diagram of media sources and a media center showing pictorial representations of media files and various processes relating to media files.
Figure 4B:
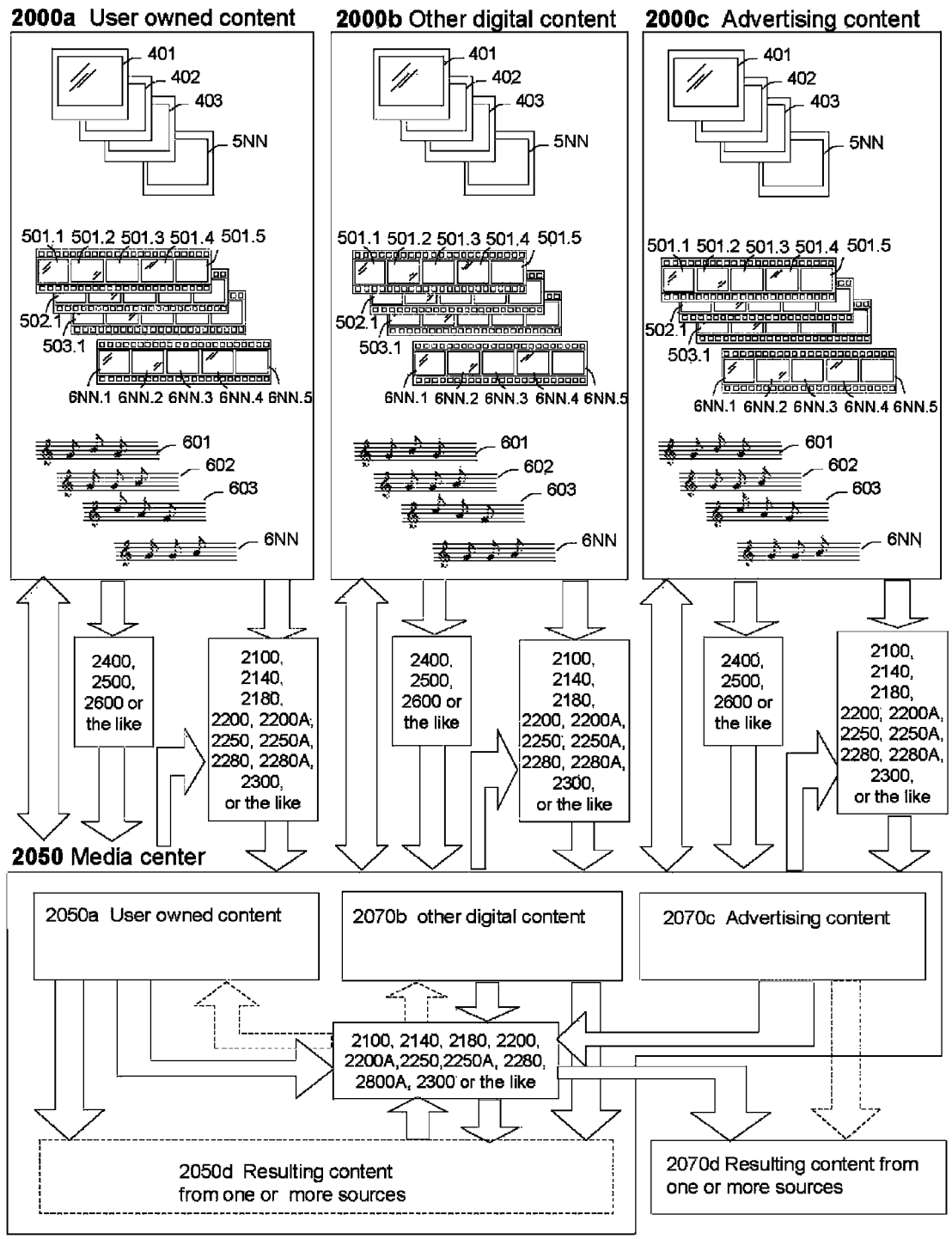
FIGS. 4B, 4C and 4D are alternative block diagrams of media sources and a media center showing pictorial representations of media files and various processes relating to media files with a portion(s) of the resulting media files inside the media center and other portions of the resulting media files outside the media center.
Figure 4C:
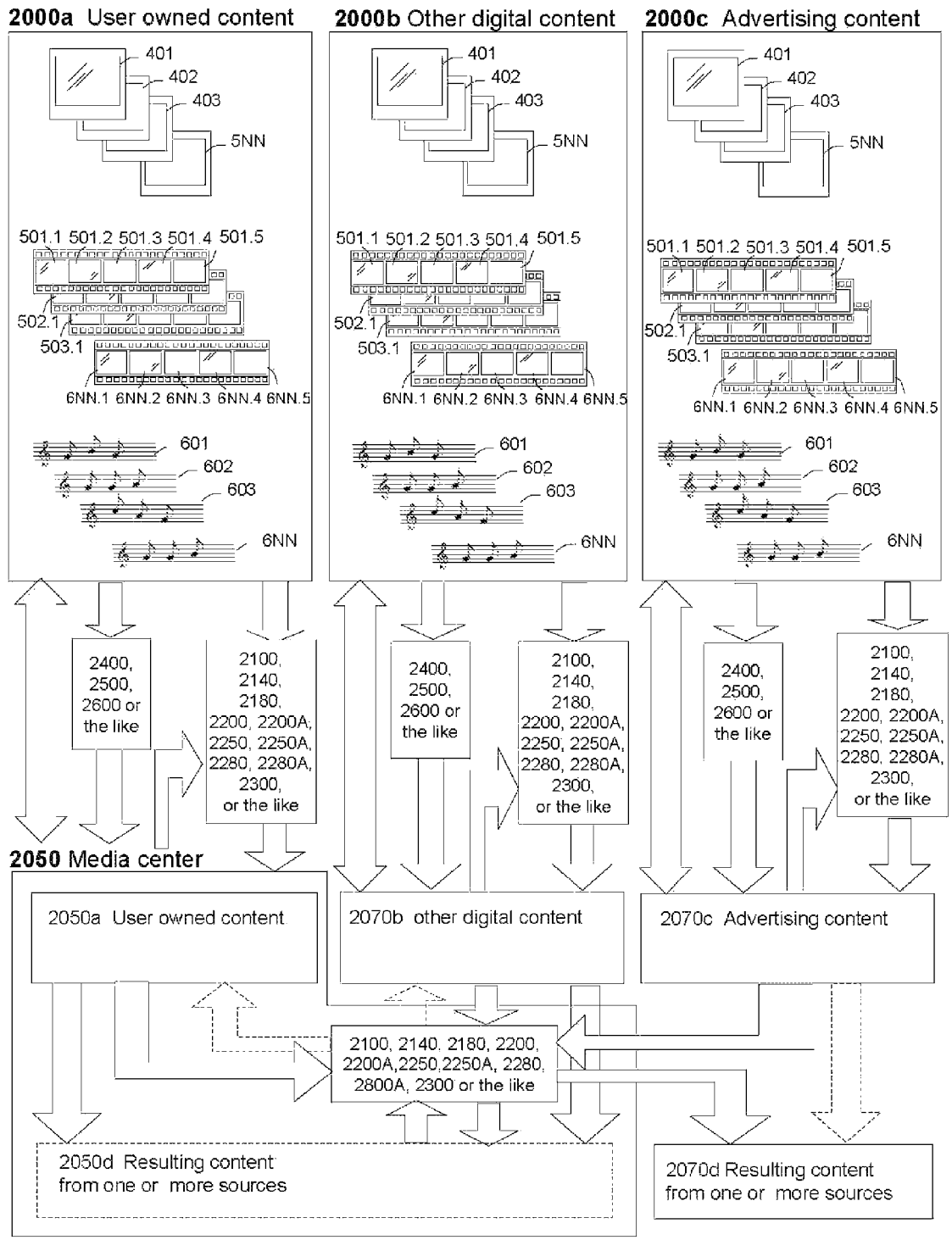
Figure 4D:
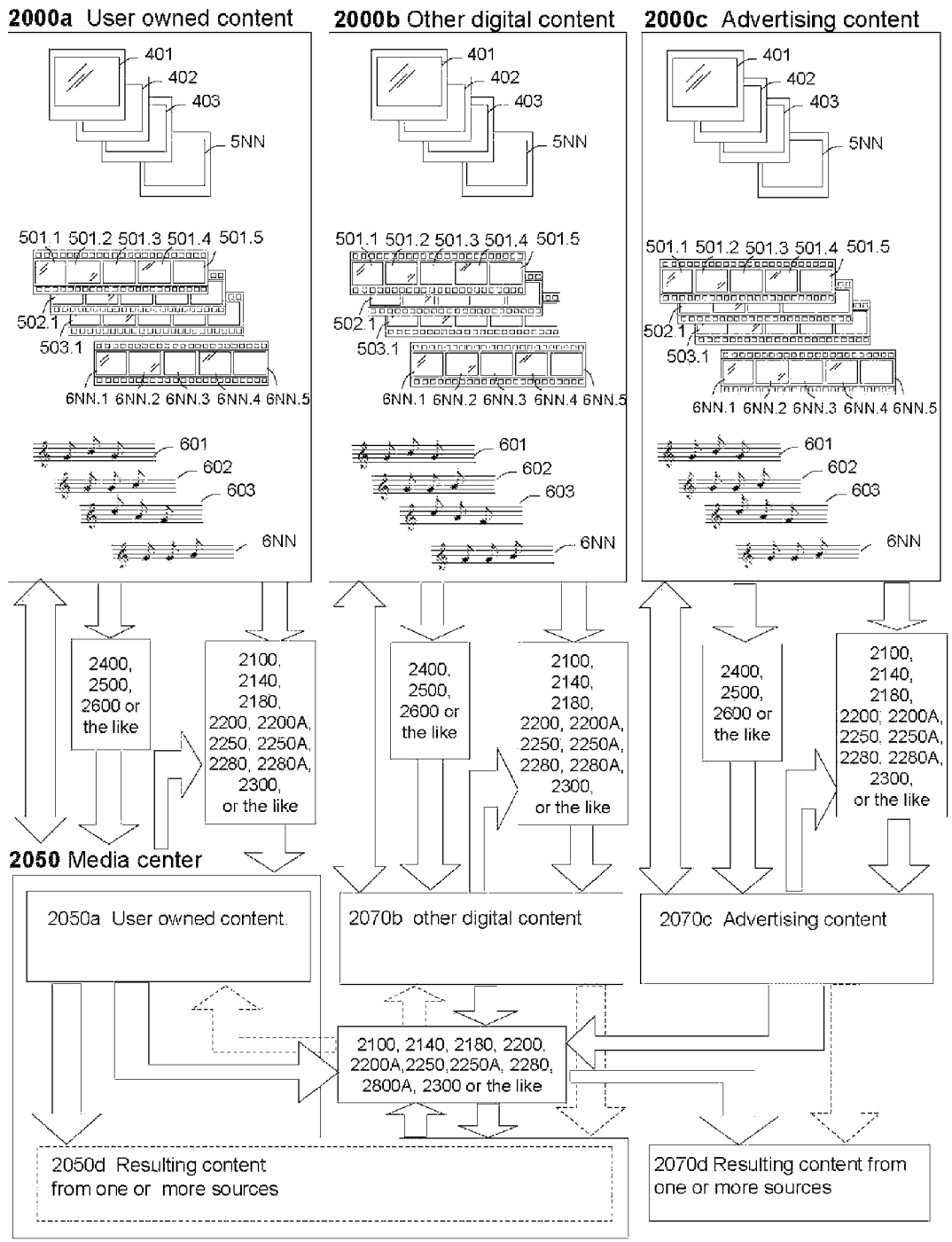

In FIG. 3E, the methods and systems of the invention include insertion of a relatively short sequence of one or more image(s) 401, 402, 403, . . . , 4NN in a relatively long sequence of frames of a video 501 resulting in media file 8NN and/or 9NN. In one embodiment, the video 501 is an entire video and there is a single image 401 which may be an advertisement, promotion or other type of message in the form of a banner or box including graphic, text or a combination of graphics and text. In another embodiment, there are multiple images 401, 402, 403, . . . , 4NN which may be an advertisement, promotion or other type of message in the form of a series of images. In still another embodiment, the video 501 is itself a video clip having a relatively short duration. In at least one embodiment, image 401 (or images 401, 402, 403, . . . , 4NN) is inserted as a partial overlay of one or more frames in video 501. For example, image 401 (or images 401, 402, 403, . . . , 4NN) may be inserted as a full frame, a partial frame cropped the video having the form of a rectangle (e.g. a banner or box), or a miniaturized frame (e.g. PIP or split screen) and the overlay may have zero transparency, full transparency, or partial transparency. In various embodiments, the image 401 (or images 401, 402, 403, . . . , 4NN) may be photos or recorded images, computer generated images, or a combination of these.

In FIGS. 4A through 4D and FIGS. 5A through 5C, the methods and system of the invention describe a media center 2050 for storage of media files obtained from one or more sources (2000a, 2000b, 2000c, . . . , 2000z) including but not limited to user owned content 2000a, other digital content 2000b, and advertising content 2000c. In one embodiment, the media files comprise user owned content 2000a. In another embodiment, the media files comprise other digital content 2000b such as acquired content, e.g. purchased or licensed content. In still embodiment, the media files comprise advertising content 2000c. In still other embodiments, the media files may comprise media files from any source whatsoever and in any combination. FIGS. 4A through 4D describes methods of processing media file(s) received from one or more sources or from the media center. For example, processing of media files is shown in subprocesses 2100, 2140, 2180, 2200, 2200A, 2250, 2250A, 2280, 2300, 2400, 2500, 2600, and so on. These subprocesses may be applied to media files from one source or from multiple sources. For example, the subprocess 2100 can be applied to music files owned by the user, to music files acquired online at a music store, to audio soundtracks from an advertiser or marketer, or to any combination of sources. Similarly, subprocesses 2140, 2180 and 2300 can be applied to media files from any source or combination of sources. In addition, processes 2200, 2250, and 2280 can be applied to media files In one embodiment, media files resulting from processes 2100, 2140, 2180, 2200, 2250, 2280 and/or 2300 are organized in separate area 2050d of the media center from source media files in 2050a, 2050b, and 2050d. In other embodiments, the source media files may be intermixed with source media files in the media center. For example, a resultant media file, e.g. a playlist of multiple songs, is immediately adjacent to the source files. Further, some resulting media files may be entirely from one source, e.g. user content, while other resulting media files may include media files from more than one source.

Figure 5A:
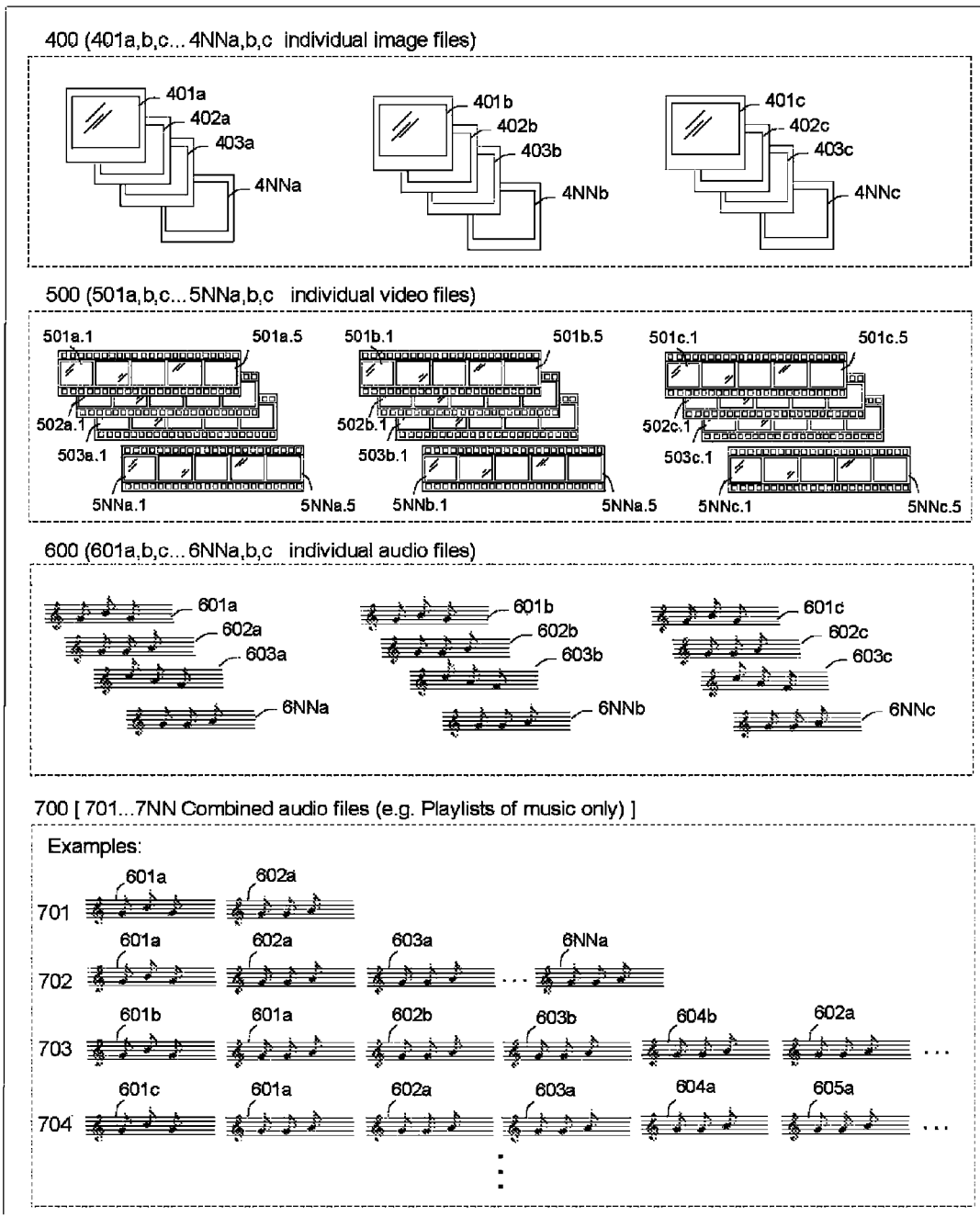
Figure 5C:
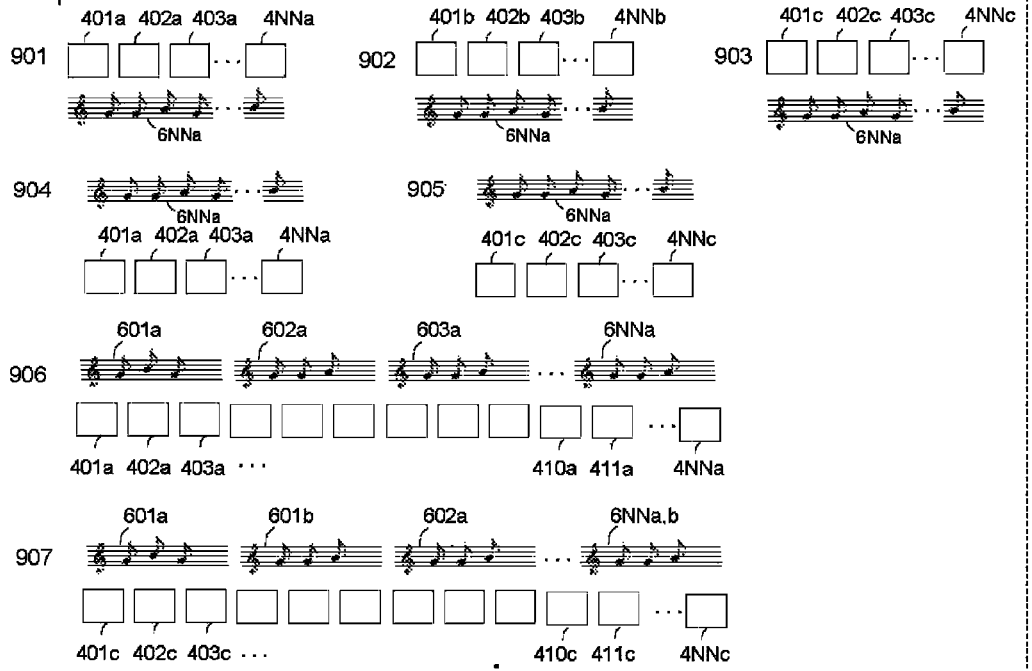
Figure 5C:
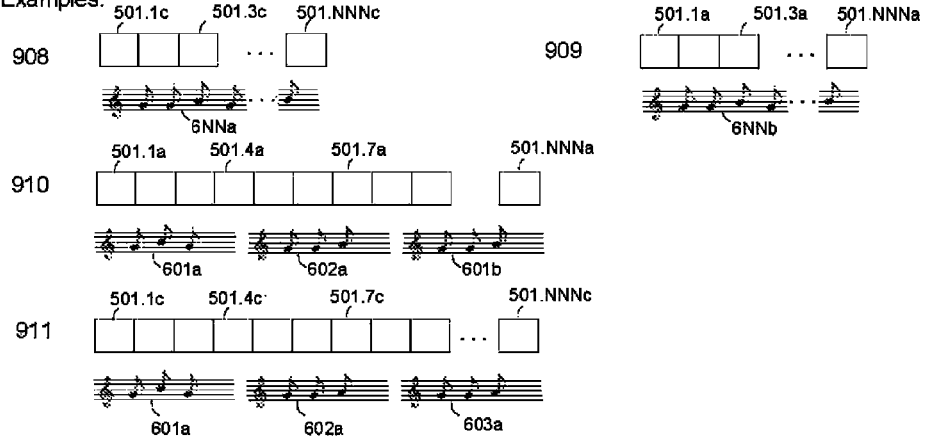

FIGS. 5A through 5C illustrate the media center having a plurality of media files that may include image files, audio files, video files, and/or any other type of media files. The illustration of the media center shows various examples of both source media files and resulting media files. For example, source media files include but are not limited to image files 401a, 402a, 403a, . . . , 4NNa, 401b, 402b, 403b, . . . , 4NNb, and 401c, 402c, 403c, . . . , 4NNc. For example, source media files include but are not limited to video files 501.1a . . . 501.NNNa, 502.1a . . . 502.NNNa, . . . 5NN.1a.5NN.NNNa, 501.1b . . . 501.NNNb, 502.1b . . . 502.NNNb, . . . 5NN.1b.5NN.NNNb, 501.1c . . . 501.NNNc, 502.1c . . . 502.NNNc, . . . 5NN.1c.5NN.NNNc. For example, source media files include but are not limited to audio files 601a, 602a, 603a, . . . , 6NNa, 601b, 602b, 603b, . . . , 6NNb, and 601c, 602c, 603c, . . . , 6NNc. Resulting media files are shown as additional series of media files 700, 800, or 900. For example, resulting media files derived from audio files are denotes by series 700 and include but are not limited to audio files 701 . . . 7NN. Resulting media files derived from images and videos are denoted by series 800 include but are not limited to video files 801 . . . 8NN. Resulting media files derived from audio and either images or videos are denoted by series 900 include but are not limited to video files 901 . . . 9NN.

In operation, one embodiment invention include a servers reading multiple music files 601, 602, 603 . . . 6NN, encode these music files into one longer music file 700, use that music file 700 as an audio track in a video file comprised of one or more images 401, 402, 403, . . . 4NN. The methods include encoding a resulting media file at any frame rate or bit rate. For example, the images could be encoded at a rate of from less than 1/100 frame per second to 60 frames per second or more depending on the desired duration of each image and whether or not the sequence of images comprise an animation or are independent. In the preferred embodiment, if a sequence of images do not comprise an animation, they are encoded at a pre-determined number of frames per second, e.g. 1 frame per second, and the duratin of 3 to 5 seconds. The methods of the invention include taking into account what kind of music it is and/or what kind of profile the user has, and other information to place targeted ads these resulting media files.

With reference to FIGS. 6A through 6M, 7A through 7J, 8 and 11 through 14, processes and subprocesses are depicted by boxes having either solid or dashed lines. Required steps are depicted by boxes having solid lines. Alternative and/or additional steps are depicted as boxes having dashed or phantom lines.

Figure 6A:
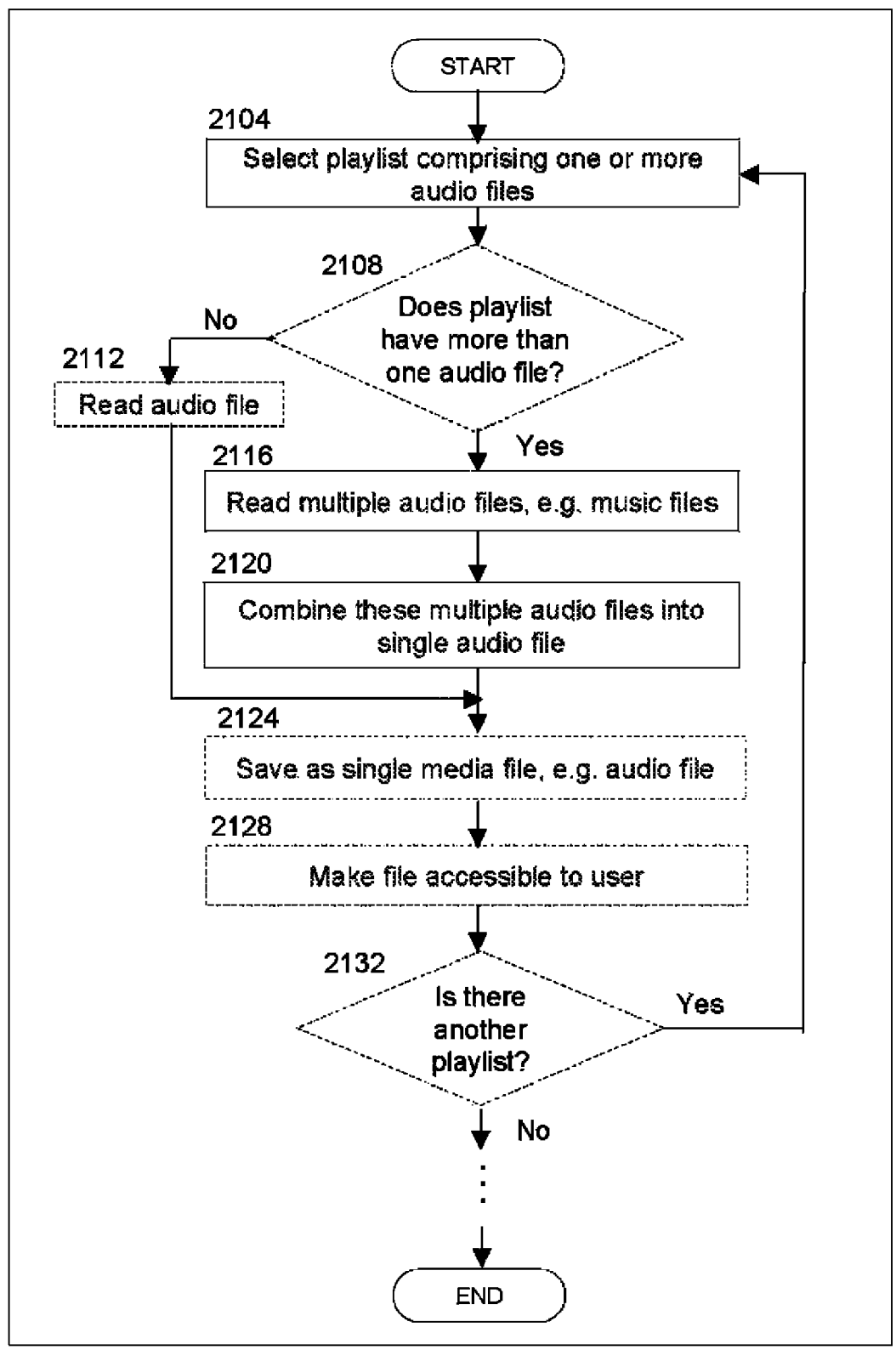
FIGS. 6A, 6B, and 6C are flowcharts of alternative processes for processing different types of media files.

In FIG. 6A, the methods and systems of the invention includes a process 2100 having the steps of selecting a playlist comprising one or more audio files 2104, reading multiple audio files 2116, combining these multiple audio files into a single audio file 2120. The process may have additional steps of saving the resulting media file as a single media file 2124 and/or making the resulting media file accessible to user 2128. In this way, the user can click a single link to play the resulting media file comprising the playlist rather than separate links to individual files. In one embodiment, the resulting media file is an audio file, e.g. AAC, AMR, MP3, etc. In another embodiment, the resulting media file is a video file, e.g. 3GP, MPEG4, etc. In the preferred embodiment, the resulting media file is a media file having format(s) that are playable by most mobile phones out-of-the-box. For example, the resulting media file may be a 3GP file which has the resulting media file as the audio track.

Figure 6B:
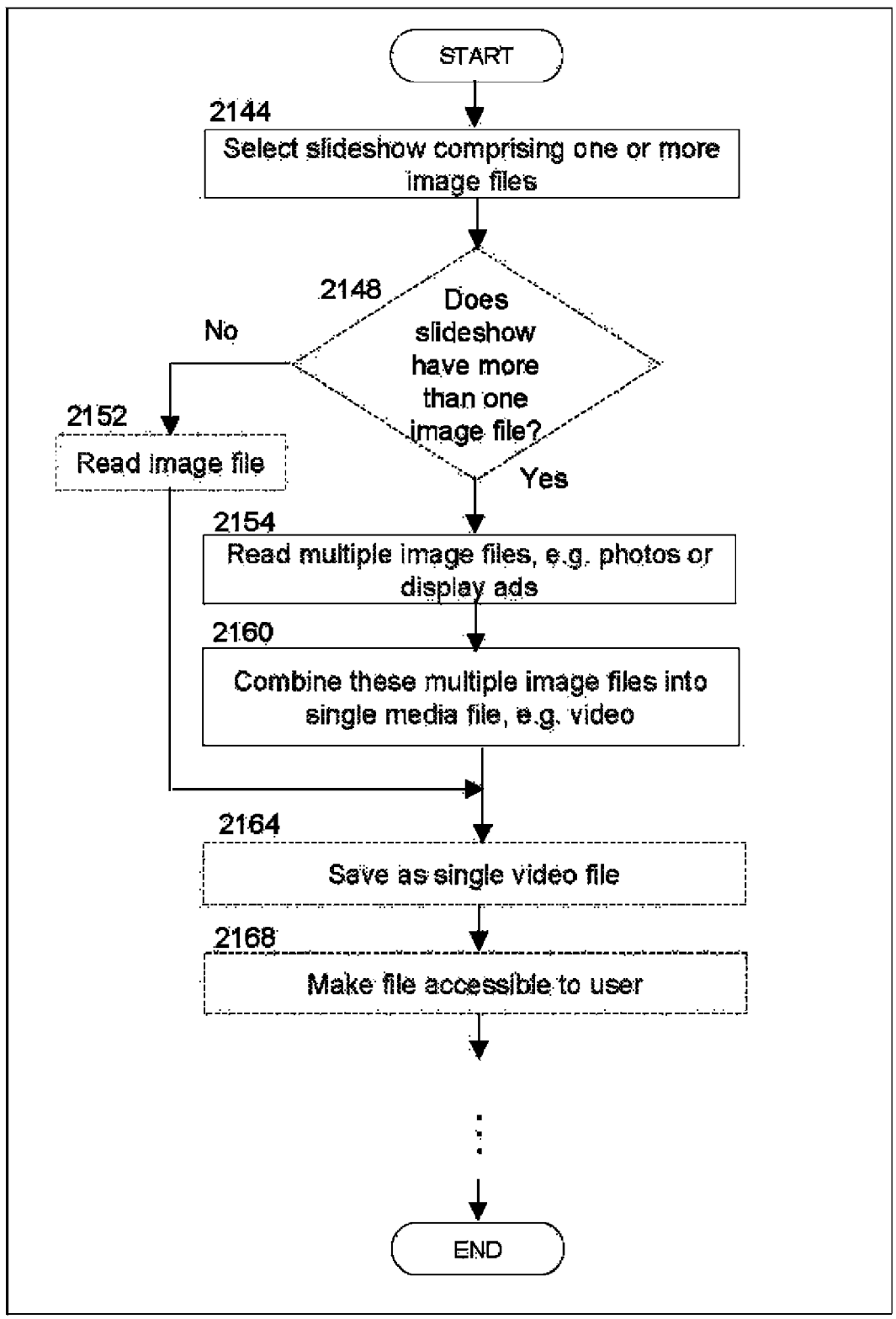

In FIG. 6B, the methods and systems of the invention includes a process 2140 having the steps of selecting a slideshow comprising one or more image files 2144, reading multiple image files 2154, combining these multiple audio files into a single video file 2160. The process may have additional steps of saving the resulting media file as a single media file 2164 and/or making the resulting media file accessible to user 2168. In one embodiment, the resulting media file is a video file, e.g. 3GP, MPEG4. In other embodiments, the resulting media file is any media format that is capable of recording a slideshow including but not limited 3GP, MPEG, MOV, PPS, and so on.

Figure 6C:
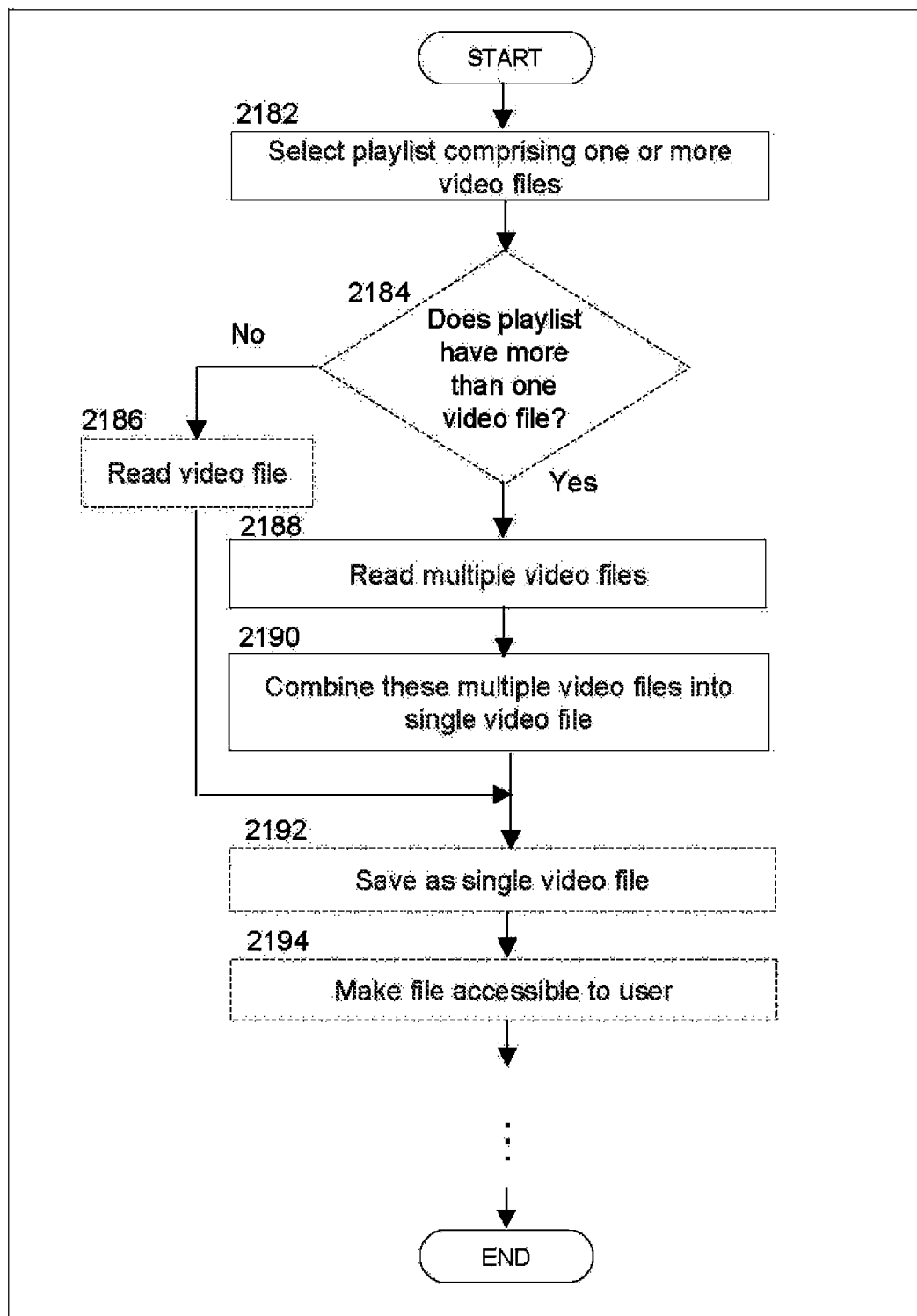

In FIG. 6C, the methods and systems of the invention includes a process 2180 having the steps of selecting a playlist comprising one or more video files 2182, reading multiple video files 2188, combining these multiple video files into a single video file 2160. The process may have additional steps of saving the resulting media file as a single media file 2164 and/or making the resulting media file accessible to user 2168. In this way, the user can click a single link to play the resulting media file comprising the playlist rather than separate links to individual files. In one embodiment, the resulting media file is an video file, e.g. 3GP, MPEG4, etc. which includes one or more sequence(s) of frames of video from one of more images, video clips, etc. In the preferred embodiment, the resulting media file is a video file having format(s) that are playable by most mobile phones out-of-the-box. For example, the resulting media file may be a 3GP file which has the combined audio files as the audio track.

Figure 6D:
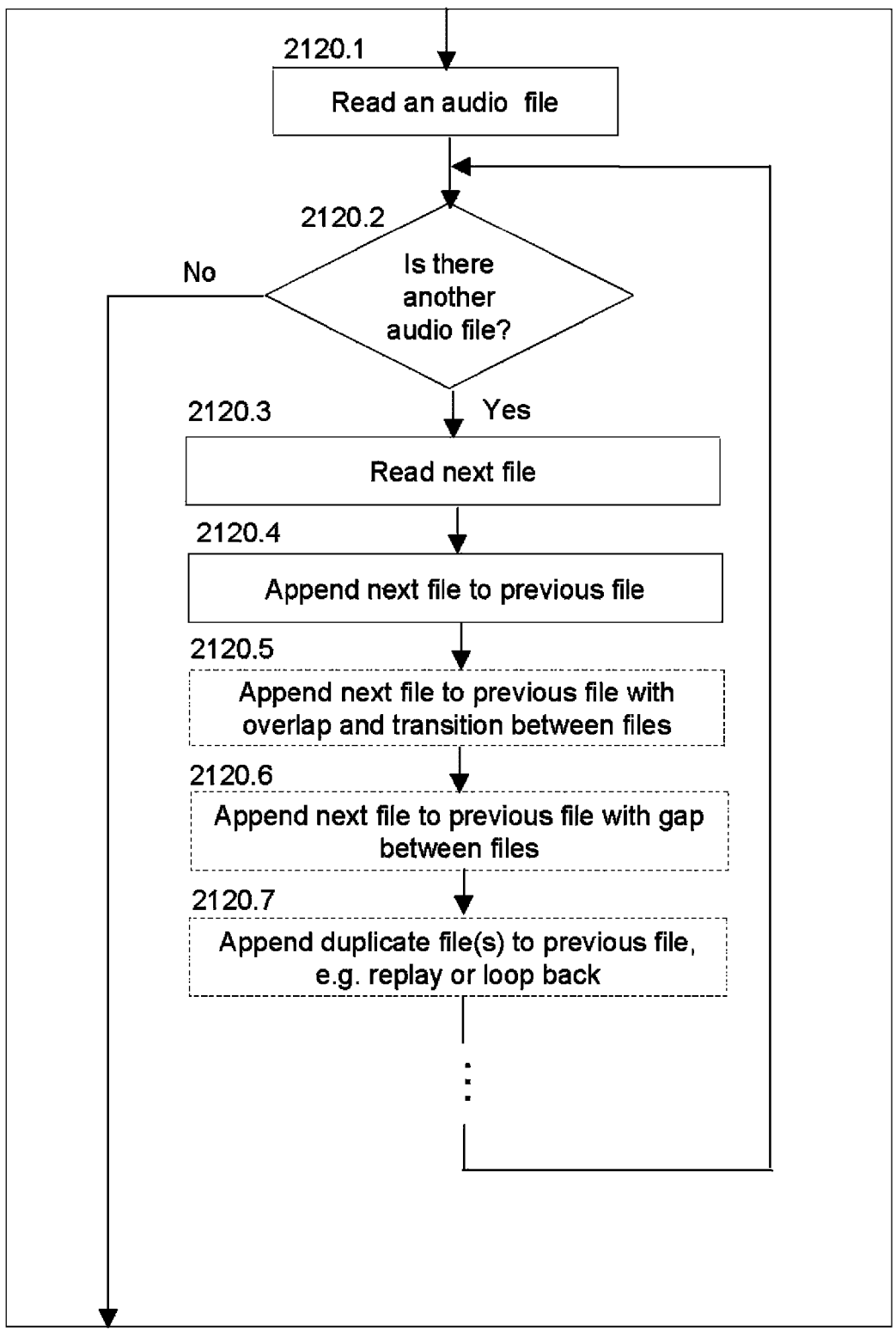
FIGS. 6D, 6E, and 6F are flowcharts of alternative subprocesses for combining like media files a single media file.

In FIG. 6D, the flowchart describes subprocess 2120 having the steps of reading an audio file 2120.1, reading next audio file 2120.3, and append next audio file to previous audio file 2120.4. The process has the following additional and/or alternative steps of overlapping the next file with previous file 2120.5, leaving a gap between the previous and next files 2120.6, and appending a duplicate file to previous file 2120.7. Alternatively, subprocess 2120 may involve preparing multiple media files to be compatible formats and issuing a command to concatenate multiple audio files in order to have a single resulting media file. The resulting media file may be saved as an audio file or as the audiotrack in a video file.

Figure 6E:
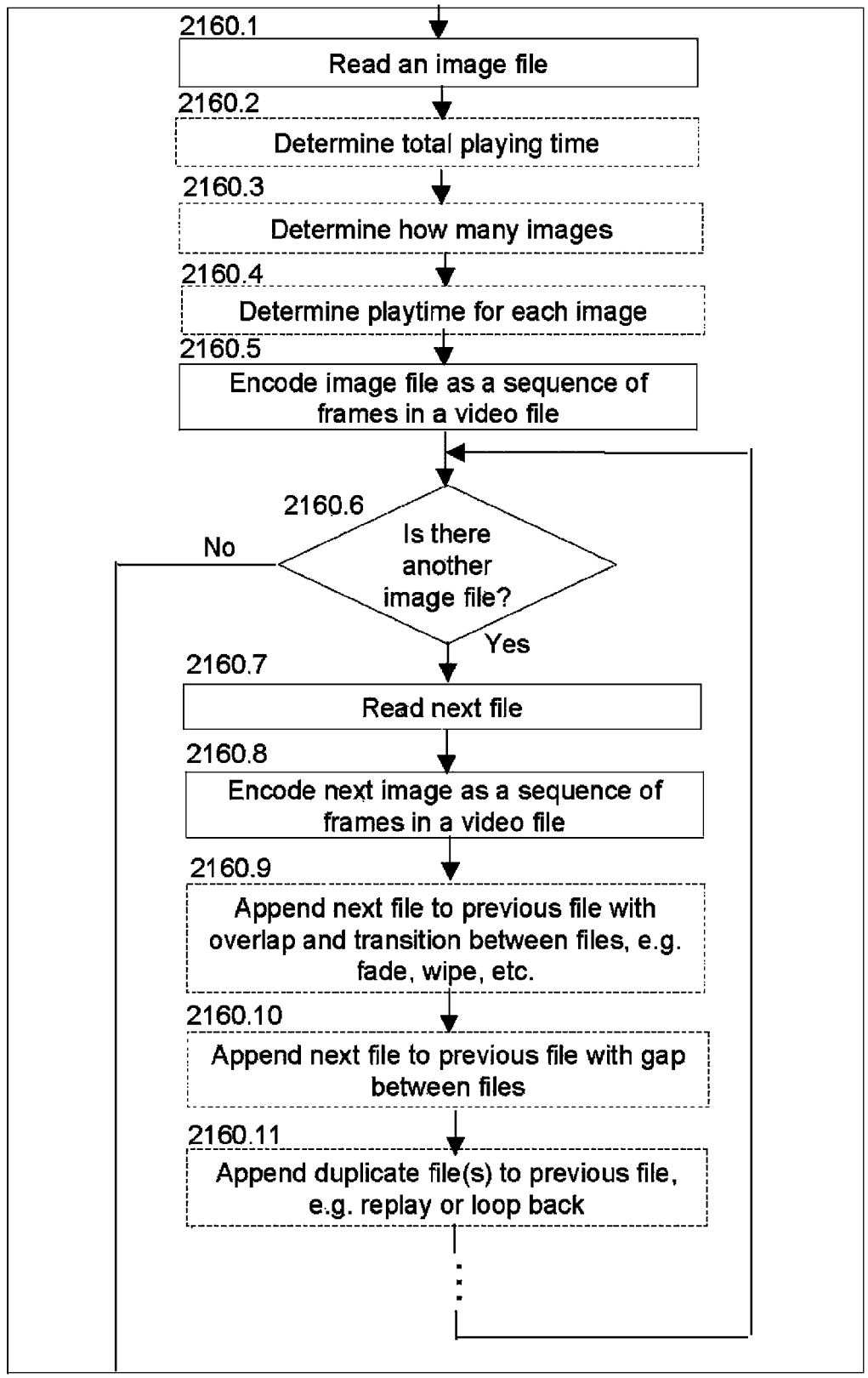

In FIG. 6E, the flowchart describes subprocess 2160 having the steps of reading an image file 2160.1, reading next image file 2160.3, and encode next image file to previous image file 2160.4. The process has the following additional and/or alternative steps of making a transition, e.g. fade, wipe, etc. between image files 2160.5, leaving a gap between the previous and next files 2160.6, and encoding a duplicate of the previous file 2160.7.

Figure 6F:
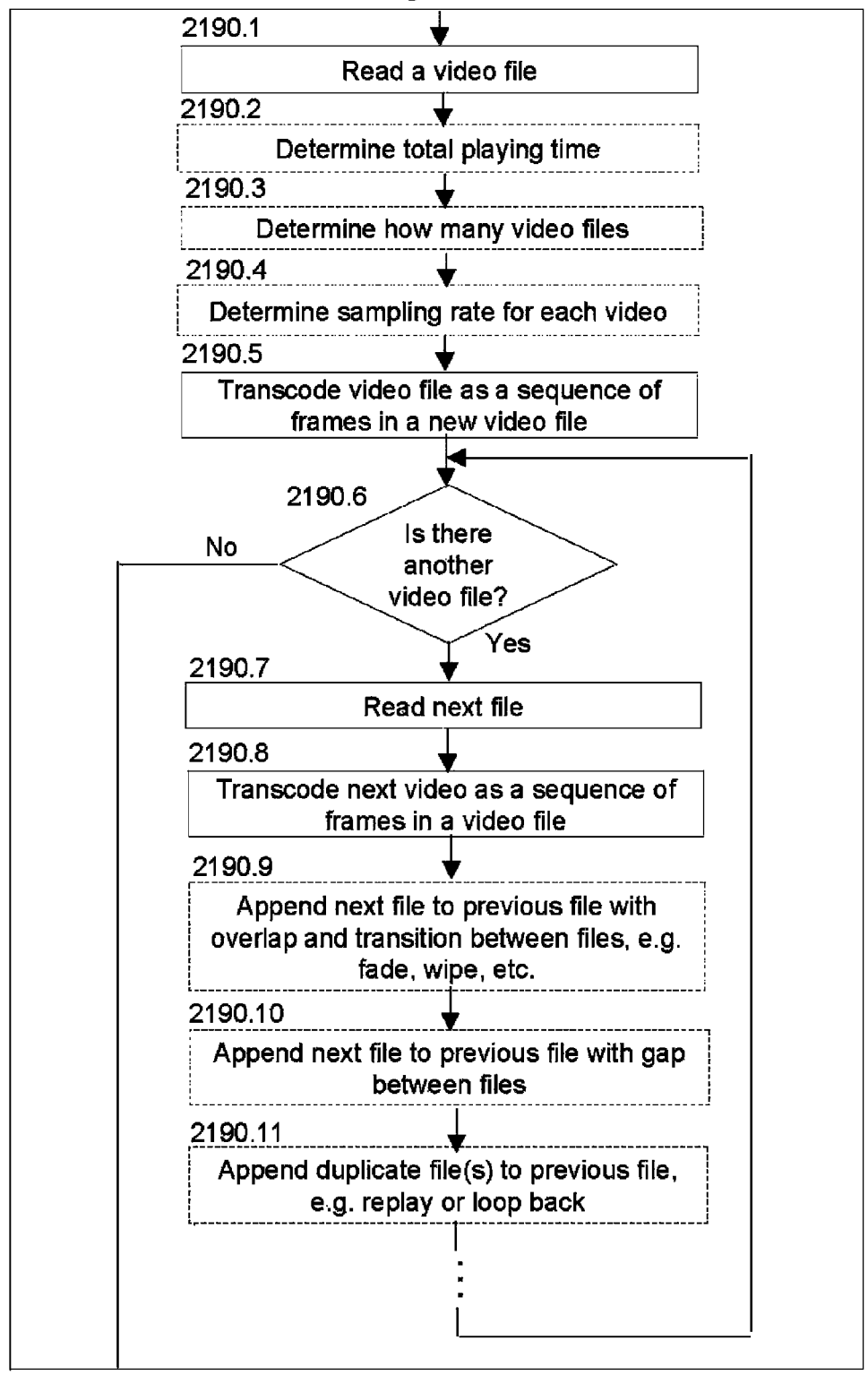

In FIG. 6F, the flowchart describes subprocess 2190 having the steps of reading a video file 2190.1, reading next video file 2190.3, and append next video file to previous video file 2190.4. The process has the following additional and/or alternative steps of overlapping the next file with previous file 2190.5, leaving a gap between the previous and next files 2190.6, and encoding a duplicate of previous file 2190.7. Alternatively, subprocess 2190 may involve preparing multiple media files to be compatible formats and issuing a command to concatenate these multiple files in order to have a single resulting media file.

Figure 6G:
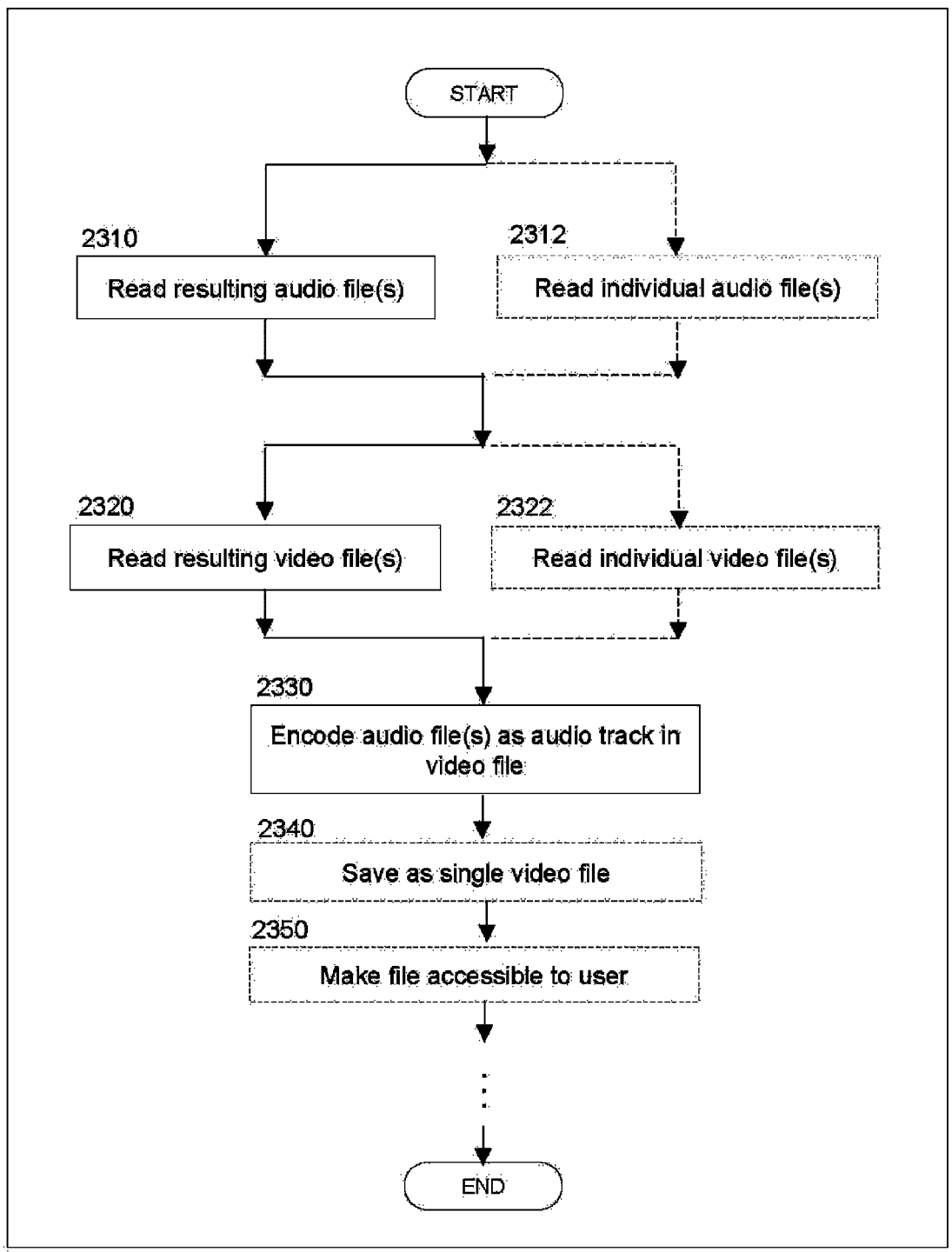
FIG. 6G is a flowchart of a subprocess for combining one or more video file(s) with one or more audio file(s).

In FIG. 6G, the flowchart describes subprocess 2300 having the steps of reading a resulting audio file 2310, reading a resulting video file 2320, and encoding audio file as audio track in video file 2330. The process has the following additional and/or alternative steps of reading an individual 2312, reading and individual video file 2322, saving resulting media file 2340, and/or making the file accessible to user 2350. Alternatively, subprocess 2300 may involve preparing multiple media files to be compatible formats and issuing a command to concatenate these multiple files in order to have a single resulting media file.

Figure 6H:
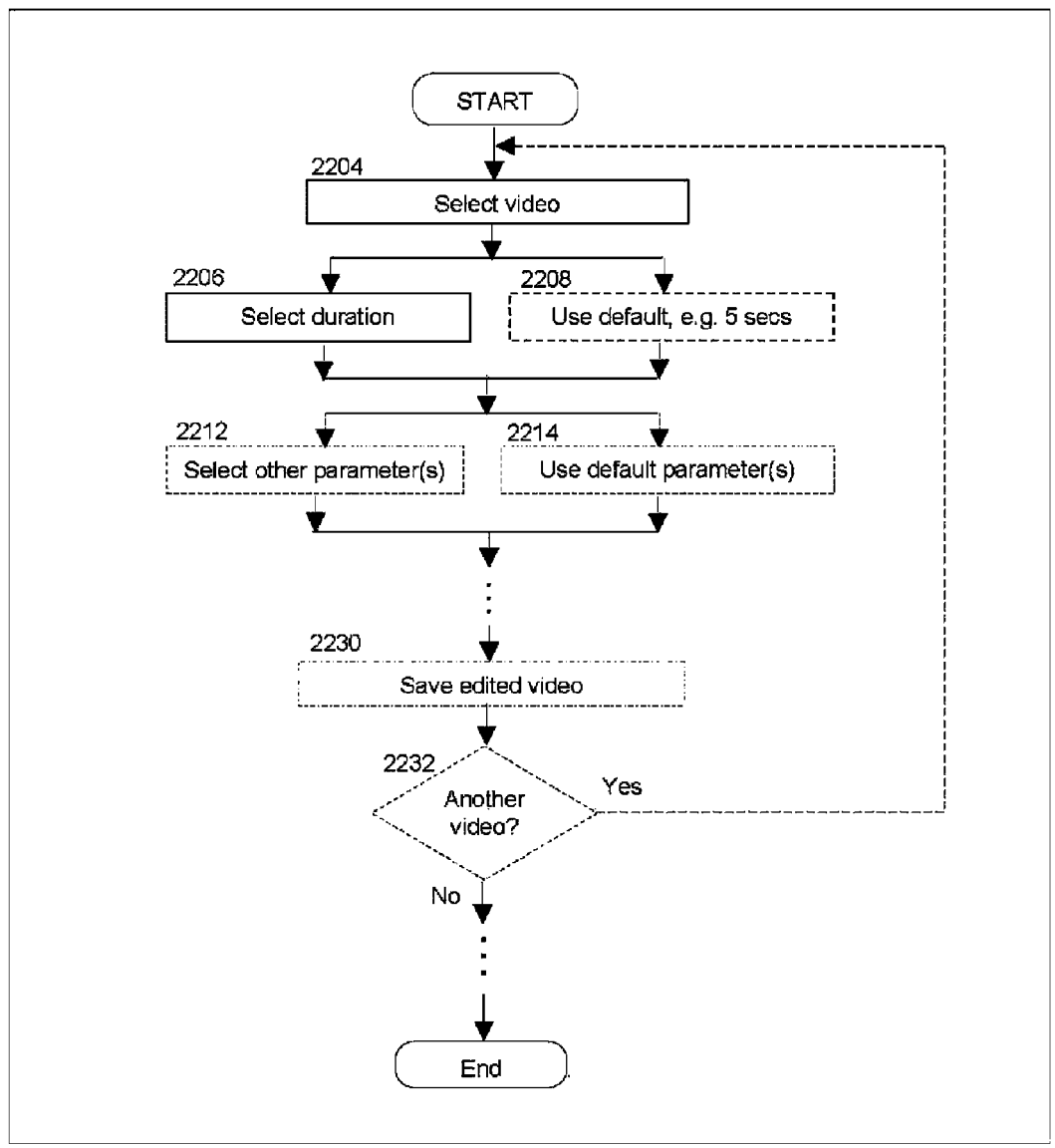
FIGS. 6H through 6M are flowcharts of alternative processes for editing media file(s) and/or searching for media files from a mobile interface and then sending the edited or resulting media file(s) to mobile devices.

In FIG. 6H, the flowchart describes process 2200 for editing a video or other media file (e.g. creating a video clip) having the steps of selecting a video 2204 and selecting a duration 2206. In one embodiment, the process has the alternative step of using a default duration 2208. A default duration may be any length of time. For example, the default duration may be any duration, e.g. 5, 10, 15, 30 sec or even longer. In another embodiment, the process has the additional step of saving the media clip 2230. In another embodiment, the process has the additional step of determining if there is another video or media file 2232. In still other embodiments, the process has the additional and/or alternative steps of selecting other parameter(s) 2212 or using a default parameter 2214. For example, other parameter(s) may be frame size, frame rate, bit rate, video only, soundtrack only, black & white, and so on. The default values may be global defaults for all users or defaults for the individual user, a class of users, or so on. For example, if a default is for an individual user, the default may be selected by user or determined automatically based on various factors such as media type, user preferences, behavior, demographics, etc. For example, if default is for a class of users, the default is typically determined automatically based on users of a particular carrier, a particular device, or type of user account. In operation, the process can be implemented by an ordinary person skilled in the art using one or more utilities such as FFMPEG (available at http://ffmpeg.mplayerhq.hu/index.html).

Figure 6I:
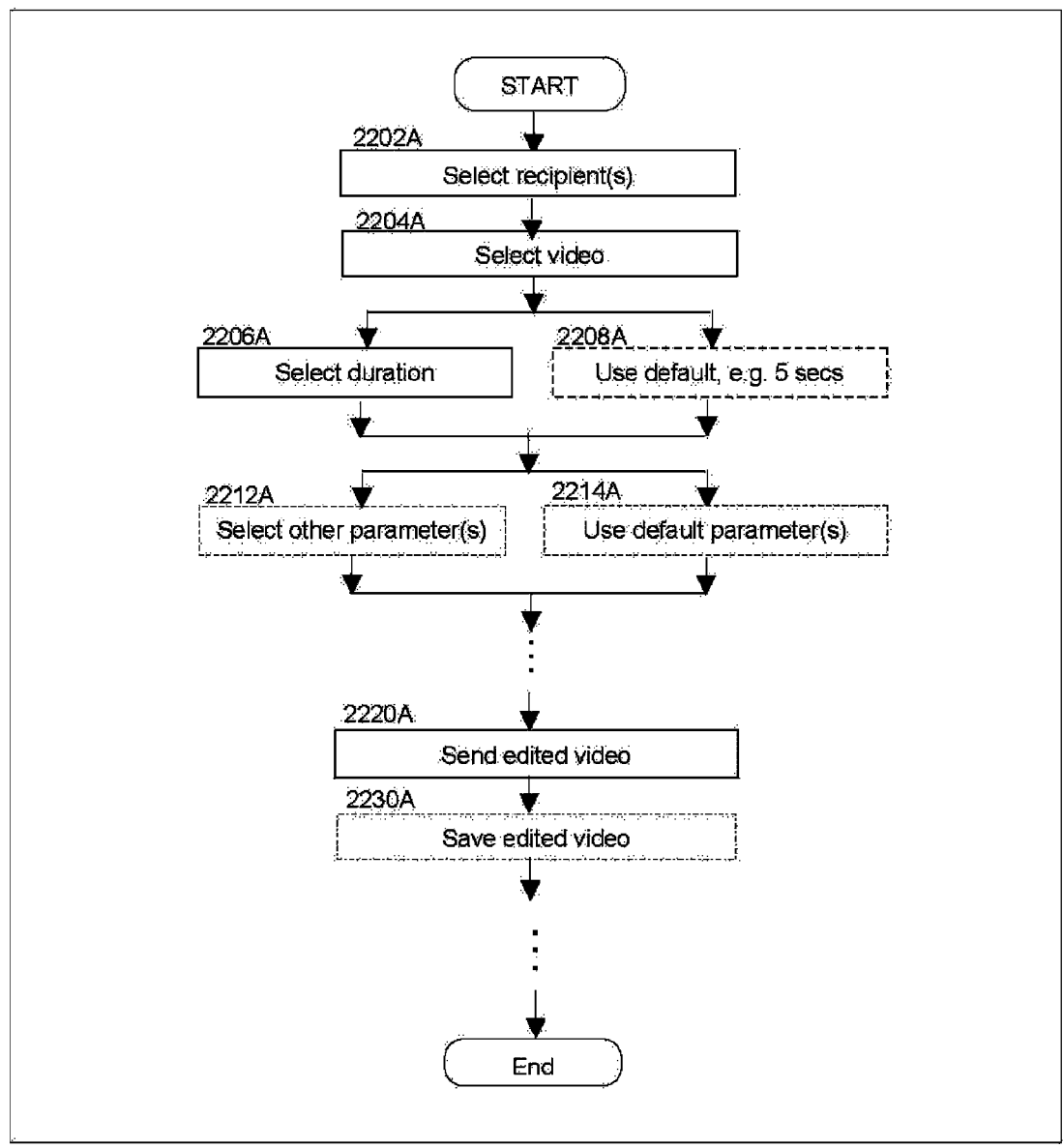

In FIG. 6I, the flowchart describes process 2200A for editing a video or other media file (e.g. creating a video clip) and sending the edited media file to one or more recipient(s) having the steps of selection a video selecting a video 2204A and selecting a duration 2206A. In one embodiment, the recipient(s) of the edited media file are pre-determined. For example, the recipient(s) may be the user alone, a group of recipients determined the user, e.g. friends, family or other group of recipients pre-determined by the user. In another embodiment, the process has the alternative step of the user selecting one or more recipients 2202A. For example, the recipients may be mobile phone users, the recipients are recipients of email, recipients of IM, and so on. In another embodiment, the process has the alternative step of using a default duration 2208A. For a discussion of default duration, see above. In another embodiment, the process has the additional step of sending the video or media clip 2220A. For example, the media clip may be sent to a mobile phone as part of an MMS message to a mobile phone and/or as an email to an email address to any device or by other forms of electronic message. In another embodiment, the process has the additional step of saving the media clip 2230A. In still other embodiments, the process has the additional and/or alternative steps of selecting other parameter 2212A or using a default parameter 2214A. For example, other parameter(s) may be frame size, frame rate, bit rate, video only, soundtrack only, black & white, and so on.

Figure 6J:
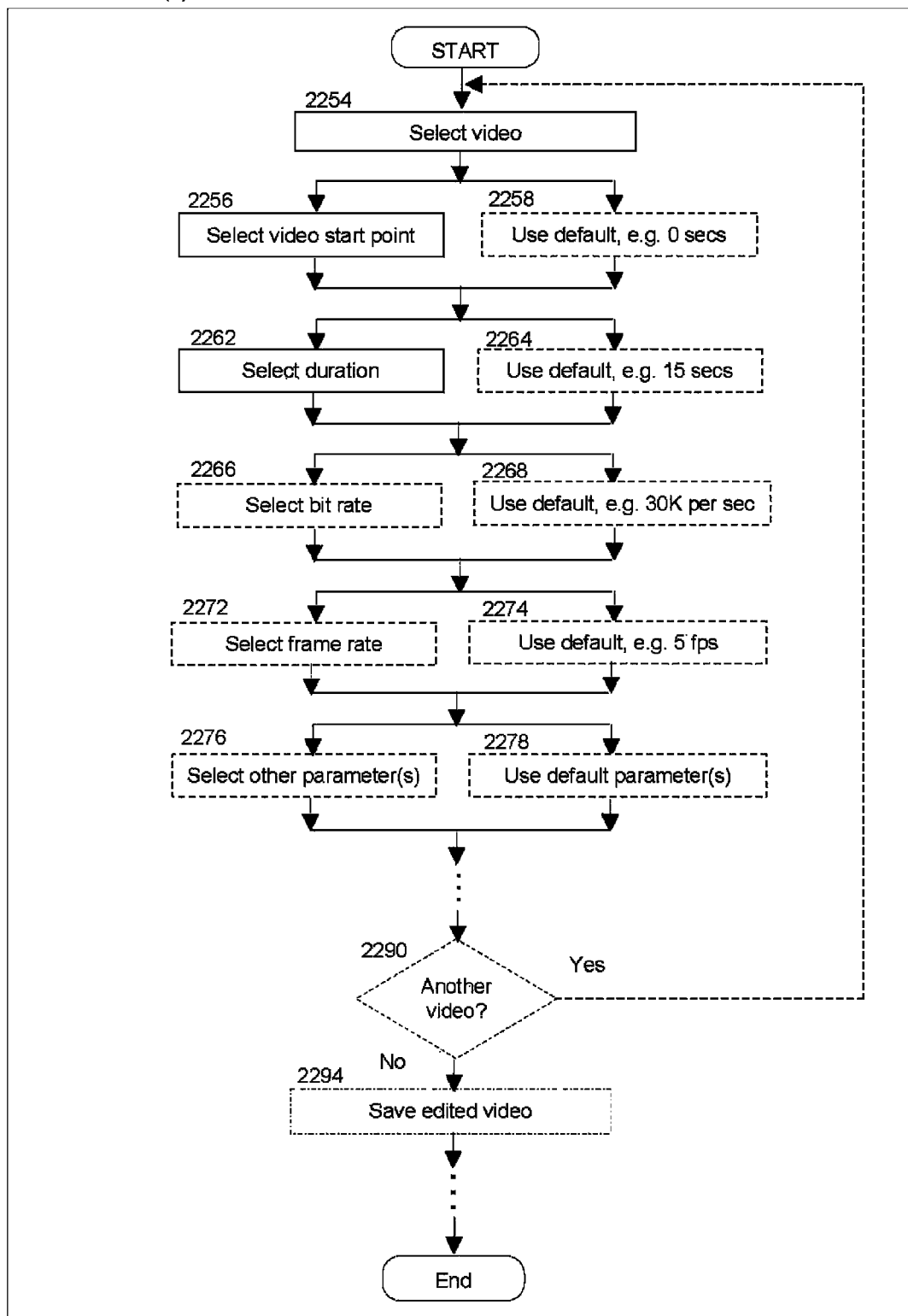

In FIG. 6J, the flowchart describes a generalized process 2250 for editing a video or other media file (e.g. transcoding a full length editing video, creating a video clip, or so on) having the steps of selecting a video 2254, selecting a start point 2256, and selecting a duration 2262. The start point may be any point in a media file and the duration may be any length of time. In one embodiment, the process has the alternative step of using a default video start point 2258. A default video start point may be any point during the media file. For example, the default start point may be 0 secs, 1 sec, 2 sec, and so on. In another embodiment, the process has the alternative step of using a default duration 2262. A default duration may be any length of time. For example, the default duration may be any duration, e.g. 5, 10, 15, sec or even longer. The default duration may be a global default for all users or a default for the individual user, a class of users, or so on. If a default for an individual user, the default may be selected by user or determined automatically based on various factors such as media type, user preferences, behavior, demographics, etc. In other embodiments, the process may have the additional and/or alternative steps of selecting a bit rate 2266 and/or selecting a frame rate 2272. In other embodiments, the process may have alternative steps of using a default bit rate 2268 and/or using a default frame rate 2274. The default bit rate can be any bit rate including but not limited to 30 Kb per sec, 60 Kb per sec, 128 Kb per sec., and so on and the default frame rate can be any frame rate including 5 fps, 12 fps, 30 fps, and so on. In still other embodiments, the process has the additional and/or alternative steps of selecting one or more other parameter(s) 2276 or using default parameter(s) 2278. For example, other parameter(s) may be anything including frame size, video only, soundtrack only, black & white, and so on. The default values may be global defaults for all users or defaults for the individual user, a class of users, or so on. For example, if a default is for an individual user, the default may be selected by user or determined automatically based on various factors such as media type, user preferences, behavior, demographics, etc. For example, if default is for a class of users, the default is typically determined automatically based on users of a particular carrier, a particular device, or type of user account. In another embodiment, the process has the additional step of determining if there is another video or media file 2290. In another embodiment, the process has the additional step of saving the edits media file 2294.

Figure 6K:
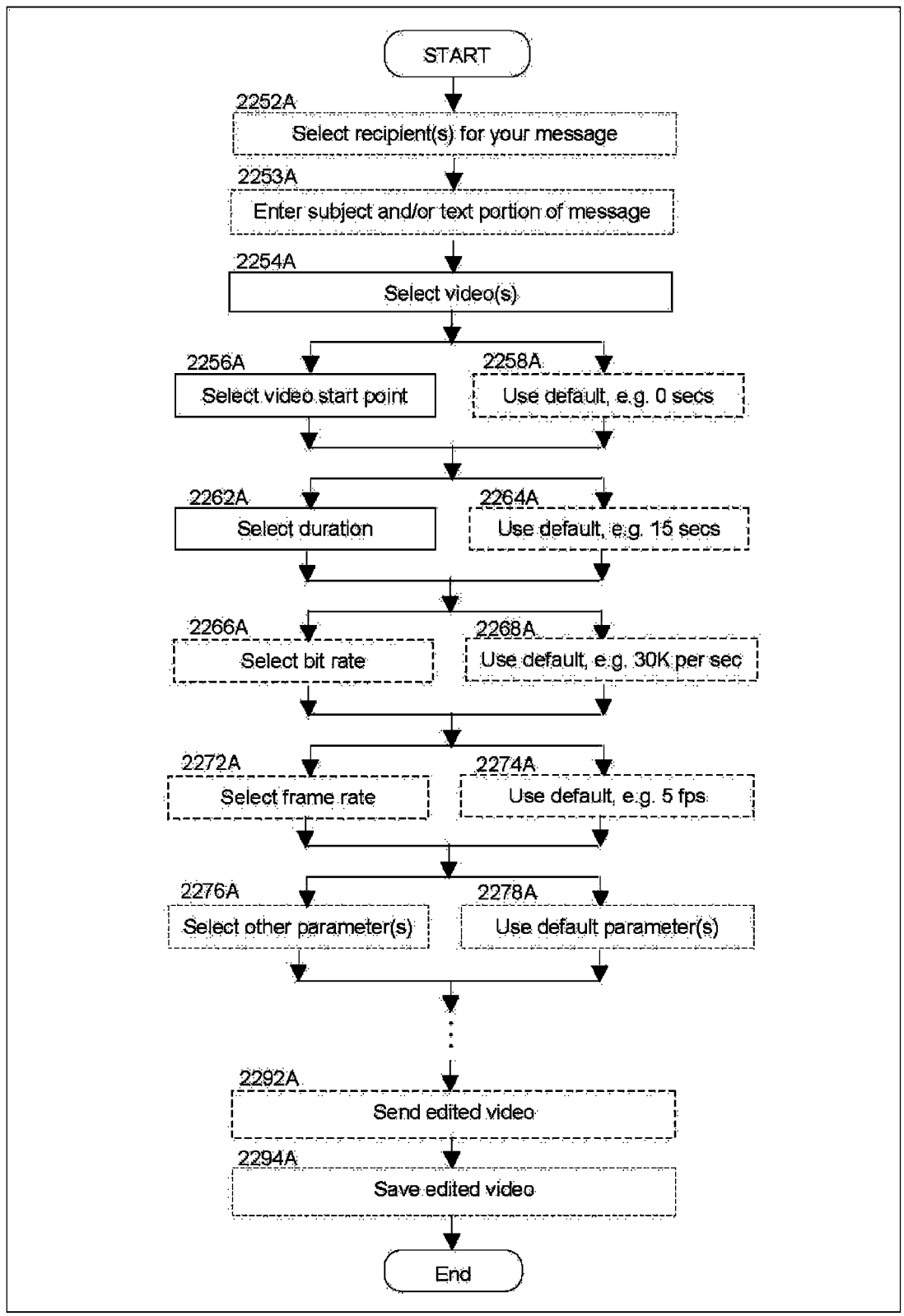

In FIG. 6K, the flowchart describes a process 2250A for editing a video or other media file (e.g. transcoding a full length editing video, creating a video clip, or so on) and sending the edited media file to one or more recipients having the steps of selecting a video 2254A, selecting a start point 2256A, and selecting a duration 2262A, and sending the edited file 2292A. In one embodiment, the recipient(s) of the edited media file are pre-determined. For example, the recipient(s) may be the user alone, a group of recipients determined the user, e.g. friends, family or other group of recipients pre-determined by the user. In one embodiment, the process has the alternative step of selecting one or more recipients 2252A. For example, the recipients may be mobile phone users, the recipients are recipients of email, recipients of IM, and so on. The start point may be any point in a media file and the duration may be any length of time. In one embodiment, the process has the alternative step of using a default video start point 2258A. A default video start point may be any point during the media file. For example, the default start point may be 0 secs, 1 sec, 2 sec, and so on. In another embodiment, the process has the alternative step of using a default duration 2262A. A default duration may be any length of time. For example, the default duration may be any duration, e.g. 5, 10, 15, 30 sec or even longer. The default duration may be a global default for all users or a default for the individual user, a class of users, or so on. If a default for an individual user, the default may be selected by user or determined automatically based on various factors such as media type, user preferences, behavior, demographics, etc. In other embodiments, the process may have the additional and/or alternative steps of selecting a bit rate 2266A and/or selecting a frame rate 2272A. In other embodiments, the process may have alternative steps of using a default bit rate 2268A and/or using a default frame rate 2274A. The default bit rate can be any bit rate including but not limited to 30 Kb per sec, 60 Kb per sec, 128 Kb per sec., and so on and the default frame rate can be any frame rate including 5 fps, 12 fps, 30 fps, and so on. In still other embodiments, the process has the additional and/or alternative steps of selecting one or more other parameter(s) 2276 or using default parameter(s) 2278. For example, other parameter(s) may be anything including frame size, video only, soundtrack only, black & white, and so on. The default values may be global defaults for all users or defaults for the individual user, a class of users, or so on. For example, if a default is for an individual user, the default may be selected by user or determined automatically based on various factors such as media type, user preferences, behavior, demographics, etc. For example, if default is for a class of users, the default is typically determined automatically based on users of a particular carrier, a particular device, or type of user account.

Figure 6L:
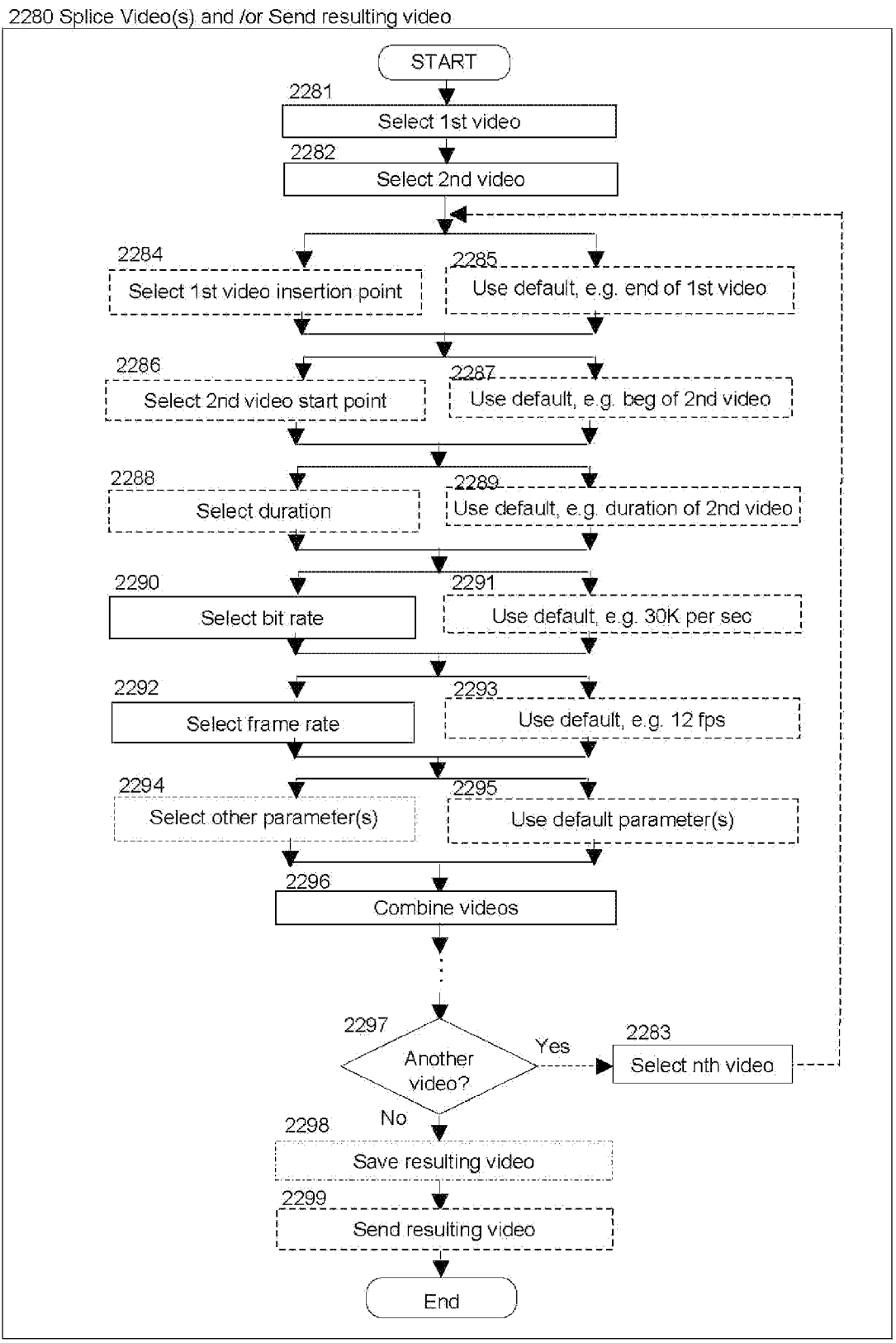

In FIG. 6L, the flowchart describes a process 2280 for splicing videos or other media files (e.g. full length videos, video clips or otherwise) having the steps of selecting a first video 2281, selecting a second video 2282, and selecting a bit rate 2290 or selecting a frame rate 2292. The bit rate can be any bit rate including but not limited to 30 Kb per sec, 60 Kb per sec, 128 Kb per sec., and so on and the frame rate can be any frame rate including 5 fps, 12 fps, 30 fps, and so on. In alternative embodiments, the process may have steps of selecting a first video insertion point 2284 and/or selecting a second video start point 2286 and/or selection a duration 2288. The default first video insertion point may be any point in a media file and the duration may be any length of time. In one embodiment, the process has the alternative step of using a default first video insertion point 2285. A default video start point may be any point during the media file. In one embodiment, the process has the alternative step of using a default second video start point 2287. A default second video start point may be any point during the media file. For example, the default start point may be 0 secs, 1 sec, 2 sec, and so on. In another embodiment, the process has the alternative step of using a default duration 2289. A default duration may be any length of time. For example, the default duration may be any duration, e.g. 5, 10, 15, 30 sec or even longer. The default duration may be a global default for all users or a default for the individual user, a class of users, or so on. If a default for an individual user, the default may be selected by user or determined automatically based on various factors such as media type, user preferences, behavior, demographics, etc. In other embodiments, the process may have alternative steps of using a default bit rate 2291 and/or using a default frame rate 2293. The default bit rate can be any bit rate including but not limited to 30 Kb per sec, 60 Kb per sec, 128 Kb per sec., and so on and the default frame rate can be any frame rate including 5 fps, 12 fps, 30 fps, and so on. In still other embodiments, the process has the additional and/or alternative steps of selecting one or more other parameter(s) 2294 or using default parameter(s) 2295. For example, other parameter(s) may be anything including frame size, video only, soundtrack only, black & white, and so on. The default values may be global defaults for all users or defaults for the individual user, a class of users, or so on. For example, if a default is for an individual user, the default may be selected by user or determined automatically based on various factors such as media type, user preferences, behavior, demographics, etc. For example, if default is for a class of users, the default is typically determined automatically based on users of a particular carrier, a particular device, or type of user account. In another embodiment, the process has the additional step of determining if there is another video or media file 2297 and selecting the nth video 2283. In another embodiment, the process has the additional step of saving the resulting media file 2298. In another embodiment, the process has the additional step of sending the resulting media file 2299.

Figure 6M:
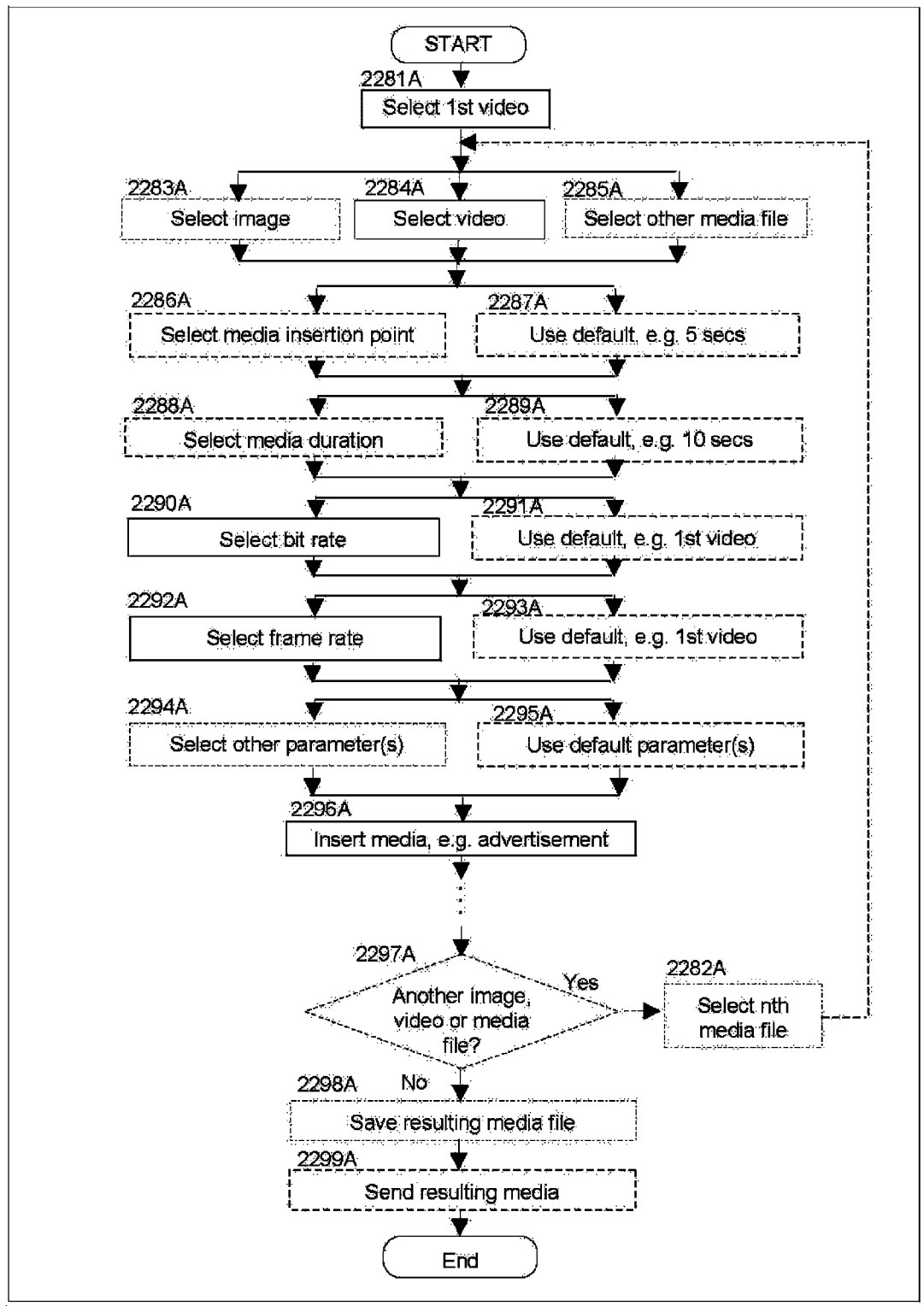

In FIG. 6M, the flowchart describes a process 2280A for inserting media in videos or other media files (e.g. full length videos, video clips or otherwise) and/or sending the resulting media file having the steps of selecting a first video 2284A, selecting a bit rate 2290A and/or selecting a frame rate 2292A, and inserting media 2296A. The bit rate can be any bit rate including but not limited to 30 Kb per sec, 60 Kb per sec, 128 Kb per sec., and so on and the frame rate can be any frame rate including 5 fps, 12 fps, 30 fps, and so on. In other embodiments, the process has the alternative step of selecting an image 2283A or selecting other media file 2285A. The media to be inserted can be media in any form or from any source. For example, the media can be in the form of image (s), audio, or video and can be from the user's own media, clips of media from other sources, and/or advertisements. In other embodiments, the process may have steps of selecting a first media insertion point 2286A and/or selecting a media duration 2288A. The default first media insertion point may be any point in a media file and the duration may be any length of time. In one embodiment, the process has the alternative step of using a default first media insertion point 2287A. A default media start point may be any point during the media file. In one embodiment, the process has the alternative step of using a default second media start point 2287A. A default second media start point may be any point during the media file. For example, the default start point may be 0 secs, 1 sec, 2 sec, and so on. In another embodiment, the process has the alternative step of using a default media duration 2288A. A default media duration may be any length of time. For example, the default media duration may be any duration, e.g. 5, 10, 15, 30 sec or even longer. The default duration may be a global default for all users or a default for the individual user, a class of users, or so on. If a default for an individual user, the default may be selected by user or determined automatically based on various factors such as media type, user preferences, behavior, demographics, etc. In other embodiments, the process may have alternative steps of using a default bit rate 2291A and/or using a default frame rate 2293A. The default bit rate can be any bit rate including but not limited to 30 Kb per sec, 60 Kb per sec, 128 Kb per sec., and so on and the default frame rate can be any frame rate including 5 fps, 12 fps, 30 fps, and so on. In still other embodiments, the process has the additional and/or alternative steps of selecting one or more other parameter(s) 2294A or using default parameter(s) 2295A. For example, other parameter(s) may be anything including frame size, video only, soundtrack only, black & white, and so on. The default values may be global defaults for all users or defaults for the individual user, a class of users, or so on. For example, if a default is for an individual user, the default may be selected by user or determined automatically based on various factors such as media type, user preferences, behavior, demographics, etc. For example, if default is for a class of users, the default is typically determined automatically based on users of a particular carrier, a particular device, or type of user account. In another embodiment, the process has the additional step of determining if there is another image, video or media file 2297A and selecting the nth media file 2282A. In another embodiment, the process has the additional step of saving the resulting media file 2298A. In another embodiment, the process has the additional step of sending the resulting media file 2299A.

In operation, in FIGS. 6H through 6M show processes for editing media that include one or more web-based editing tools to perform clipping, splicing, and general editing of video and other media files. The media file(s) to be edited may come from varied sources (e.g. user's content uploaded from user's computer, other digital content, or advertising content, and so on) and may be stored in the media center prior to editing. Alternatively, the media file(s) to be edited may be dynamically retrieved from online sources and not from files stored in the media center. In addition, the media file(s) to be edited may be dynamically edited and sent to recipients on the fly. As shown in FIGS. 1A through 1C, 2A through 2C, and 3A through 3C, the edited video or other media file(s) may include inserted audio, image(s), or video insertions in at any point in video as compared to insertion at the beginning (aka "pre-roll") or insertion at the end (aka "post-roll"). As shown in FIGS. 3D and 3E, the edited video and other media files may include partial overlay(s), split screens, subtitles, filters (e.g. black & white), and effects such as "voice over" using other editing tools. In a typical embodiment, an advertisement or other promotion is inserted in a media file. In still other embodiments, the system can also incorporate ads in media dynamically or "on the fly". For example, an advertisement could be inserted in a video or other media file that is selected by a user at the time of viewing or sending to a device. In another example, the advertisement could be inserted in videos or other media files in advance, e.g. by batch application or robot. Further, the selection of relevant advertising can be accomplished with or without information about the specific user. In particular, the system can select an advertisement based on a user's profile or preferences in order to ensure relevance to that user. For example, the system could select an advertisement based on the user's demographic characteristics, e.g. 18-34 year old, life stage, etc. or based on user's preferences, e.g. comedy, outdoors, travel, etc. Alternatively, the system can select an advertisement based on the selected media itself. For example, the system can select an advertisement using the category, title, and/or description of the media selected. In one embodiment, a database would include one or more possible keywords associated with each advertisement. By querying the database using keywords from the title and/or description of a media file, a relevant advertisement can be retrieved. In another embodiment, a database would include one or more categories, e.g. SCI-FI, sports, etc. associated with an advertisement. By querying the database using a category of the media file, a relevant advertisement can be retrieved.

Figure 7A:
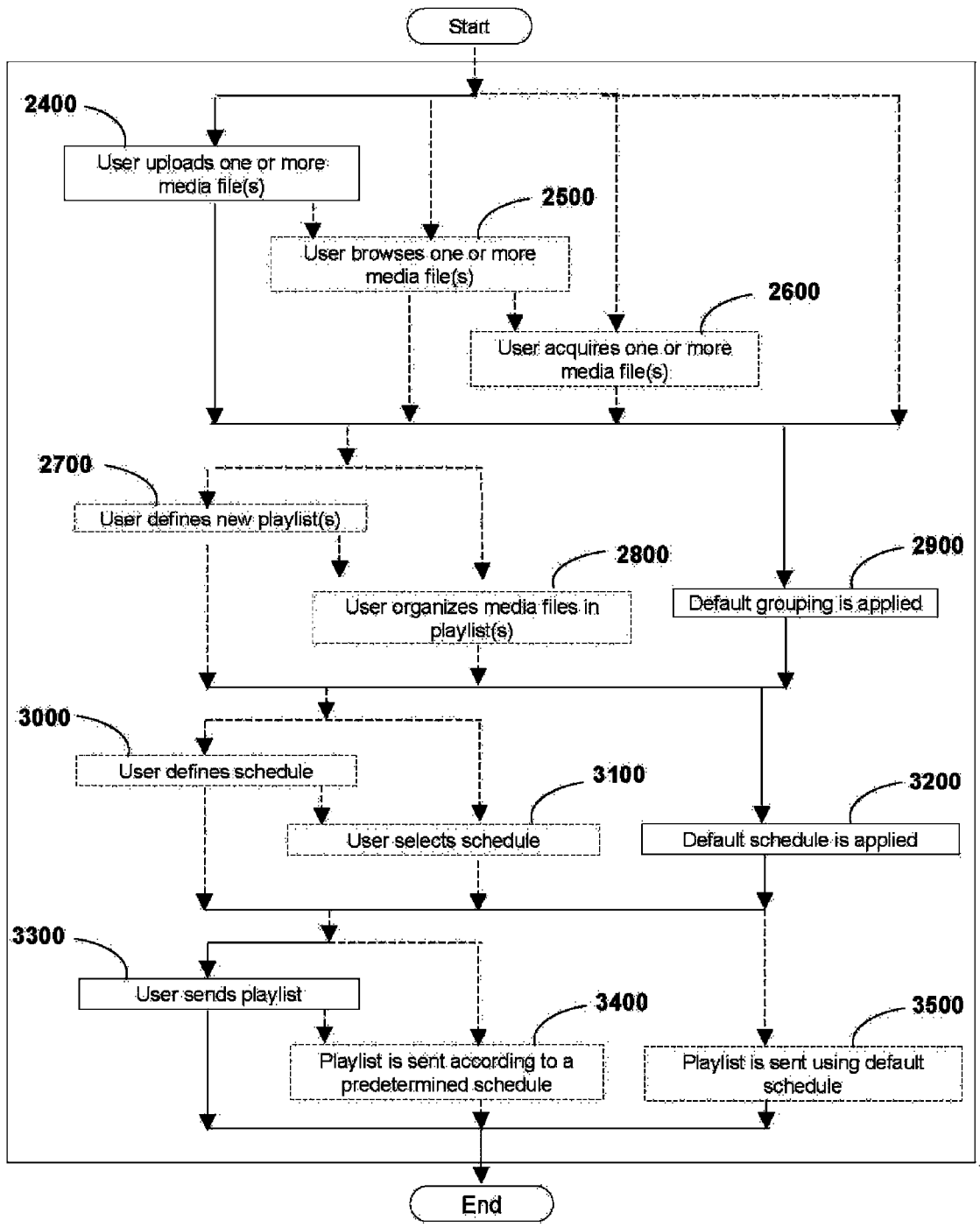
FIG. 7A is a flowchart of a combination of processes for obtaining media (by uploading, browsing and/or acquiring media), organizing media files (by grouping and/or arranging media items in playlists), scheduling transmission of media files, and transmitting playlists to mobile devices and/or other electronic devices.

In FIG. 7A, the methods and systems of the invention includes a combination of processes for obtaining media files (by uploading, browsing and/or acquiring media), defining new playlist(s), organizing media files (by grouping and/or arranging media items in playlists), scheduling transmission of media file(s), and/or transmitting playlists to mobile devices. One embodiment of the invention includes subprocesses 2400, 2800, 3100 and 3400. For example, a user uploads one or more media files from that user's personal media collection to that user's online repository or media center, adds the media file(s) to a playlist, and schedules transmission of the playlist to that user's mobile phone, and playlist is sent to that user's mobile phone using selected schedule. Another embodiment includes subprocesses 2600, 2800, 3100 and 3300. For example, a user purchases one or more media file(s), saves the media file(s) to that user's repository or media center, user organizes media file(s) in a predefined or default playlist, e.g. "New Additions" or "New Releases", a predefined or default schedule is applied, and playlist is sent to that user's mobile phone using the default schedule. In still another embodiment the invention includes subprocesses 2500, 2800, 3200 and 3500. For example, a user browses one or more media file(s), organizes the file(s) in one or more playlist(s), a default schedule is applied, and the playlist(s) are sent using the default schedule. In a further embodiment, an additional step may include a user defining one or more new playlist(s). In still another embodiment, one or more of featured or promoted media file(s) are added to one or more playlist(s). In yet still another embodiment, shortened versions or "clips" of user selected or featured media file(s) are added to one or more playlist(s). In yet still another embodiment, one or more advertisements are added to one or more playlist(s).

Figure 7B:
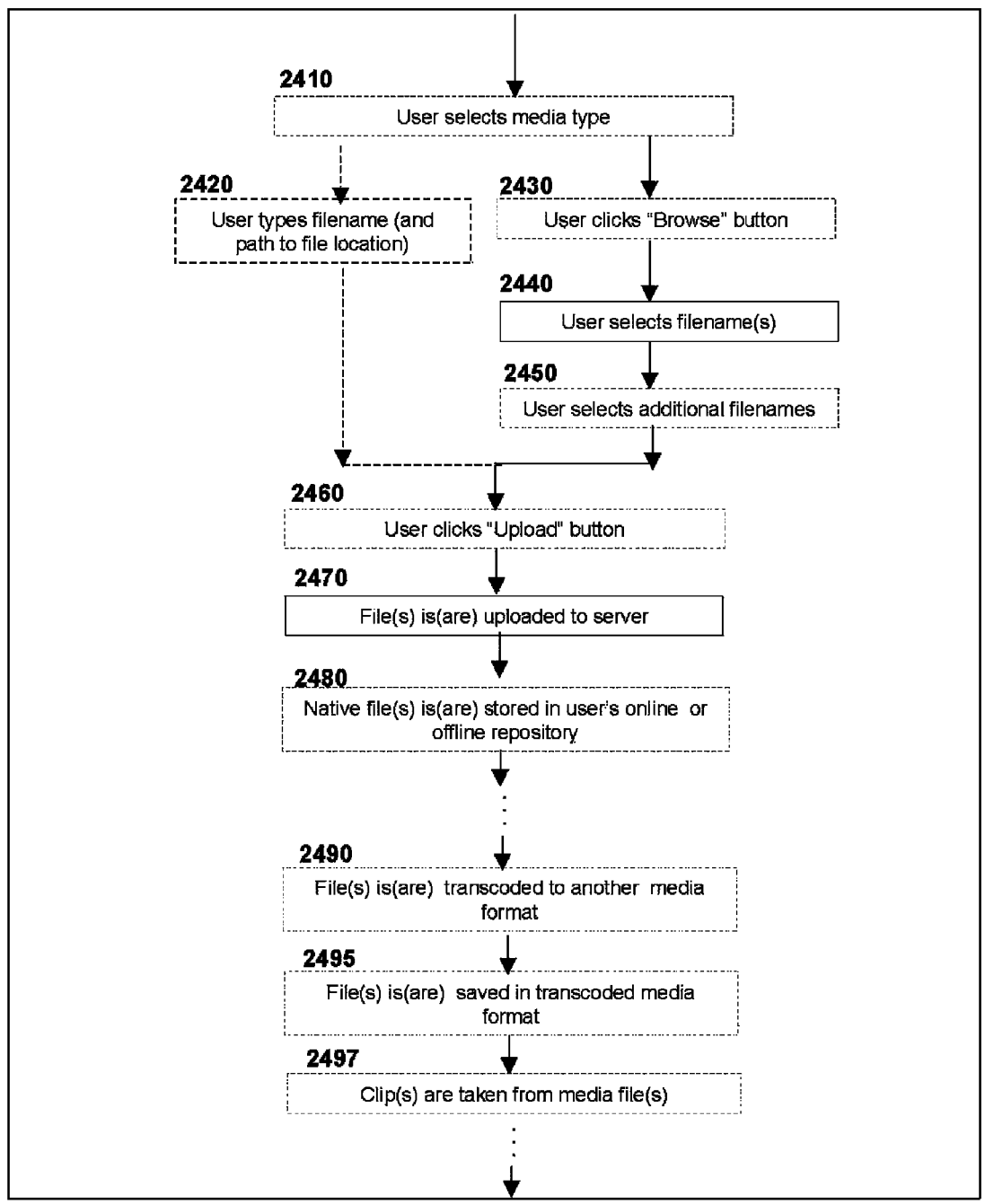
FIG. 7B is a flowchart of a process to upload media file(s) to an online repository.

In FIG. 7B, a process comprises uploading one or more media file(s) from a user's computer 110 or mobile device 100 to an online repository or media center stored on a server 200. The process includes the steps 2430, 2440, and 2470. The process may also include but is not limited to alternative and/or additional steps 2410, 2420, 2450, 2460, 2480, 2490, 2495, and/or 2497. In one embodiment, the user's computer 110 is a desktop computer containing one or more digital media files that are playable using software such as Real-Player made by Real Networks, Inc. or Windows Media Player made by Microsoft Corporation. In another embodiment, mobile device 100 is a notebook computer or a handheld computer containing one or more digital media files. In still another embodiment, mobile device 100 is a mobile phone containing digital media files.

In various embodiments of the invention, in addition to uploads of media files by a mobile phone user, media files may be uploaded by advertisers, media companies, content developers, and other parties. The files may transferred by any means including web forms, FTP, email, etc. When transferred, the media files are typically processed and resaved in formats compatible with mobile devices. Such processing may include transcoding of media files. In addition, media files may be processed by sampling of extracting, e.g. video clips or individual images, and saved as separate media files. Further, the media files also be stored in their native file formats for any subsequent uses, e.g. resampling, tracking, etc. Although the media files may be stored in a location which is web accessible, the media files may also be stored in a location accessible via the internet or other network but not necessarily web accessible. For example, the media files may be stored in a database and dynamically retrieved and posted in mobile webpages.

Figure 7C:
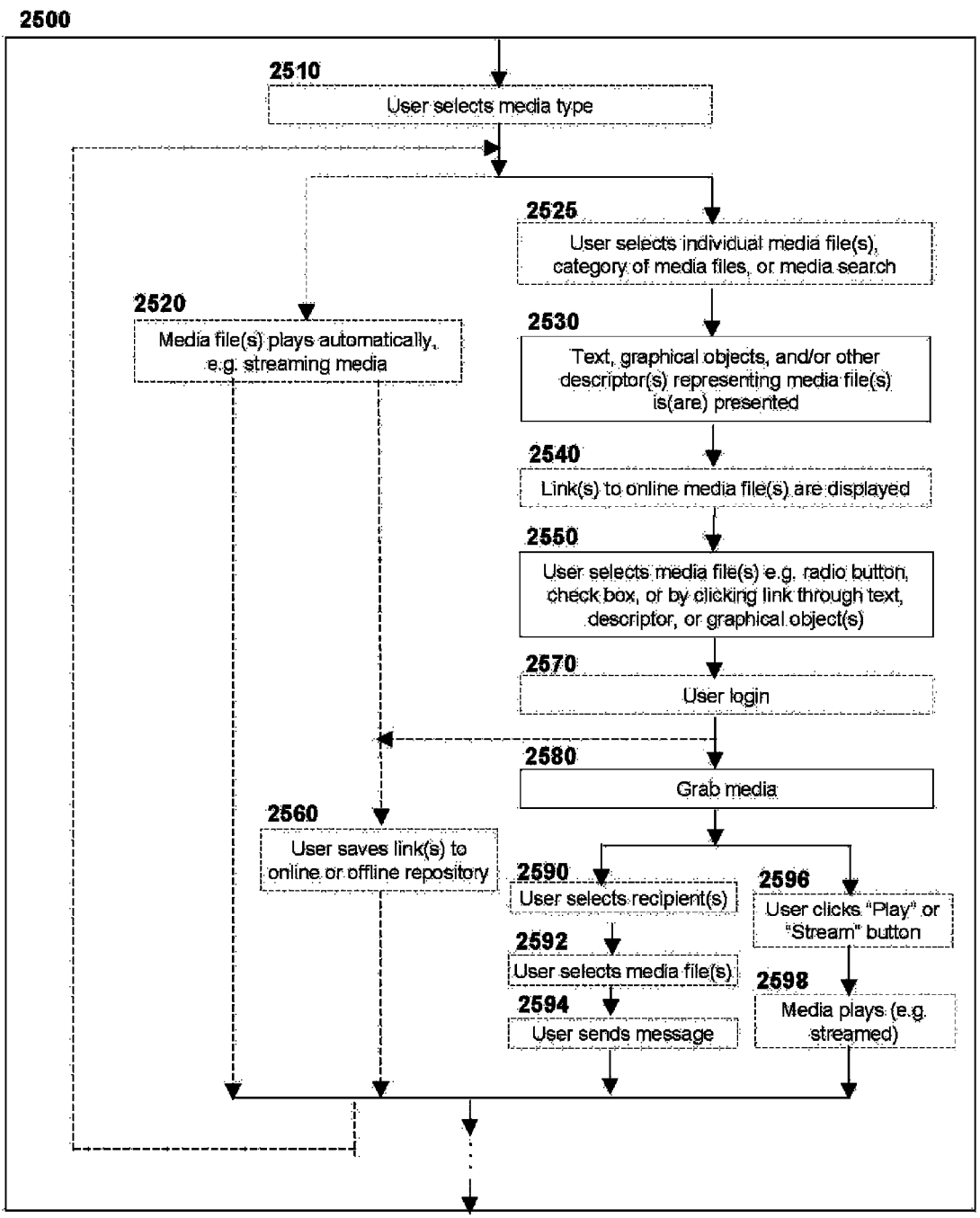
FIG. 7C is a flowchart of a process to browse media file(s) and/or play media and/or send a multimedia message and/or save links to a database.

In FIG. 7C, the process comprises browsing one or more media file(s) and/or saving media file(s) in an online or offline repository stored on a computer 110, a mobile device 100, or a server 200. The process includes the steps of presenting descriptors representing one or more media file(s) 2530, user selecting media file(s) 2550, and grabbing a selected media 2580. In one embodiment, descriptor(s) is(are) text. In another embodiment, descriptor(s) is(are) image(s) or graphical object(s). In still another embodiment, descriptor(s) have links to other files and/or information. The process may also include alternative and/or additional steps 2510, 2520, 2525, 2540, 2560, 2570, 2590 and/or 2596. In various embodiments, the process includes the step of a user selecting media 2525 (e.g. a user selecting individual media files media, a user selecting a category of media files, or media search). Text or graphical objects or other identifier(s) representing each media item are presented 2530 or 2630 to the user. In one embodiment, the identifiers of each item in the search results may be images and titles of video clips for the user to select a media file (image, video, or song) to save or send a clip. For example, the image may be a thumbnail of an image; or a still taken from a single frame of a video; a still comprising multiple (2, 4, 6, 8 . . . ) frames from a video such as a frame @ 1 sec, 5 sec, 10 sec, and 15 sec; or a still comprising multiple frames at the beginning, one quarter point, midpoint, and three quarters point; or an image derived from the video such as superimposed; or an image from another source such as an iconographic or an advertisement.

Figure 7D:
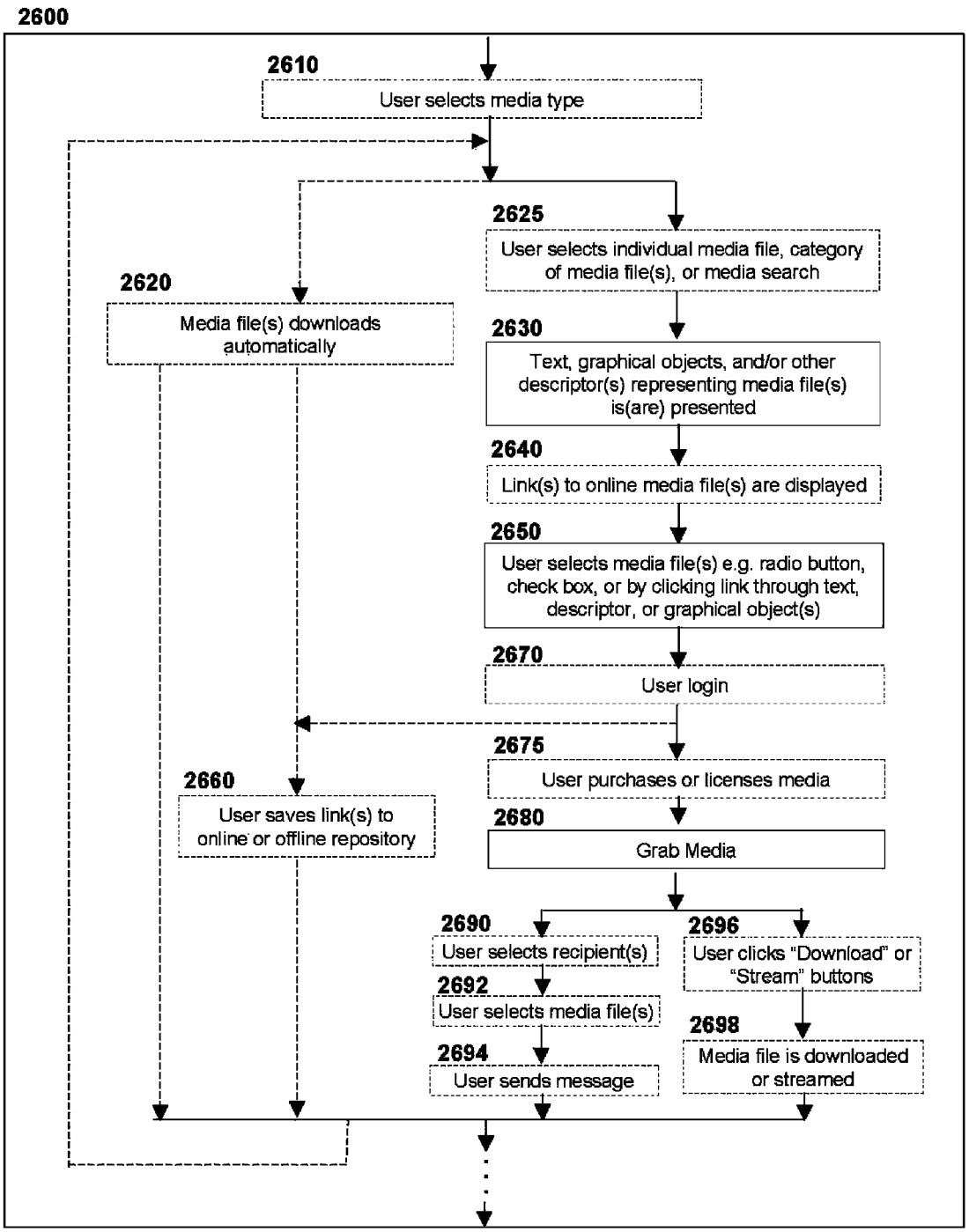
FIG. 7D is a flowchart of a process to acquire media file(s) and/or play media and/or download media and/or send a multimedia message and/or save copies to an online or offline repository or media center.

In FIG. 7D, the process comprises purchasing one or more media file(s) and/or saving media file(s) in an online or offline repository stored on a computer 110, a mobile device 100, or a server 200. The process includes the steps of presenting descriptors representing one or more media file(s) 2630, user selecting media file(s) 2650, and grabbing a selected media 2680. In one embodiment, descriptor(s) is(are) text. In another embodiment, descriptor(s) is(are) image(s) or graphical object(s). In still another embodiment, descriptor(s) have links to other files and/or information. The process may also include alternative and/or additional steps 2610, 2620, 2625, 2640, 2660, 2670, 2675, 2690 and/or 2696. In various embodiments, the process includes the step of a user selecting media 2625 (e.g. a user selecting individual media files media, a user selecting a category of media files, or media search).

Figure 7E:
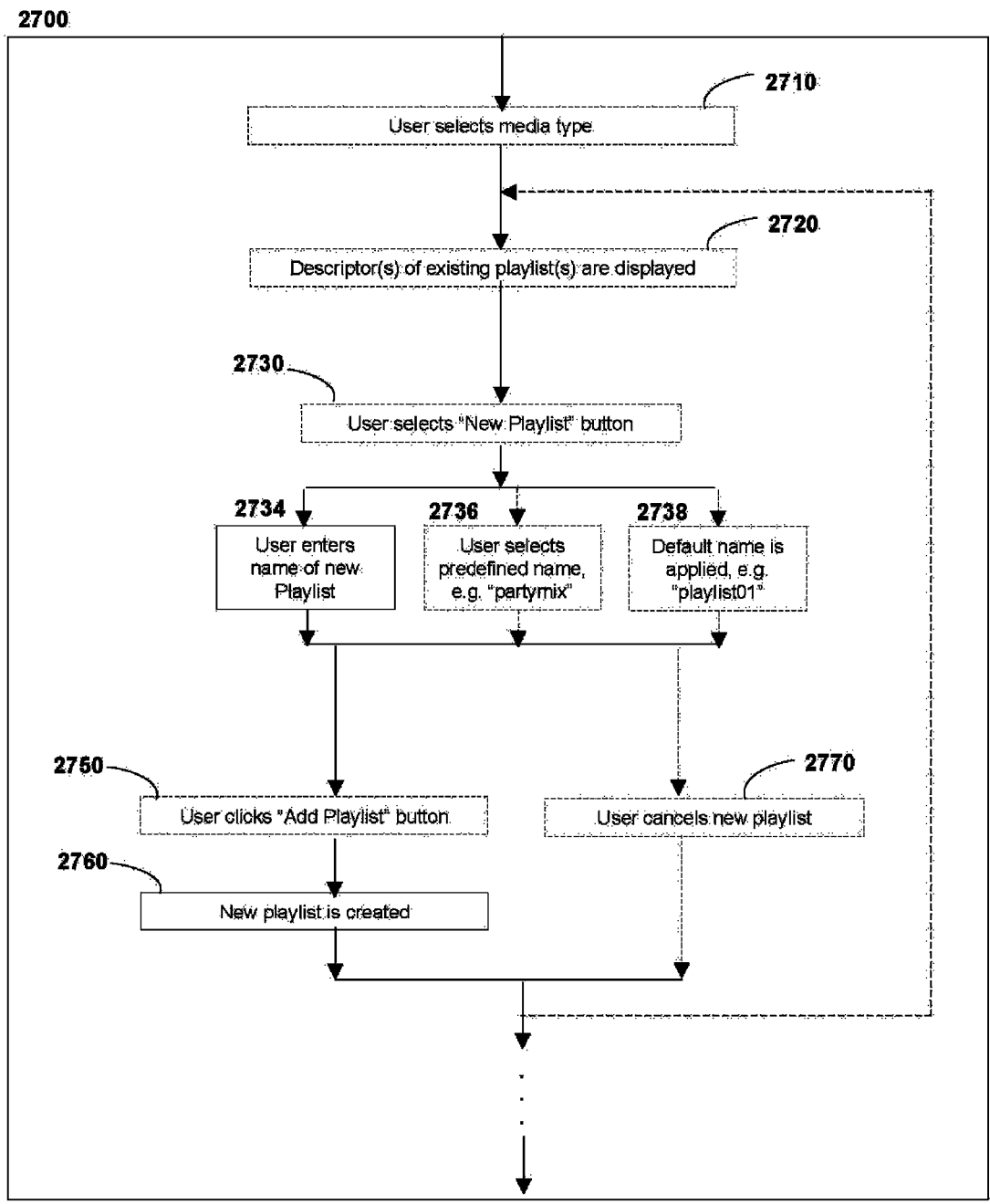
FIG. 7E is a flowchart of a process to define a new playlist.

In FIG. 7E, a process comprises defining a new playlist. The process includes the steps of 2734 and 2760. The process may also include alternative and/or additional steps 2710,

2720, 2730, 2736, 2738, 2750 and/or 2770. In one embodiment, a name of a new playlist is typed by the user. In another embodiment, the name of a new playlist is selected from predefined list of suggested names, e.g. "partymix". In still another embodiment, a default name is applied to the new playlist, e.g. "playlist01".

Figure 7F:
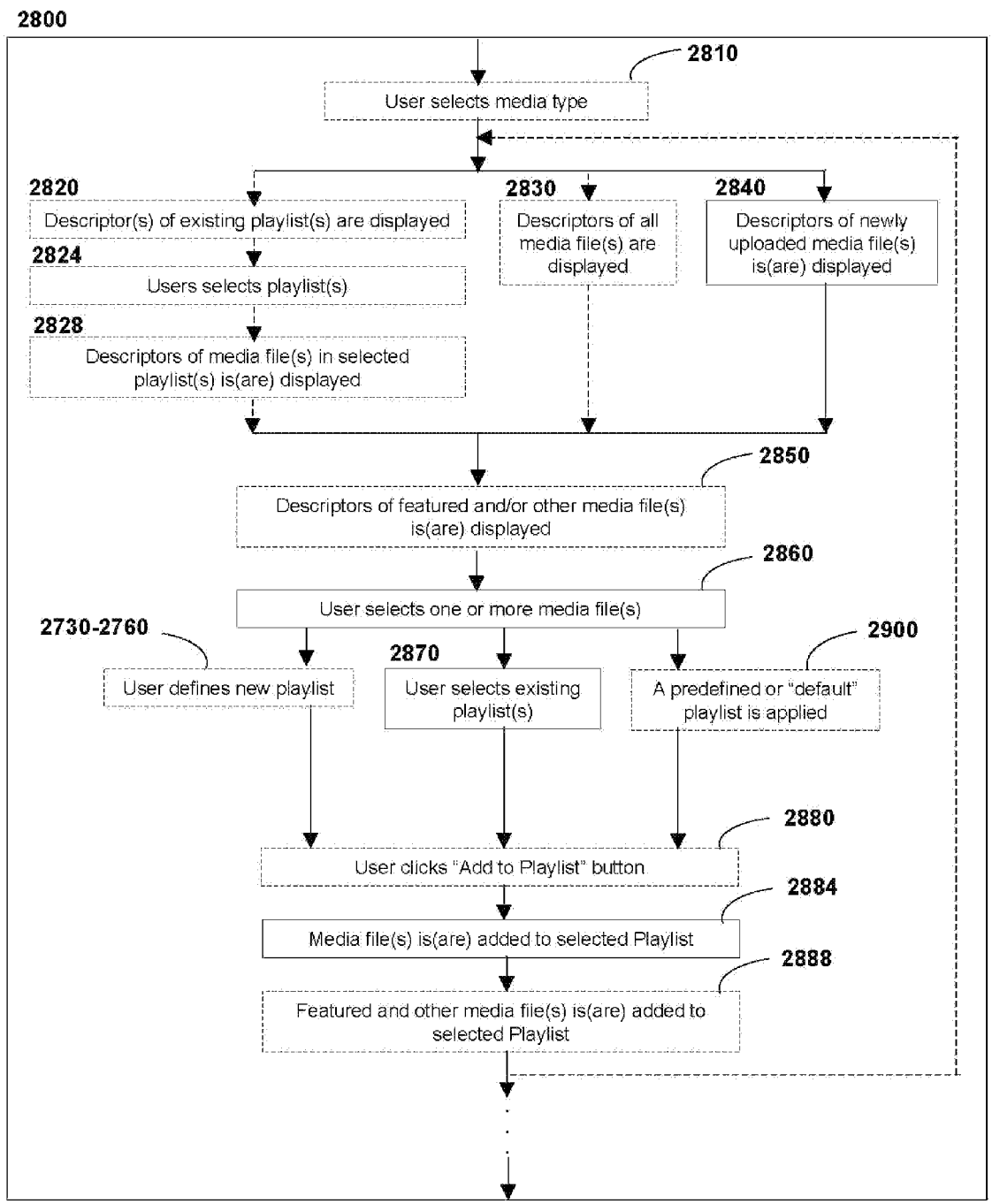
FIG. 7F is a flowchart of a process to organize media files in one or more playlist(s).

In FIG. 7F, a process comprises organizing one or more media file(s) into a playlist. The process includes the steps 2840, 2860, 2870, and 2884. The process may also include alternative and/or additional steps 2810, 2820, 2824, 2828, 2830, 2850, 2880 and/or 2888.

Figure 7G:
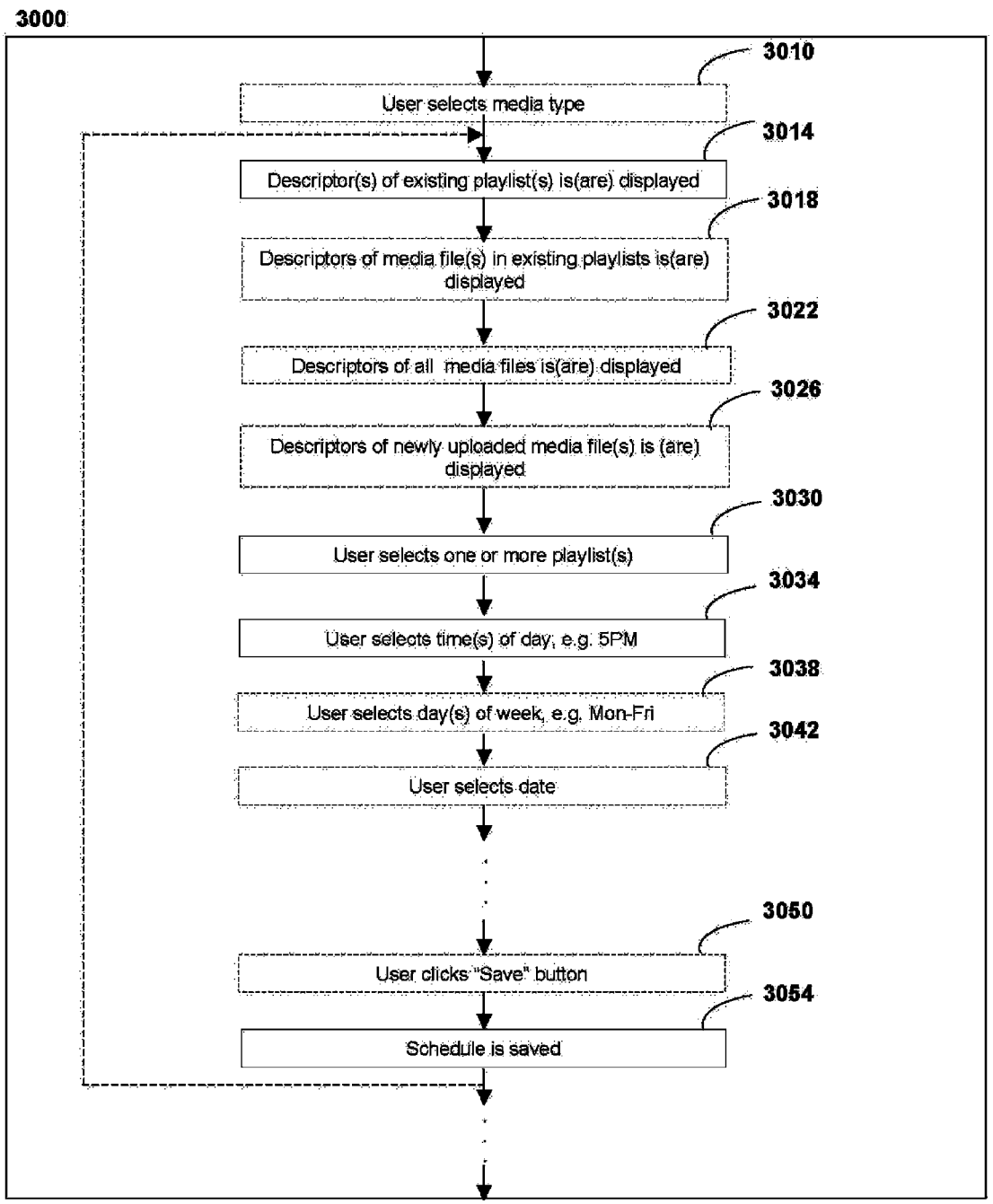
FIGS. 7G and 7H are alternative flowcharts of processes to schedule transmission of one or more playlist(s).

In FIG. 7G, a process comprises defining a schedule for transmission of one or more playlist(s). The process includes the steps 3014, 3030, 3034, and 3054. The process may also include alternative and/or additional steps 3010, 3018, 3022, 3026, 3038, 3042 and/or 3050.

Figure 7H:
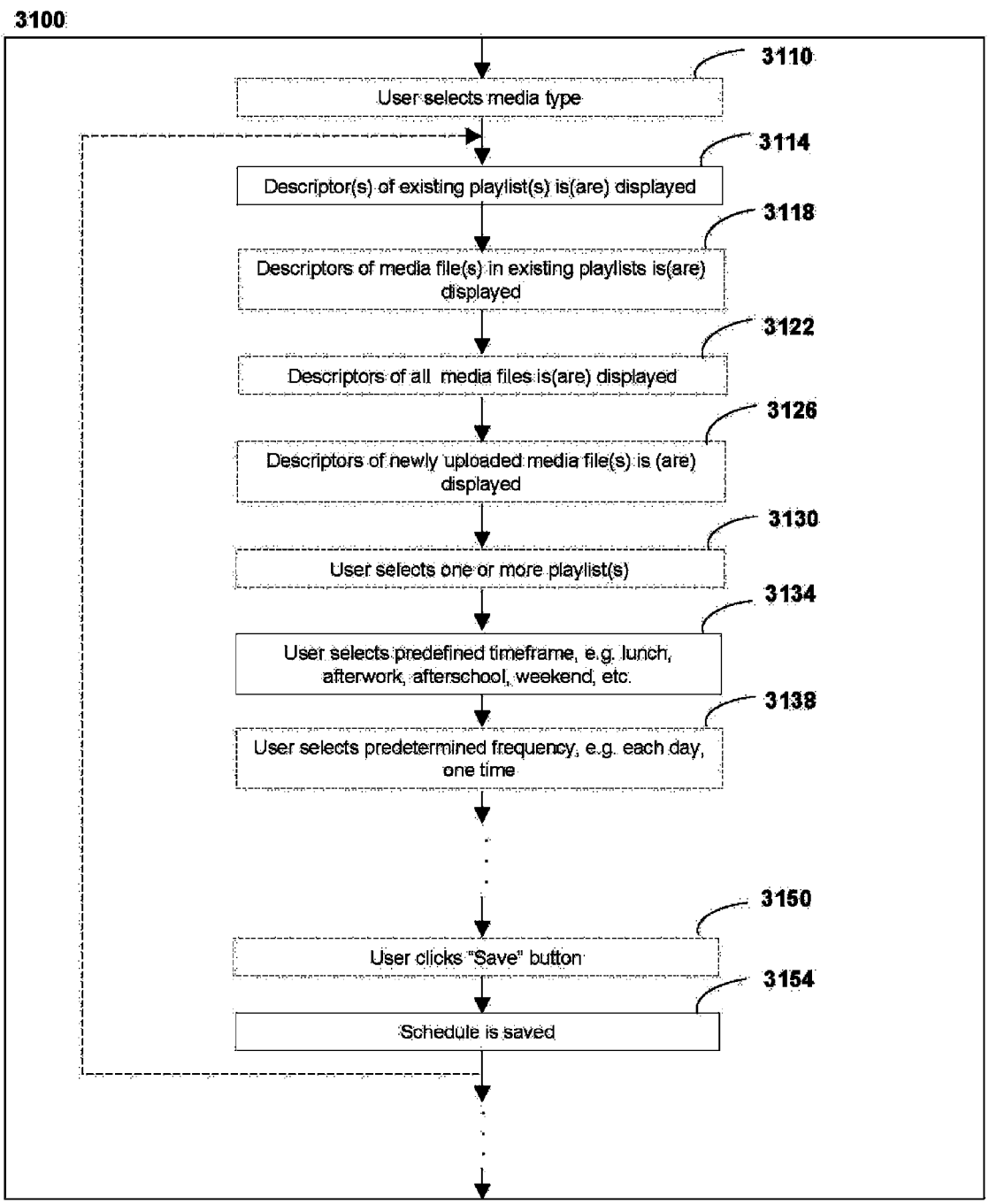

In FIG. 7H, a process comprises selecting a predefined schedule for transmission of a playlist. The process includes the steps 3114, 3134 and 3154. The process may also include alternative and/or additional steps 3110, 3118, 3122, 3138 and/or 3150.

Figure 7I:
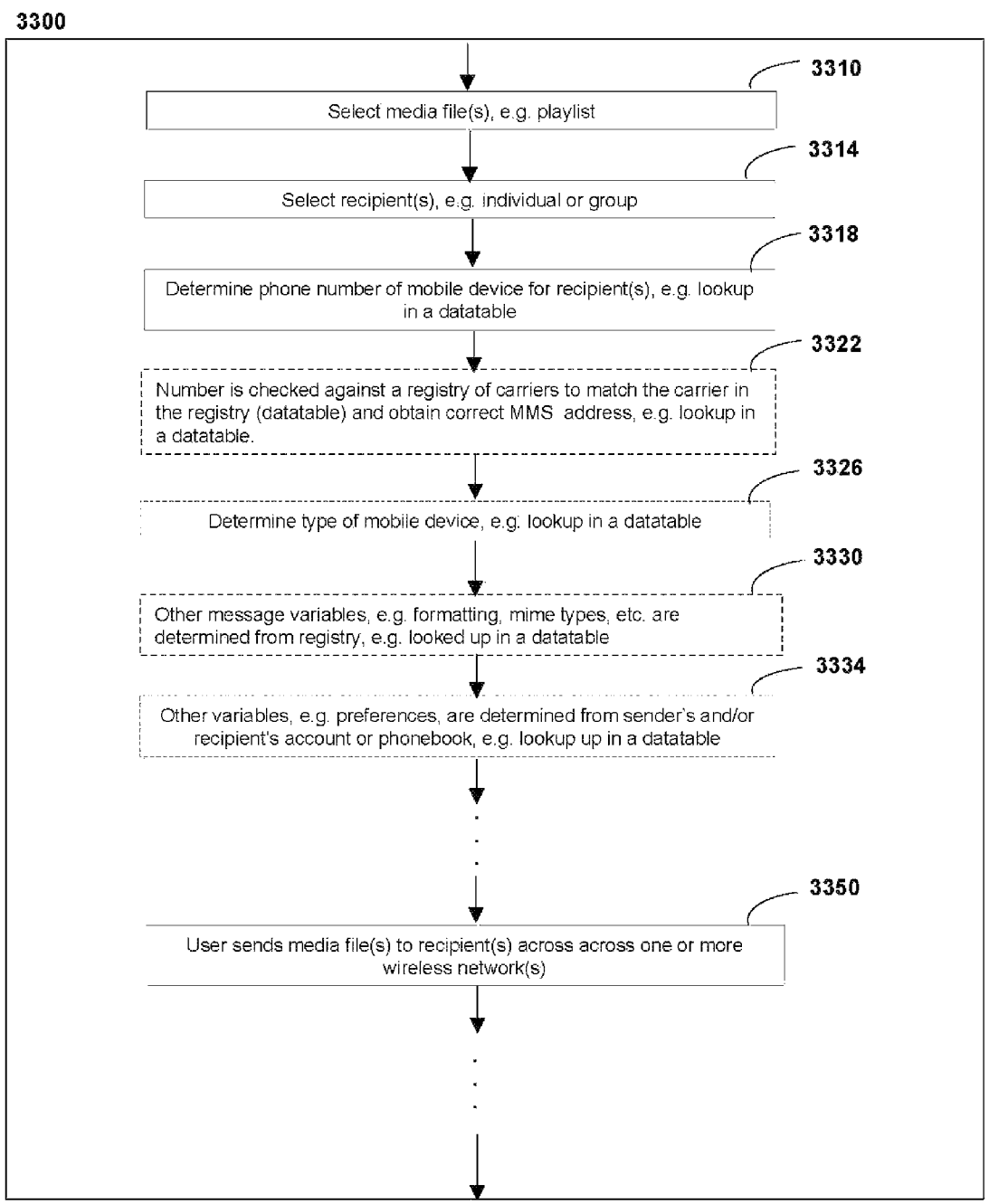

In FIG. 7I, a process comprises transmitting a playlist to one or more mobile devices across one or more wireless network(s) initiated by a user. The process includes the steps 3310, 3314, 3318, and 3350. The process may also include alternative and/or additional steps 3322, 3326, 3330, and/or 3334.

Figure 7J:
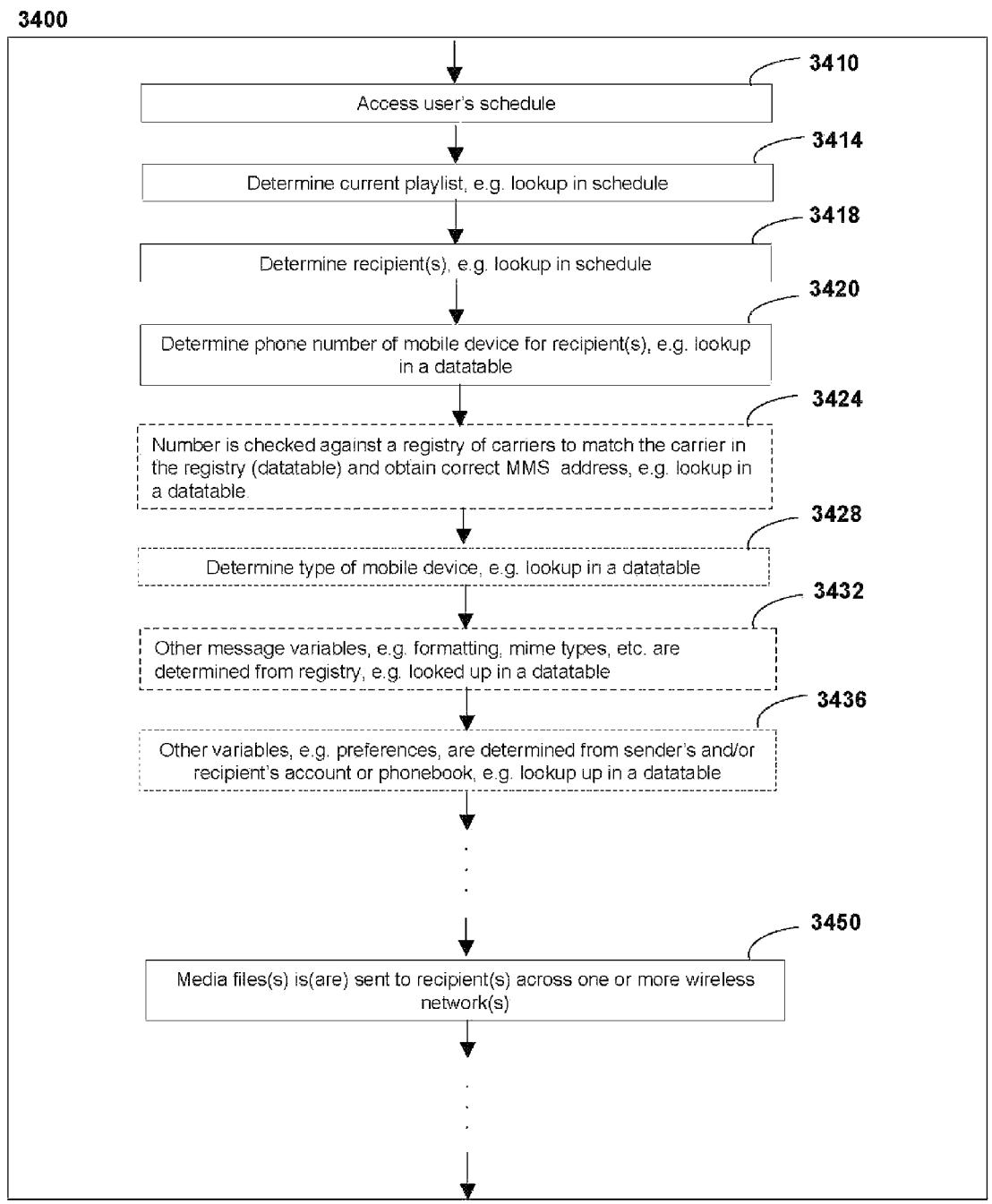

In FIG. 7J, a process comprises transmitting a playlist to one or more mobile devices across one or more wireless network(s) according to a predetermined schedule. The process includes the steps 3410, 3414, 3418, and 3450. The process may also include alternative and/or additional steps 3422, 3426, 3430, and/or 3434.

Figure 7K:
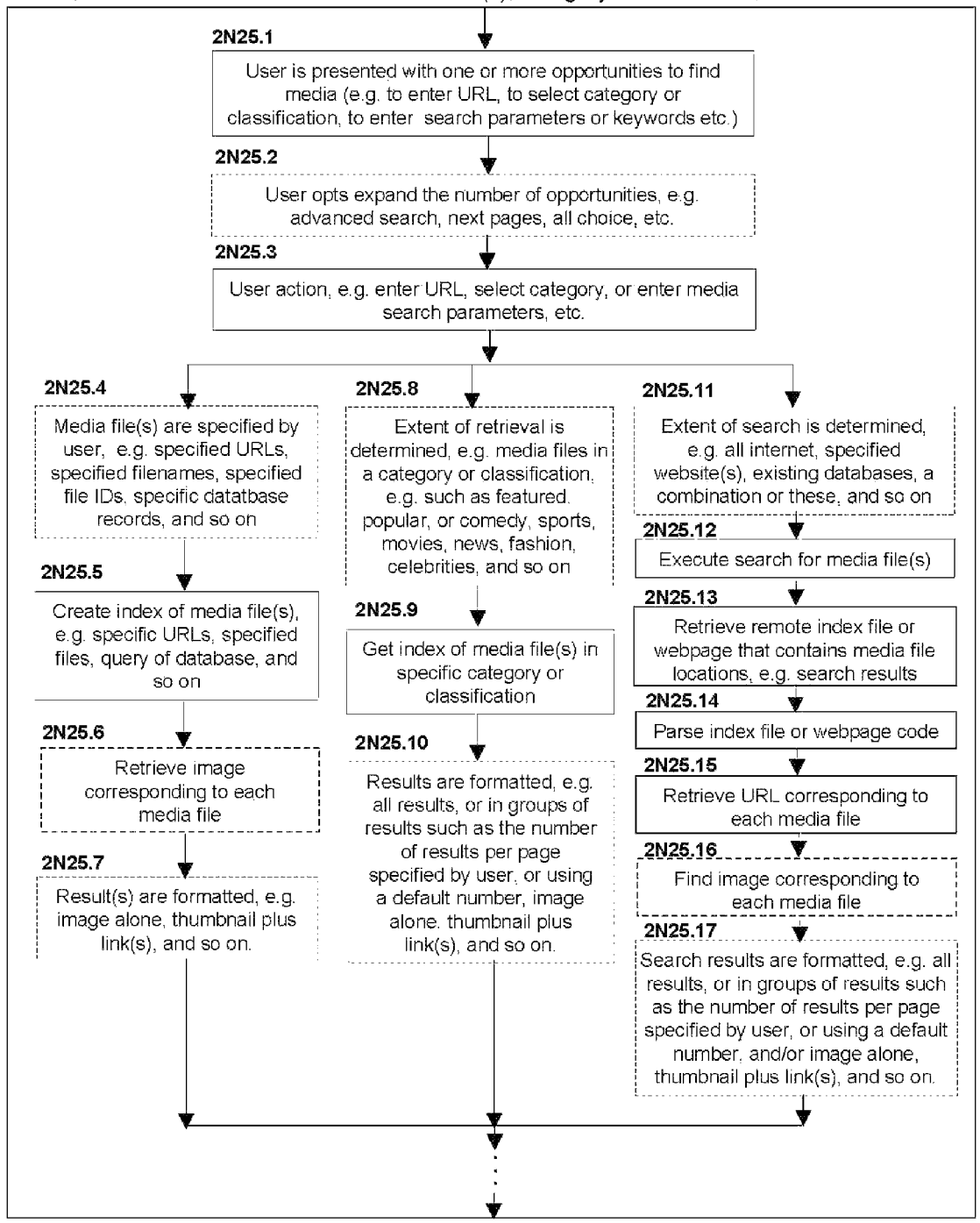
FIG. 7K is a flowchart of subprocesses of user selection of individual media file(s), a category of media file(s), or media search.

In FIG. 7K, the subprocess 2525 or 2625 comprises the step of presenting a user with one or more opportunities to find media 2N25.1 (e.g. to enter URL, to select a category or classification, to enter search parameters or keywords, and so on.) and a step of obtaining an index which may comprise a step of creating an index of media files 2N25.5; a step of getting an index of media file(s) to specific category or classification 2N25.9; or a series of steps of executing a search 2N25.12, retrieving a remote index file or webpage 2N25.13, parsing the index file or webpage code, and/or retrieving the URL for each media file 2N25.15. In at least one embodiment, the broad steps are 1) Enter search keyword(s), 2) Go get that search page, 3) Parse the results from the search page and display them, 4) Get the link URL to the video or image that is selected by the user, 5) Go get that video or image and download it and convert it and then save it or send it or both. In other embodiments, the subprocess may have additional steps of 2N25.4, 2N25.6 and 2N25.7; or the steps of 2N25.8 and 2N25.10; or the steps of 2NN25.11, 2N25.16, and 2N25.17.

Referring to FIGS. 7A through 7L and FIG. 8, the system of the invention can accomplish media search using intelligent processing whereby the system can use existing search and display engines to mobilize content libraries. No modifications are necessary on the part of the content provider. In several embodiments, the process starts selection of a Remote Index file or webpage (or multiple remote index files or webpage) that contains Remote File Locations: file:// or http://. This remote index file or webpage can be any kind of page such as those of YouTube.com, Google Images, etc. or any other page that has content indexed or catalogued. The remote Index is read by the system and search results are displayed on an integrated display page (which may branded, co-branded, or otherwise). Once the file is selected, the system takes the file location, grabs the file, processes it and sends it out via the system. The file does not ever have to be saved locally to our server, just read into memory processed and flushed from memory. The content can be saved into a users personal library, for later enjoyment, if the content provider chooses to make that option available to the user. But the content provider is not compelled to store its content anywhere but on its own server.

In operation, the relationship between the system and the content provider is not messy, the content provider holds the content, the system provides the technology. A web interface is where they meet. In addition, user stats can be derived very easily from this interface, e.g. how many files were accessed, what times, what users received the files, etc. Using the system of the invention, we have already tested fully functioning examples using Google Images and YouTube.com among others. For example, the mobilization of Google Images shows how we can take an existing, dynamic index, in this case search results, and use that as the point of contact for allowing access to the entire library of images indexed by Google. None of the image files are ever saved to our server. They are only read into RAM to be processed and sent out and then flushed from our system. These images can also be made available for viewing on a mobile device, not just sending out via MMS. For example, the mobilization of YouTube shows how sites can allow users to load pieces of content into their user accounts from a content provider, in this case YouTube.com. Using the same method of processing a dynamic index page, this time the users are able to save the content into their accounts for later use. This would be more like the way iTunes operates. You pay for a piece of content, and you get to save it and keep it and use it in your personal library. These videos are available for viewing on a mobile device using the system and also for sending out via mms through the system. All of this was accomplished without either one of these sites changing a single line of code. Our system, using intelligent processing, is doing all of the work using the systems that already exist on these sites.

One system of the invention is user driven mobilization system. In a typical embodiment, the user driven mobilization system uses media search to determine which media files to mobilize. In one embodiment, only those media file(s) that a user selects from search results is(are) mobilized. Our system puts a searchable interface onto every video in a site's library immediately. The videos are saved into a database once they have been converted. When someone requests a video, it is checked against the mobile database. If it has been converted already, the converted version is served. If it hasn't been converted already, it is converted and stored, and served. An entire sites library of content is immediately available, searchable. If a piece of content isn't popular, or old, it never gets requested, it is never converted, and space and processing power aren't wasted. The only delay is when the first person requests the video, then it is done. The system can take the videos that are most popular from the sites website and be converting the popular ones all the time. This way the videos that people want to see are converted first, the ones that aren't so popular are converted on the fly when they are requested and saved for future requests. The site's mobile library is built on the fly by users and what the users watch. The videos are saved into a database once they have been converted. When someone requests a video, it is checked against the mobile database. If it has been converted already, the converted version is served. If it hasn't been converted already, it is converted and stored, and served. An entire sites library of content is immediately available, searchable. If a piece of content isn't popular, or old, it never gets requested, it is never converted, and space and processing power aren't wasted. Thus, a user driven mobilization system is more efficient. The only delay is when the first person requests the video, then it is done. The system can take the videos that are most popular from the sites website and be converting the popular ones all the time. This way the videos that people want to see are converted first, the ones that aren't so popular are converted on the fly when they are requested and saved for future requests.

In addition to content mobilization, a system of the invention includes the insertion of advertisements in the media. The insertion of advertisements may be accomplished after mobilization of content or may be done on the fly as content is mobilized. The insertion of advertisements may be accomplished using any of the processes described herein including the processes to edit media or combinations thereof (e.g. combining media, splicing media, insertion of images in media, insertion of audio in media, insertion of partial overlays, clipping and insertion of clips in media, and so on). Further, the insertion of advertisements may be accomplished using a batch process, a robot application, or other process and the resulting files stored as 'ad-loaded' files. As users with ad-supported accounts request to view files or send a media file, the ad-loaded file may be retrieved. In one embodiment, the advertisement may be selected based on currency, e.g. a sale or special event. When the inserted advertisement is not longer applicable, the advertisement may be automatically removed and/or replaced with a different advertisement using the batch process, the robot application, or other process, and the resulting files re-saved. Alternatively, the advertisement may automatically be removed and/or replaced after a specified number of impressions, page views, or the like. In another embodiment, advertisements may be selected based on the relevancy to the specific user. For example, batch process or robot may insert highly relevant advertisements in the content uploaded by user. In still another embodiment, advertisements are selected based on a subset or category of users based on demographics, preferences, or behavior. For example, a batch process or robot may insert advertisements that are generally relevant to that subset of users. In still other embodiments, different advertisements may be inserted in media files and saved as different resulting files. For example, one advertisement may be tailor to women and another advertisement may be tailored to men.

Figure 7L:
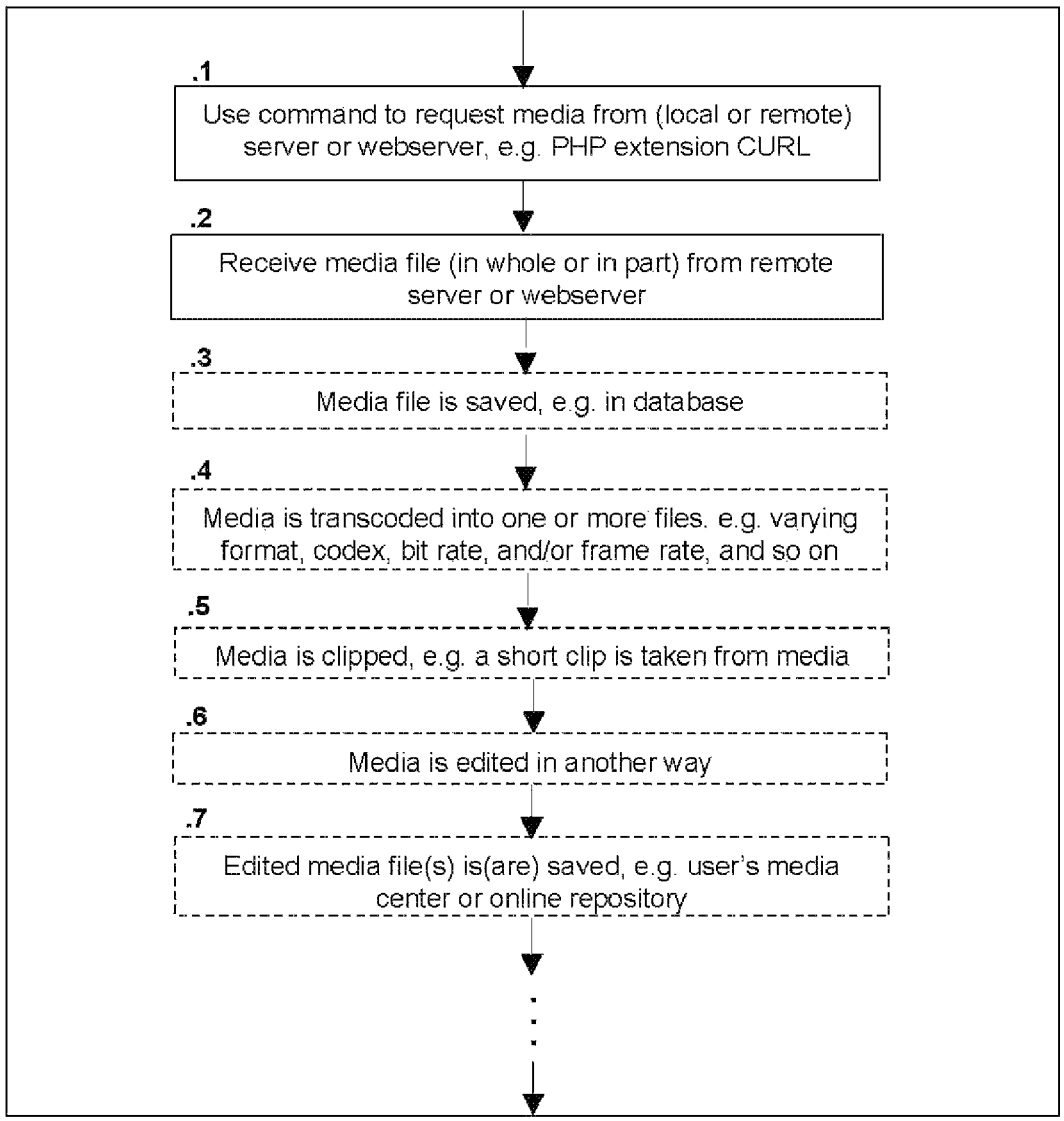
FIG. 7L is a flowchart of a subprocess to grab media from an internet-accessible location or a file storage location.

In FIG. 7L, the subprocess 2580 or 2680 to grab a media file comprises the step using command to request media 2N80.1 and the step of receiving media 2N80.2. In at least one embodiment, the command used to grab the media file is accomplished using a PHP extension called CURL with the relevant URL address and relevant parameters. The subprocess may have additional steps 2N80.3, 2N80.4, 2N80.5, 2N80.6, and/or 2N80.7. In at least one embodiment, the subprocess retrieves an index in the form of search results from a remote server. For example, with image search, here is the page that I parse when we search for Apple: http://images-.google.com/
images?hl=en&q=apple&um=1&sa=N&tab=wi
First, I save the source code of the page to our disk. Then, then the systems goes through it line by line and look for the pattern match of "imgurl=" and break the lines up on certain letters and words and get the link to the actual image (or a thumbnail of the image) in a variable. Then, the system can display it as a preview and send the URL of the image to the message page to enable the system to go get and download and send in a message and save to the user's account.

Figure 8:
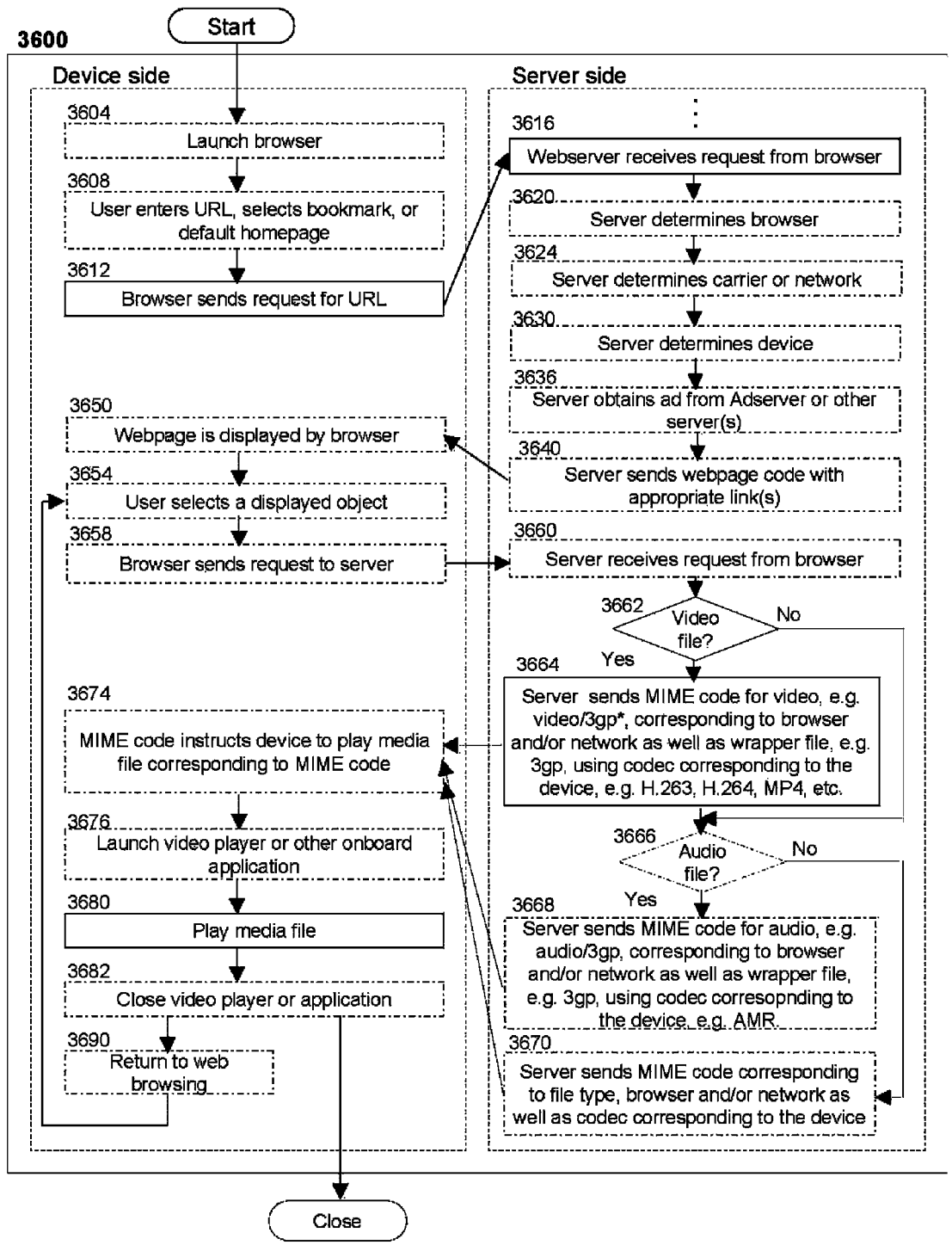

In FIG. 8, a process transmitting a playlist to one or more mobile devices across one or more wireless network(s) from a web accessible location. The process comprises the step 3612 of browser sending a request for a URL, step 3616 of a webserver receives request from browser, step 3664 a server sends a MIME code for media file comprising video, e.g. video/3GP, and the media file encoded using a codec corresponding to the device, e.g. H.263, H.264, MP4, etc., and step 3680 device plays the media file. In various embodiments, the process includes the additional preliminary steps 3620, 3624, and/or 3630 of determining the browser, determining the carrier, and/or determining the device.

In the typical embodiment, steps 3620, 3624, and 3630 are subprocesses. For example, in subprocess 3620 the browser is determined from the request of a URL which typically identifies the browser, e.g. Openwave, Obigo, etc. Similarly, in subprocess 3624, the carrier can be determined by the request for a URL which includes an IP address that corresponds to a carrier's WAP gateway. For example, in PHP, the following command and input variable returns the requester's IP address:

$_SERVER['REMOTE_ADDR'];

The following command and input variable returns the reverse DNS of that IP address to determine the domain name or gateway:

$_SERVER['REMOTE_HOST'];

Using a series of pattern searches for different text strings corresponding to the WAP gateways of each carrier, the carrier is determined For example, the following IF THEN command is used to determine if the gateway is Verizon.

If VZW is in string $_SERVER['REMOTE_HOST'] then carrier=Verizon

Further, regarding subprocess 3630, the device can be determined from the requester of a URL. For example, in a typical embodiment, the device can be determined from the "user agent string". For example, in PHP, the following command and input variable returns the User agent of the browser $_SERVER['HTTP_USER_AGENT'];

A search for the user agent string in an XML file with thousands of device profiles for the different user agents is done to determine whether or not the capabilities are known for that device. If yes, then the capabilities are known, and thus, the media files having the applicable codecs is determined. If no, then the capabilities are not known directly but can be ascertained by looking up the browser type in a list of various browsers and the different capabilities that those browsers are installed on. The lowest common capability associated with devices running that type of browser may be used, and thus, the media file having applicable codecs is determined. In other embodiments, the searches may be one or more queries to datatable(s) in a database(s).

In at least one embodiment, the process includes the alternative step 3668 of a server sends a MIME code for the media file, e.g. audio/3GP, and the media file encoded using a codec corresponding to the device, e.g. AMR. In at least one embodiment, the process includes the alternative step 3670 of a server sends a MIME code for the media file and the media file encoded using a codec corresponding to the device.

In other embodiments, the process includes the additional intermediary step 3676 of launching a media player or application that is separate from the browser. In still other embodiments, the process includes the additional intermediate steps 3636, 3640, 3650, 3654, 3660, 3658, and/or 3660. Having immediate steps can have advantages. First, webpages can be generated and served as requested using PHP or other commands, and hence the process, may be database driven. Second, webpages will served accurately even if a user logs using another person's device which is a different device and/or a different carrier's network. Third, the user interface may be customized by the user or administrator in real time.

In various embodiments, FIG. 8 describes a subprocess 3664 for sending a media file as having at least the step of 3664 of selecting file with the codec corresponding to the hardware and including the applicable MIME type corresponding to the wrapper (and the carrier). For example, a wrapper for pushing video messages to most mobile phones is generally a 0.3GP wrapper. For certain mobile devices and phone, the wrapper may include other file formats including a MPEG4 file. In the preferred embodiment, the video and audio components are coded in a common format or codex accepted for delivery to mobile phones by all carriers such as H.264 for video component and AMR for the audio component. An example of the code that grabs files from the database and serves them to the browser is shown below for selected carriers in Table 5 below.

TABLE 5

Example of code

```
// database connection
$conn = mysql_connect("localhost", "user", "data")
    OR DIE (mysql_error( ));
@mysql_select_db ("database", $conn) OR DIE (mysql_error( ));
$sql = "SELECT * FROM image WHERE image_id=".$_GET["iid"];
$result = mysql_query ($sql, $conn);
if (mysql_num_rows ($result)>0) {
    $row = @mysql_fetch_array ($result);
    $data_type = $row["data_type"];
    $image = $row["image"];
    Header ("Content-type: $data_type");
    print $image;
}
?>
```

In many embodiments, the key code is the last two lines in the above example. The next to last line sends over the correct datatype, e.g. MIME type, and the last line sends the data for the media file. In the preferred embodiment, the routine is a PHP function which calls a database based on certain parameters including the user's carrier and the user's device type, e.g. Motorola RAZR with Obigo browser. In other embodiments, the routine may be a series of IF . . . THEN . . . ELSE statements with one such statement for each carrier and/or device type. In still other embodiments, the files may be delivered as video on demand using WAP or as streaming media using protocols such as RTSP or Windows MMS.

Figure 9A:
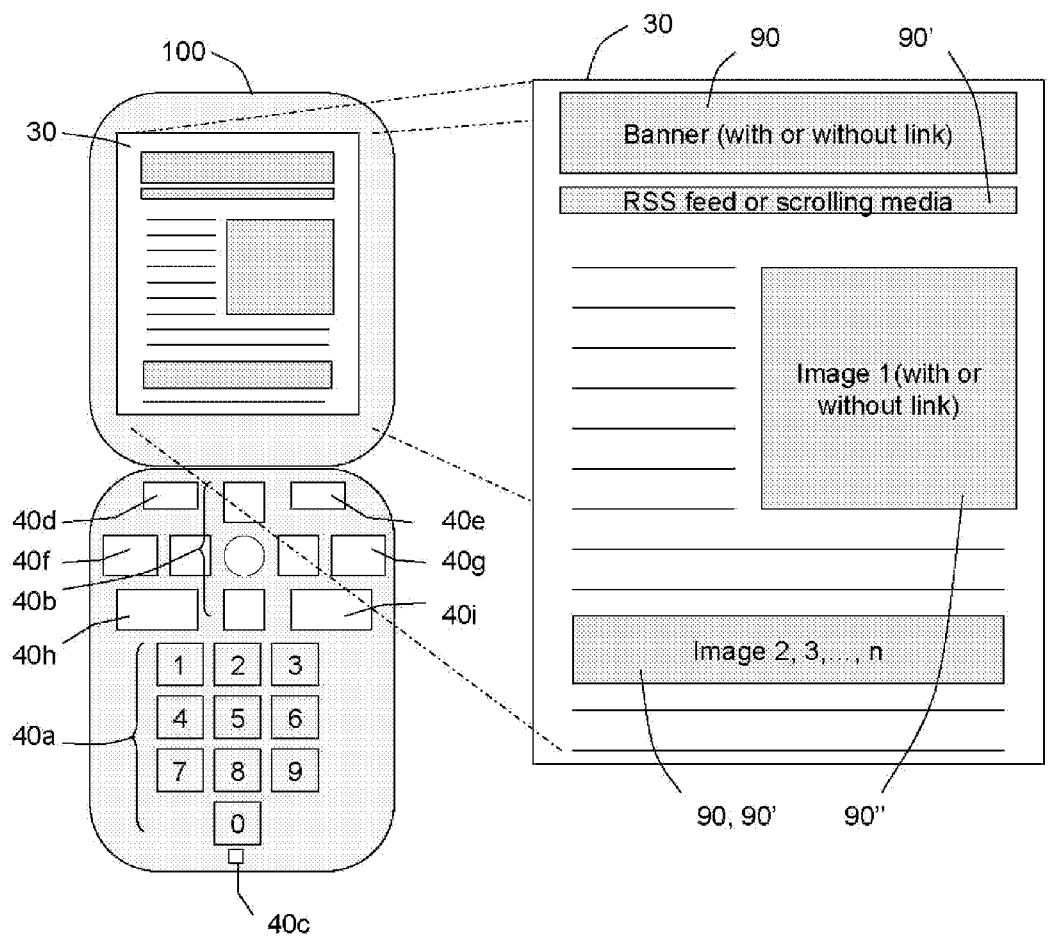
FIGS. 9A through 9C are alternative views of user interfaces of mobile phones.

With reference to FIGS. 9A, 9B, 9C, 10A, and 10B, the drawings illustrate front views of a mobile phone's display and user interface. In FIG. 9A, the display area 30 shows a plurality of displayed objects. In many embodiments, the displayed objects comprise images and text. In many embodiments, the images may be advertisements with links to more information. For example, the image 90 at the top can be banner ad and the image 90" to the right can be a display ad. In another embodiment, an image 90' appears directly below the banner. In another embodiment, the image 90 or 90' recurs at intervals on the page, e.g. a repetition of the same ad, or a series of different ads. Also, in various other embodiments, each of the images 90, 90' or 90" can be linked to other information at a URL or a filename. Some embodiments have a scrolling information or an RSS feed 90' at the top in addition to or in lieu of the banner ad.

Figure 9B:
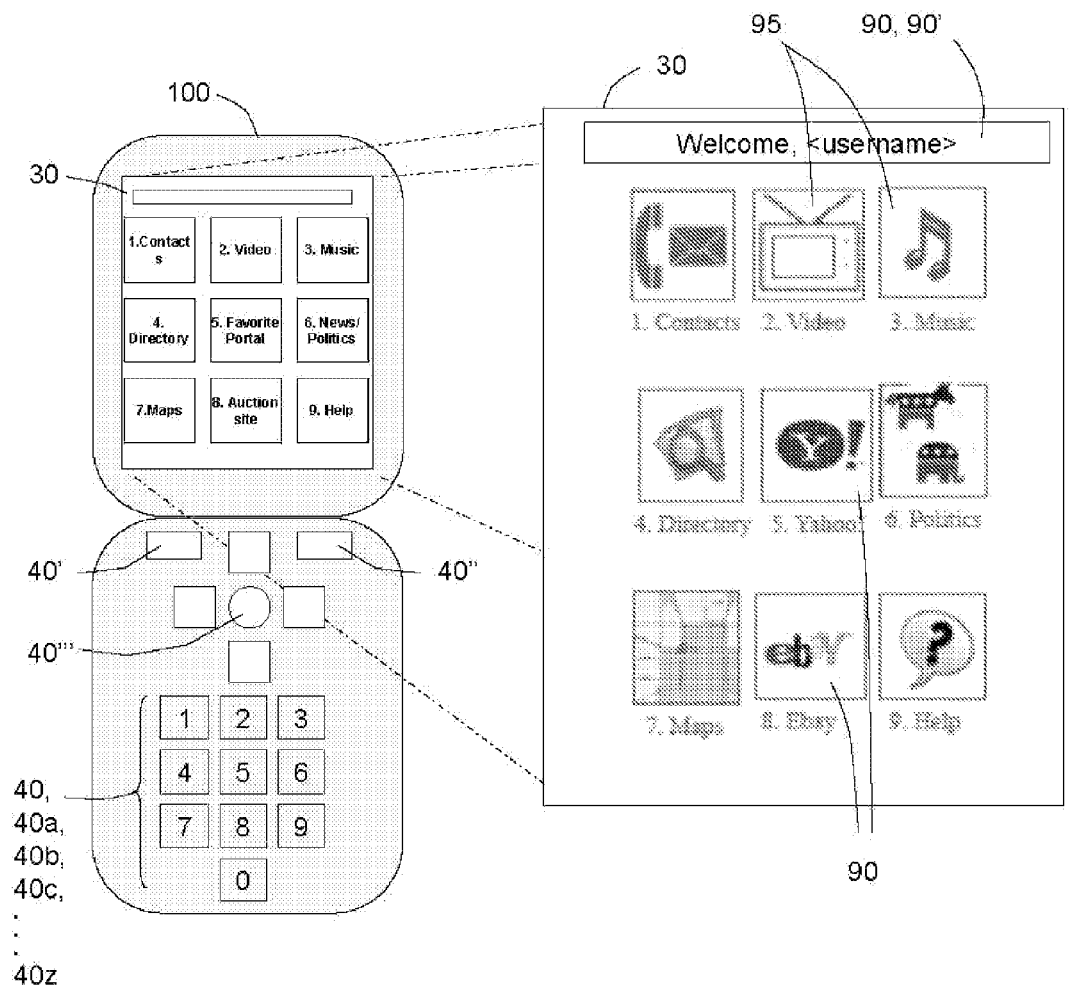
Figure 9C:
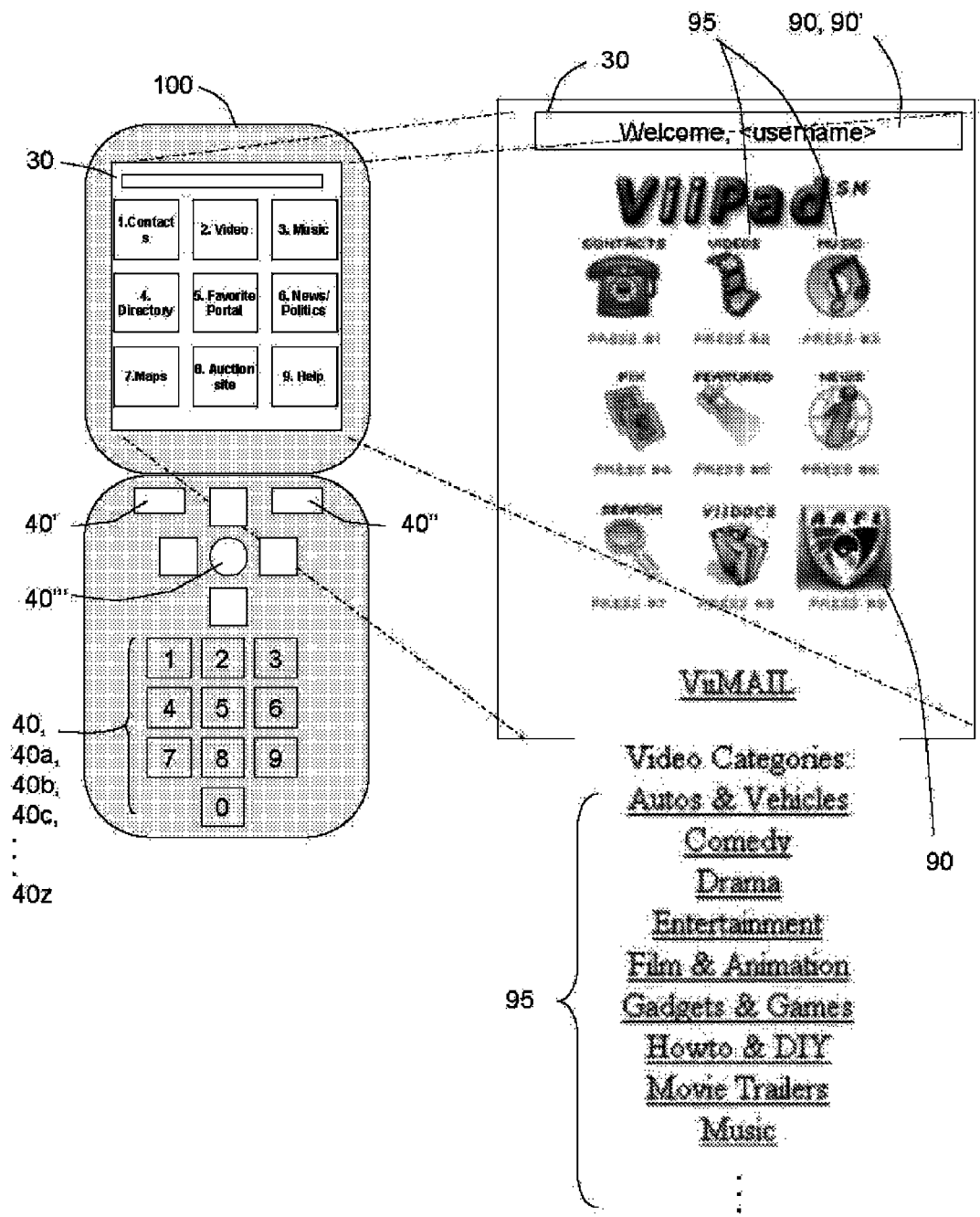

In FIGS. 9B and 9C are front views of a mobile phone's display and user interface showing alternative objects in the display area 30 which shows a grid of icons. In several embodiments, one or more of the icons are images of brands (e.g. logos) and have links to additional information on the webserver or any other server 200 (including but not limited to 200', 200", 200''', and 200''''). In other embodiments, icons 95 represent links to a media center 2050. For example, one icon 95 may link to music files in the media center and another icon 95 may link to video files in the media center. Alternatively, both icons 95 may link the user to the media center. Many embodiments may have a top image 90 in the form of a banner, e.g. a logo, brand name, or title of document. In addition, an embodiment can have a scrolling information or an RSS feed 90' at the top in addition to or in lieu of the banner.

Figure 10A:
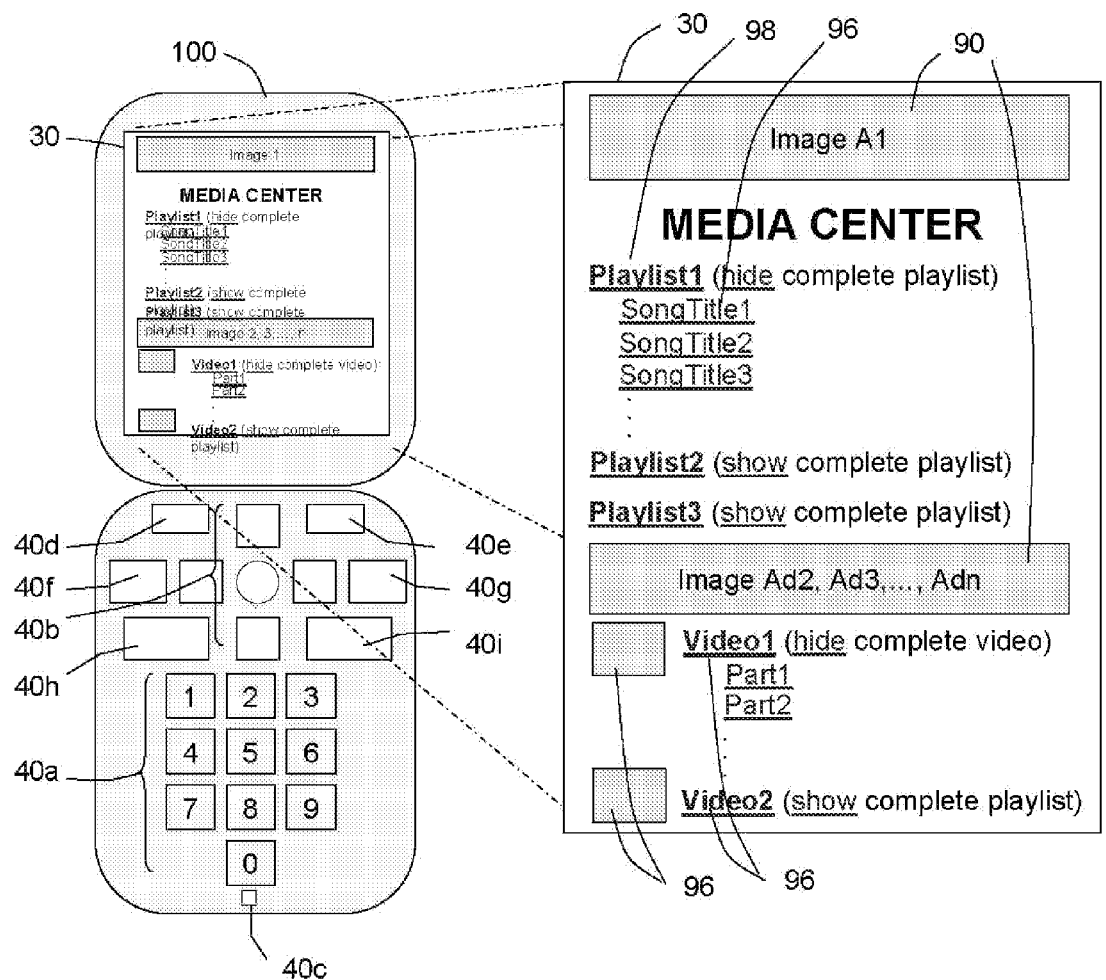
FIGS. 10A through 10B are alternative views of user interfaces of a media center of mobile phones.
Figure 10B:
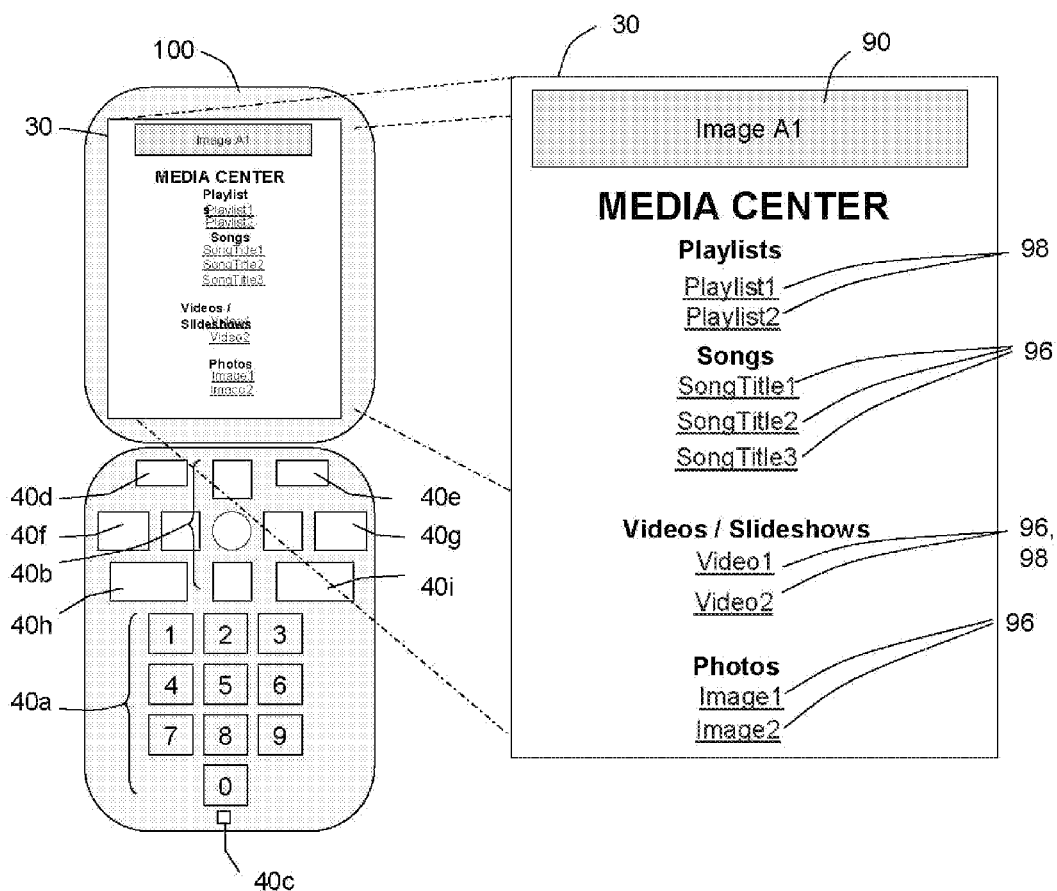

FIGS. 10A and 10B illustrate alternate views of the display and user interface of a media center 2050 on mobile phones. In various embodiments, to get to the media center, a user may select on or more icons 95 that link to the media center. Once in the media center, the user can select one or several individual media files 96, e.g. individual songs, individual images, etc. or one of several playlists 98 which comprise multiple media files combined into a single resultant file. In other embodiments, the user interface of the media center 2050 is customizable by the user. In still other embodiments, the user interface may be configurable or customizable by others including but not limited to media companies, content providers, advertisers, and so on.

Figure 10E:
FIGS. 10E through 10G are views of user interfaces for media search and integrated interfaces for finding media and sending clips of media.
Figure 10E:
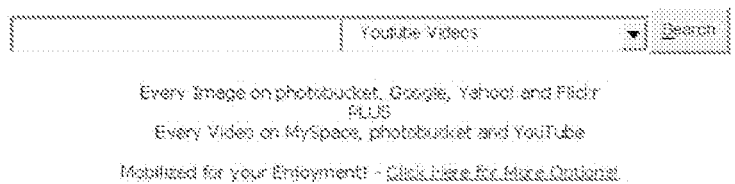
Figure 10F:
Figure 10F:
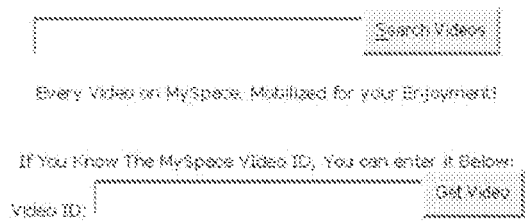
Figure 10G:
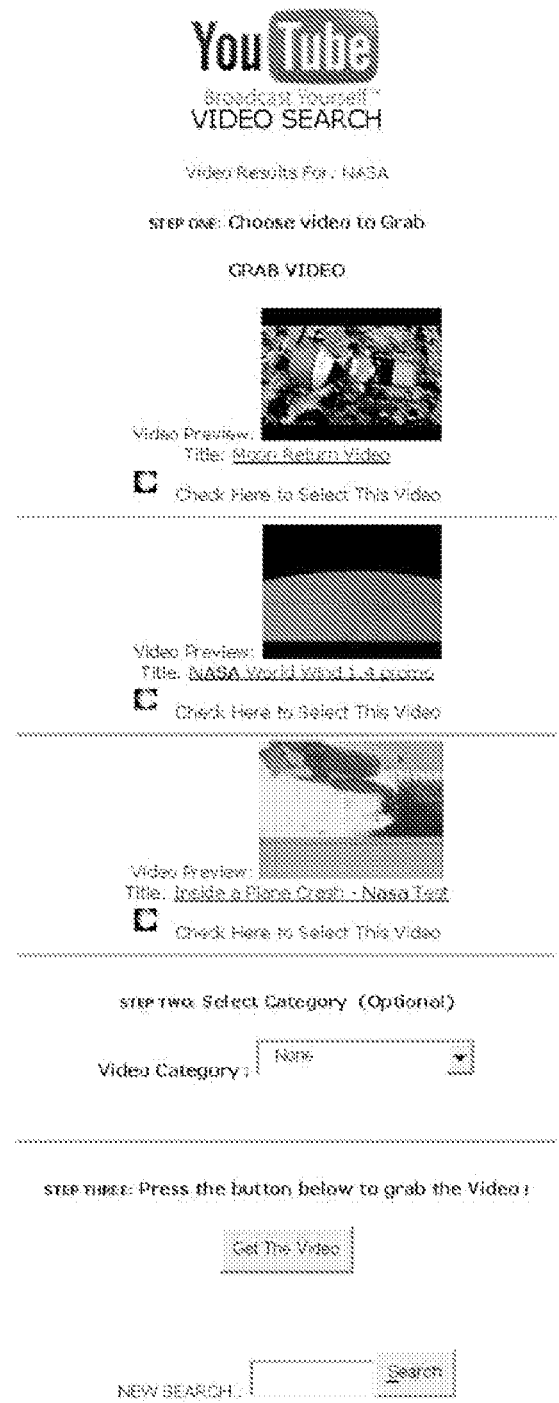

With reference to FIGS. 10C through 10G, a user interface can be fully web based (e.g. HTTP on desktops and notebooks and WAP on mobile phones). FIGS. 10C through 10D are views of user interfaces for media editing and integrated interfaces for editing media and sending clips of media. FIGS. 10E through 10G are views of user interfaces for media search and integrated interfaces for finding media and sending clips of media.

With reference to FIGS. 11A, 11B, 12A through 12C, 13A through 13E, and 14A through 14E, a mobile electronic device is depicted by numeral 100 and any other electronic device is depicted by numeral 110. The mobile device 100 may include any electronic device including a mobile phone, a PDA, a hybrid PDA and phone, a mobile computer such as a laptop, notebook, tablet, and so on, as the term "device" is defined herein. The other electronic device 110 may be a desktop, workstation, mainframe, server, control unit for a building automation system, control unit for a telecommunication system, or other immobile electronic device.

With reference to FIGS. 11A, 11B, and 12A through 12C, the perimeter of the device is shown by dotted lines, electric power (or bus) lines are shown by dashed lines, and alternative components and devices are shown by phantom (or dot-dash) lines.

Figure 11A:
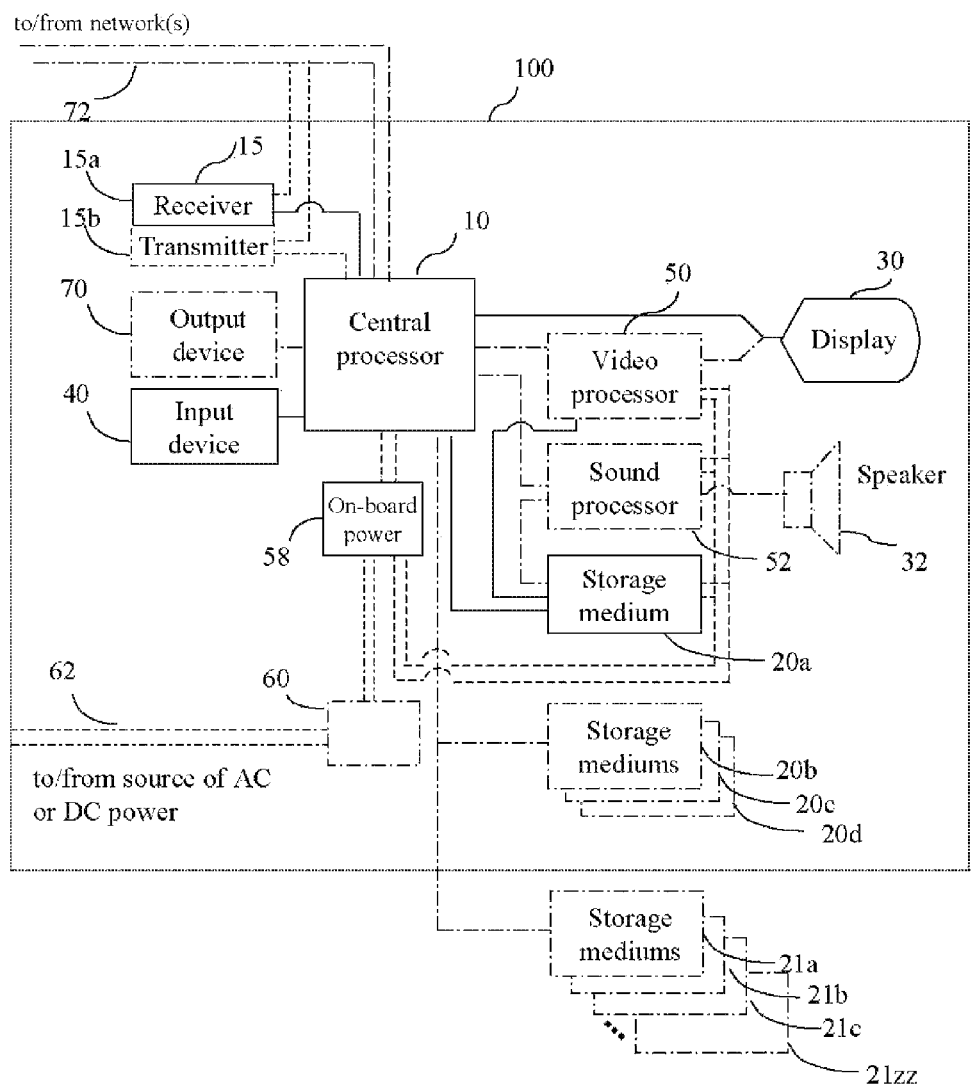
FIGS. 11A and 11B are schematic drawings of alternative circuits of mobile devices.
Figure 11B:
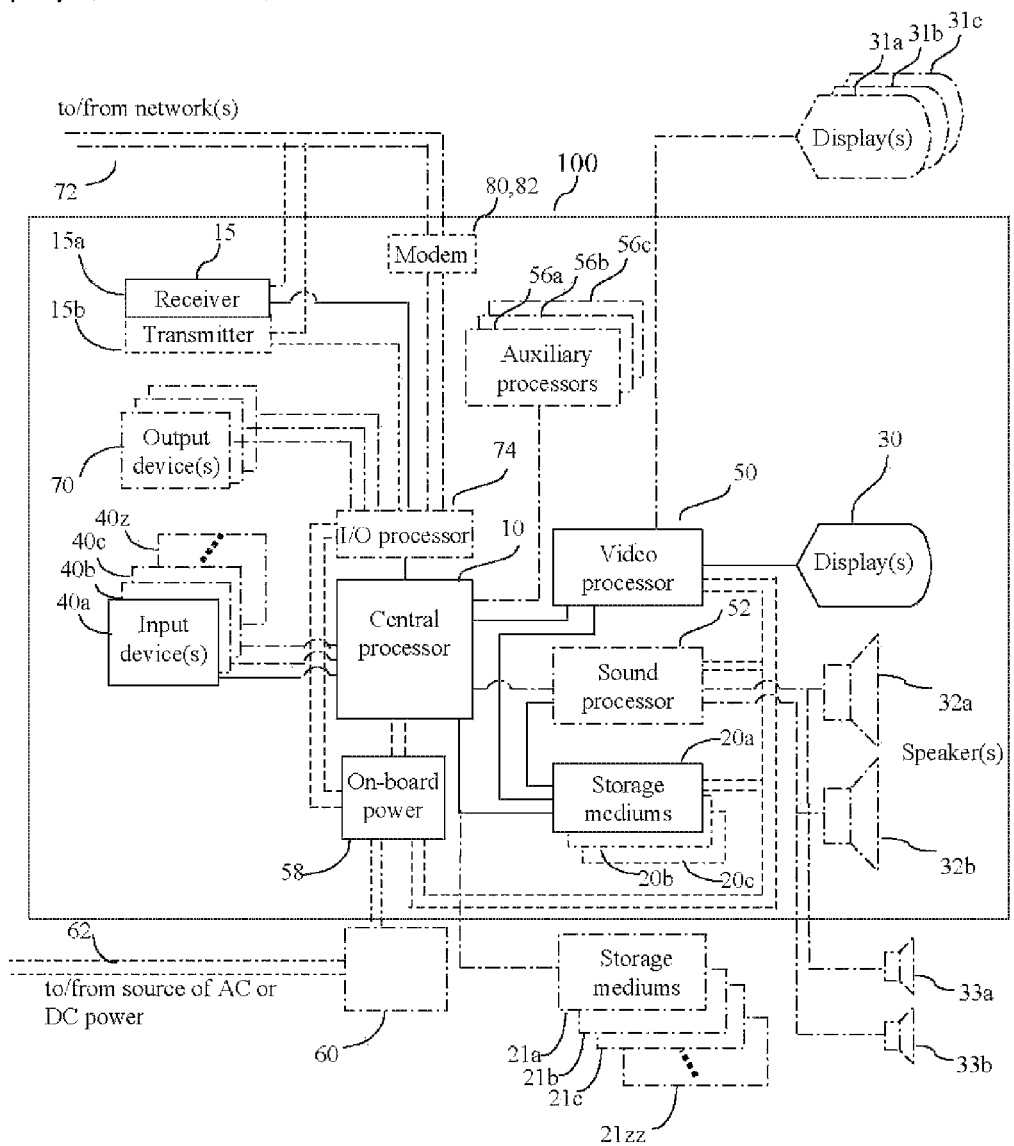

FIGS. 11A and 11B are schematic drawings of alternative circuits of a mobile device 100 having a central processor 10 in communication with at least one storage medium 20a. In one embodiment of the invention, the circuit comprises the central processor 10, the storage medium 20a, at least one display 30, and at least one on-board power source 58. For example, the display can be any type of display including a flat panel display such as LED, LCD, TFT, plasma, and so on, or a combination of these including a backlit display. For example, the on-board power source may be a battery, a fuel cell, a photovoltaic cell, and so on. In another embodiment, the central processor is in communication with a receiver 15a and at least one speaker 32, and in another embodiment, the central processor is in communication with a transmitter 15b. In still another embodiment, the circuit comprises a sound processor 52 in communication with the central processor and the speaker 32. In one embodiment, the central processor 10 is in communication with a wireless cellular network of the type operated by Verizon, Sprint or AT&T through the receiver 15*a* and the transmitter 15*b*. In still another embodiment, the central processor is in communication with the receiver/transmitter 15 which comprises a receiver 15*a* and/or transmitter 15*b*. In still another embodiment, the device comprises at least one input device 40. In yet still another embodiment, the circuit also comprises a video processor 50 in communication with the central processor and the display. In a further embodiment, the circuit also comprises one or more additional storage mediums in communication with the central processor where the additional storage mediums may be internal storage mediums 20*b*, 20*c*, and 20*c*1 and/or external storage mediums 21*a*, 21*b*, 21*c* . . . 21*zz*. The second storage medium may be flash memory or any type of external device capable of storing data including but not limited to a memory stick, CF card, a SD card, a jump drive, and so on. In still another embodiment, the circuit also comprises an output device 70 in communication with the central processor. In still another embodiment, the central processor is in communication with a server 200 at a remote location whereby information is transmitted to and from the remote location. In yet still other embodiments, the device 100 has additional displays 31*a*, 31*b*, and 31*c* and/or additional speakers 33*a* and 33*b*. In still yet another embodiment, in addition to the onboard power source 58, the device 100 has a connection to an external power source 62, and as necessary, a transformer 60. The transformer may be a AC-to-DC converter, a step down transformer, or any type of transformer or adapter.

With reference to FIG. 11B, the circuit includes an input-output processor 74 which is in communication with the central processor 10. In another embodiment, the input-output processor 74 is in communication with a modem 80 and/or a wireless network adapter 82 which in turn is connected to a network 72. In still another embodiment, the modem 80 or network adapter 82 is an external component rather than an internal component. In still another embodiment, the device 100 includes additional input devices 40*a* . . . 40*z* such as alternative keys, touchpads, or touchscreens for data entry, a microphone, and/or digital camera. In yet still another embodiment, the device 100 includes auxiliary processor(s) 56*a*, 56*b*, and 56*c* in communication with the central processor 10.

Figure 12A:
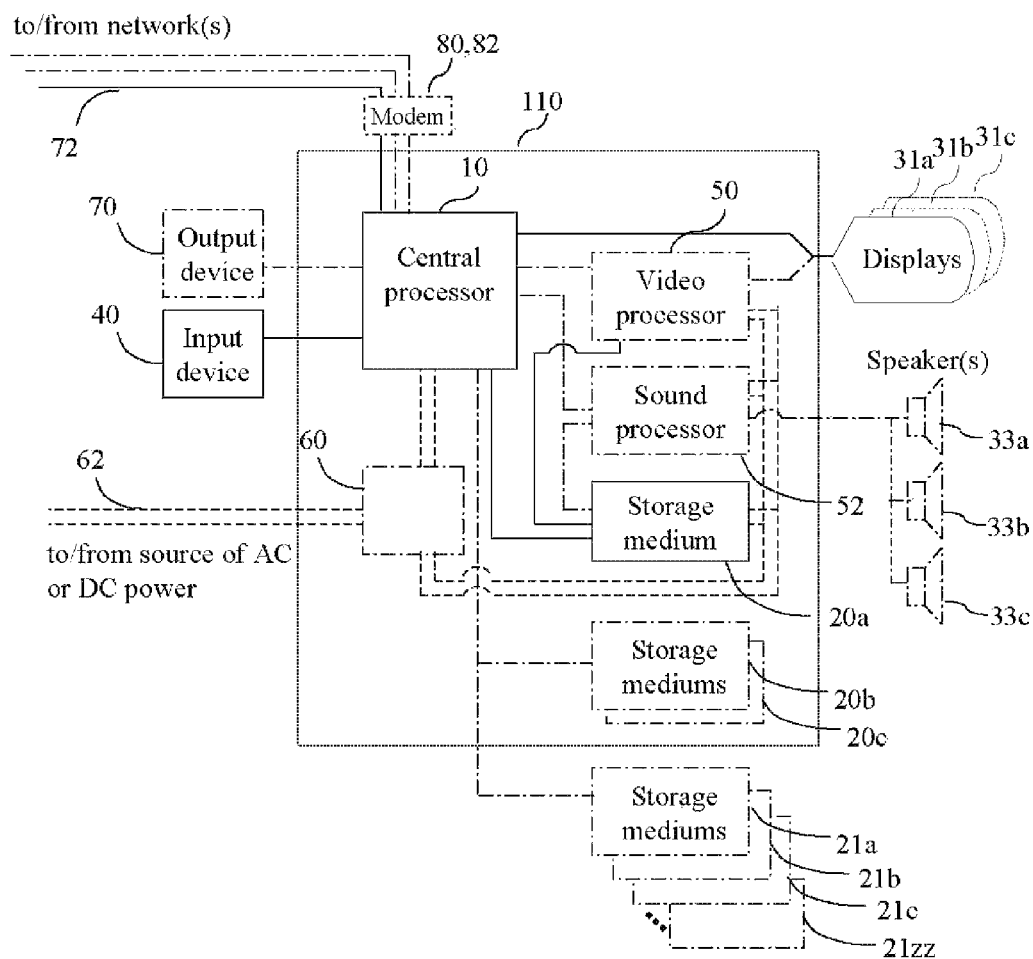
FIGS. 12A, 12B, and 12C are schematic drawings of alternative circuits of other electronic devices including stationary electronic devices.
Figure 12B:
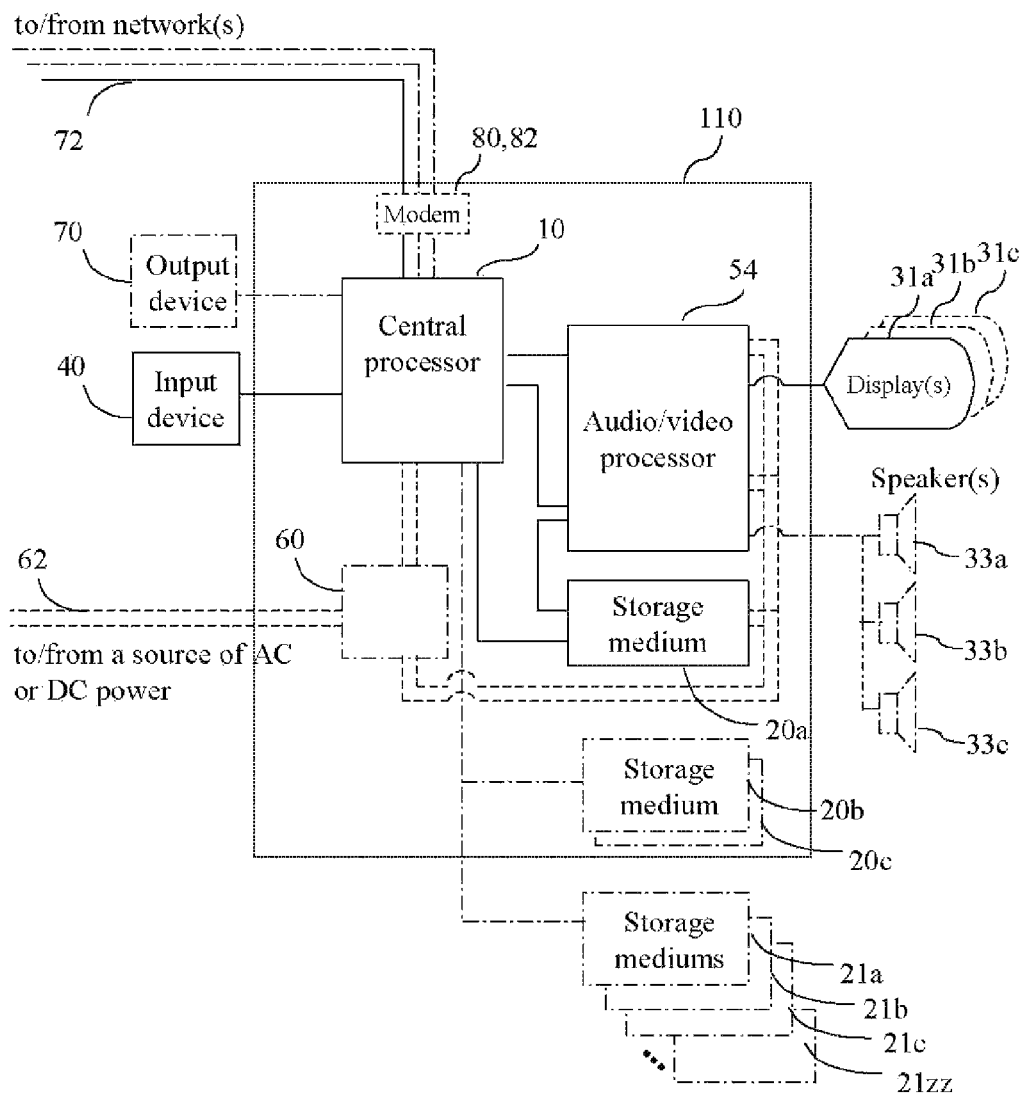
Figure 12C:
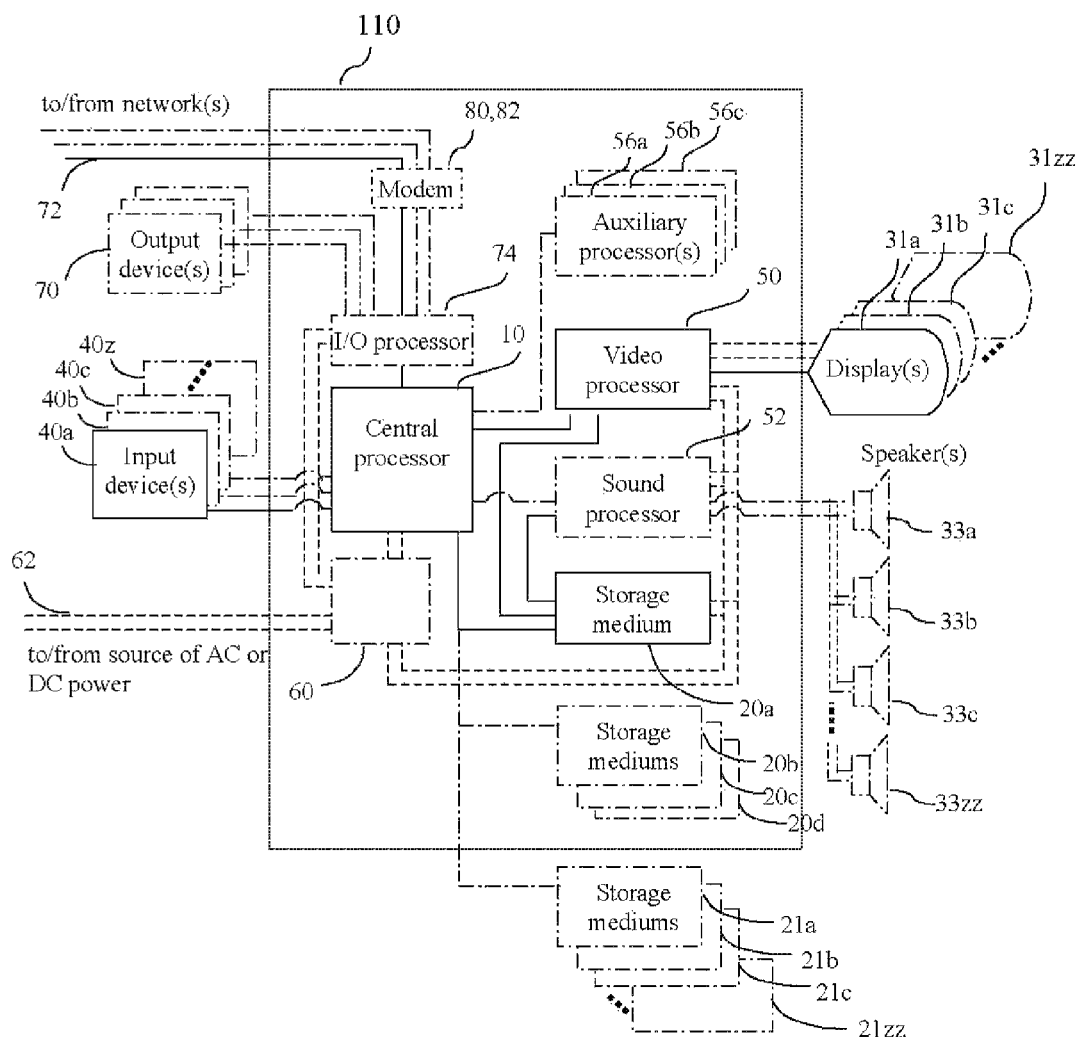

FIGS. 12A, 12B and 12C are schematic drawings of alternative circuits of other electronic devices 110 including stationary electronic devices having a central processor 10 in communication with at least one storage medium 20*a*, and at least one input device 40, and at least one connection to an external power source 62. In one embodiment of the invention, the circuit comprises the central processor 10, the storage medium 20*a*, at least one display 30, and the input device 40. In another embodiment, the central processor is in communication with a network 72. In still another embodiment, the circuit includes at least one speaker 33*a*. In yet still another embodiment, the circuit also comprises multiple output devices 70, and/or network connections 72. In yet still another embodiment, a modem 80 and/or a wireless network adapter 82 is in communication with the central processor. In yet still other embodiments, the circuit also comprises multiple internal storage mediums 20*a* . . . 20*c*, external storage mediums 21*a* . . . 21*zz*, displays 31*a* . . . 31*c*, speakers 33*a* . . . 33*c*, input devices 40.

In FIGS. 12A, 12B & 12C, the central processor may be in communication with a network 72 and the device 110 has at least one input-output device 74. When in communication with the network 72, the input-output device 74 may be a network card of the type manufactured by Novell Communications of Provo Utah; a dial-up modem of the type manufactured by Hayes Corporation of Boston Mass.; or an alternative type of modem such as wireless, DSL, or cable modems. In the preferred embodiment, the I/O device 74 is a wireless modem because it has the capability to remain "always-on" similar to a mobile communications device.

With reference to FIG. 12B, the audio processor and video processor are a single audio-visual processor 54 which is in communication with the central processor 10 and/or one or more displays 31*a* . . . 31*c* and/or one or more speakers 33*a* . . . 33*c*. In another embodiment, the modem 80 and/or a wireless network adapter 82 is an internal component rather than an external component.

With reference to FIG. 12C, the circuit includes an input-output processor 74 which is in communication with the central processor 10. In another embodiment, the input-output processor is in communication with a modem 80 and/or a wireless network adapter 82 which in turn is connected to a network 72. In still another embodiment, the device 100 includes auxiliary processor(s) 56*a*, 56*b*, and 56*c* in communication with the central processor 10. In yet others embodiments, the circuit may include a series of displays 31*a* . . . 31*zz*, a series speakers 33*a* . . . 33*zz*, multiple input devices 40, and/or multiple output devices 70.

Figure 13A:
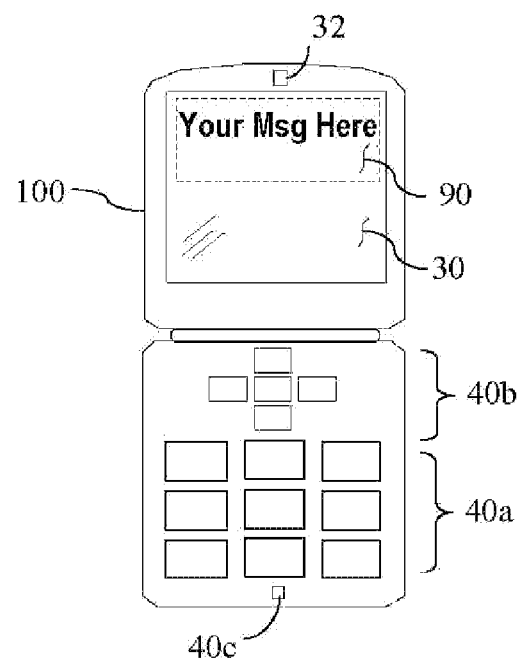
FIGS. 13A through 13D are perspective drawings of alternative mobile devices.
Figure 13B:
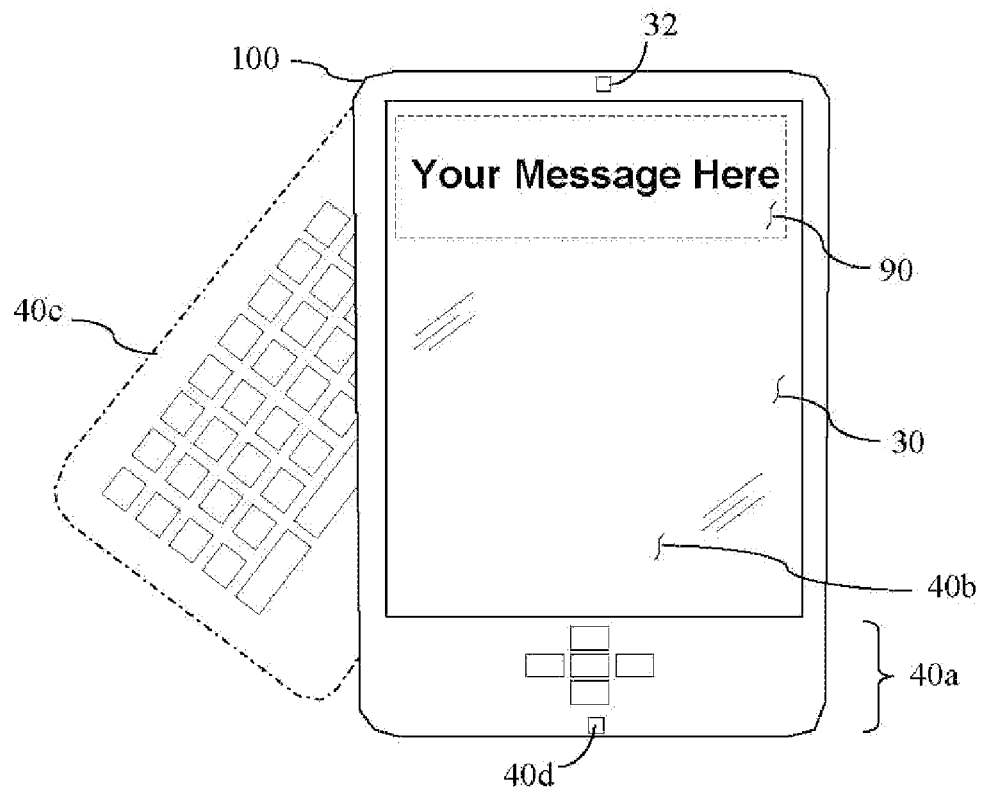

FIGS. 13A through 13D are perspective drawings of alternative mobile devices 100 having a display 30, a speaker 32, at least one input device 40, and at least one message display area 500. In one embodiment, the display 30 may be a flat panel display and the input device(s) 40 is may be one of several types including a number/letter keypad or navigation/execution keypad of the type manufactured by Samsung Electronics, or a touchpad of the type manufactured by Toshiba, or a touchscreen of the type made by Sony Electronics. In FIGS. 13A and 13B, the message display area 500 is shown at or near the top of the display 30 but may be located elsewhere on the display 30 or may be enlarged to encompass the entire display 30 or shrunk to a smaller size. Similarly, in FIGS. 13C and 13D, the message display area 500 is shown at or near the center of the display 30 but may be located elsewhere on the display 30 or may be enlarged to encompass the entire display 30 or shrunk to a smaller size.

Figure 13C:
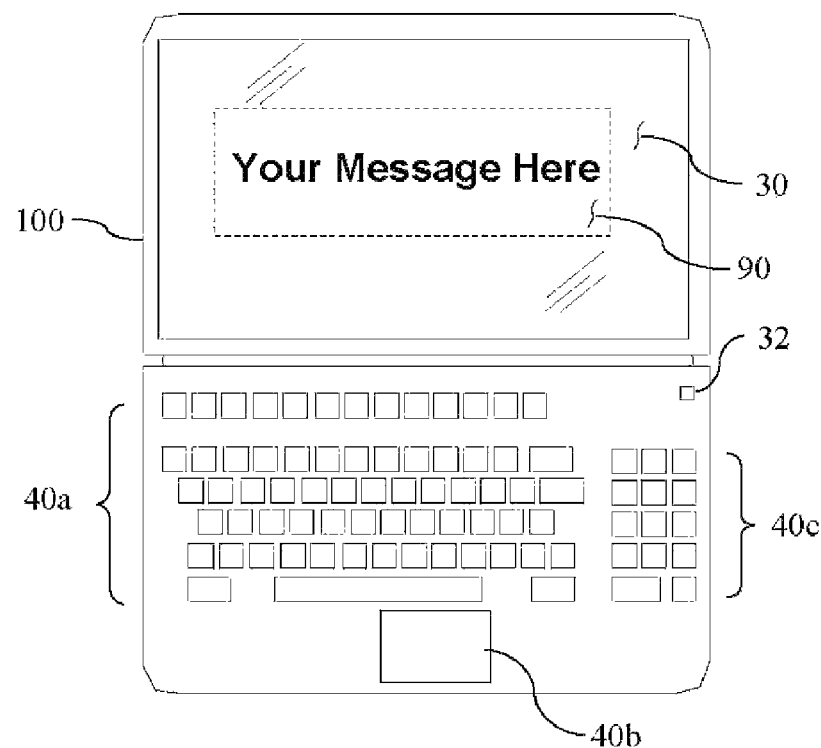
Figure 13D:
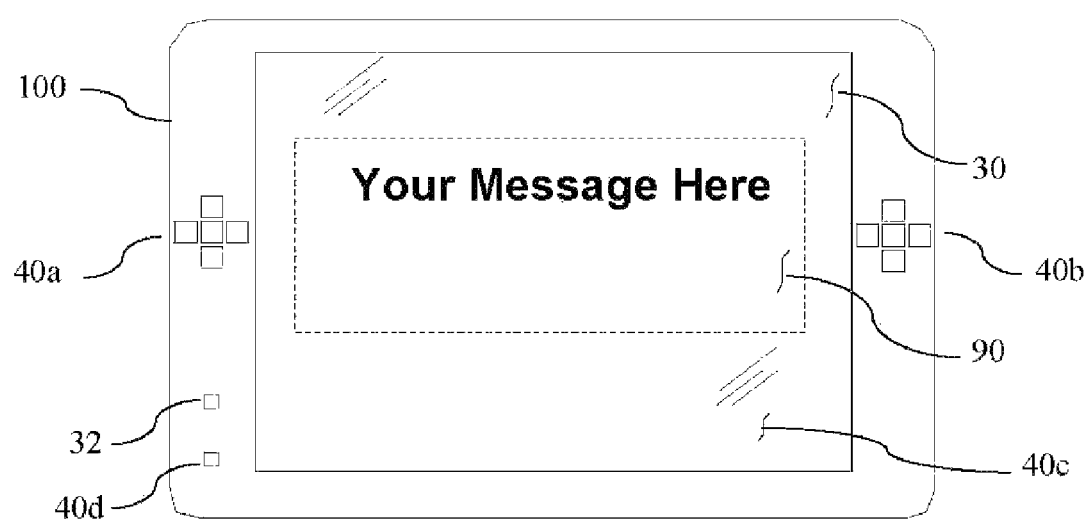

In FIG. 13A, the device 100 has three input devices 40*a*, 40*b* and 40*c* corresponding to a number/letter keypad, a navigation/execution keypad, and a microphone, respectively. In FIG. 13B, the device has four input devices 40*a*, 40*b*, 40*c* and 40*c*1 corresponding to a navigation/execution keypad, a touchscreen, a number/character keypad, and a microphone, respectively. In FIG. 13C, the device has three input devices 40*a*, 40*b*, and 40*c* corresponding to a character keypad, a touchpad, and a number keypad, respectively. In FIG. 13D, the device has four input devices 40*a*, 40*b*, 40*c* and 40*c*1 corresponding to a first navigation/execution keypad at the left, a second navigation/execution keypad at the right, a touchscreen, and a microphone, respectively.

Figure 13E:
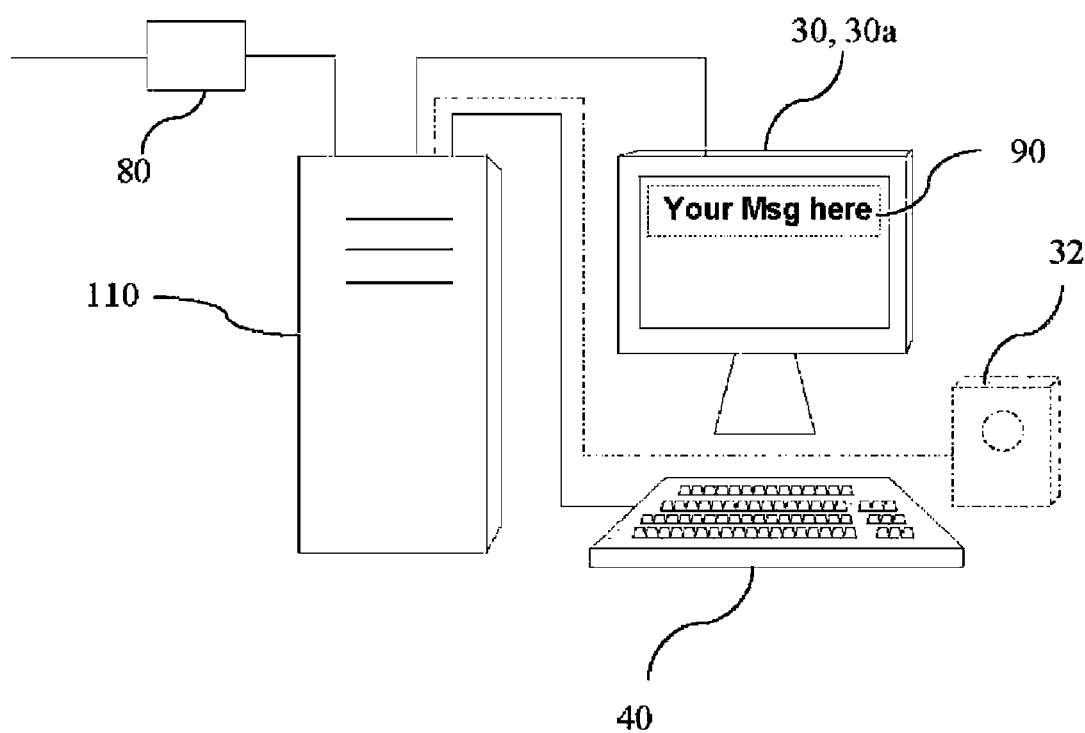
FIG. 13E is a perspective drawing of a stationary electronic device.
Figure 14A:
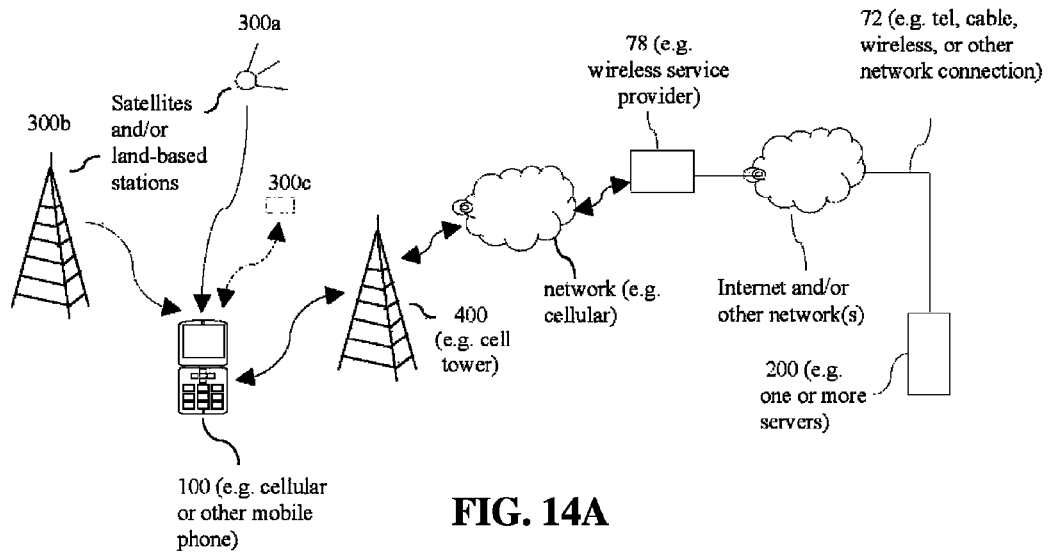
FIGS. 14A, 14B and 14C are schematic drawings of alternative networks for mobile devices.
Figure 14B:
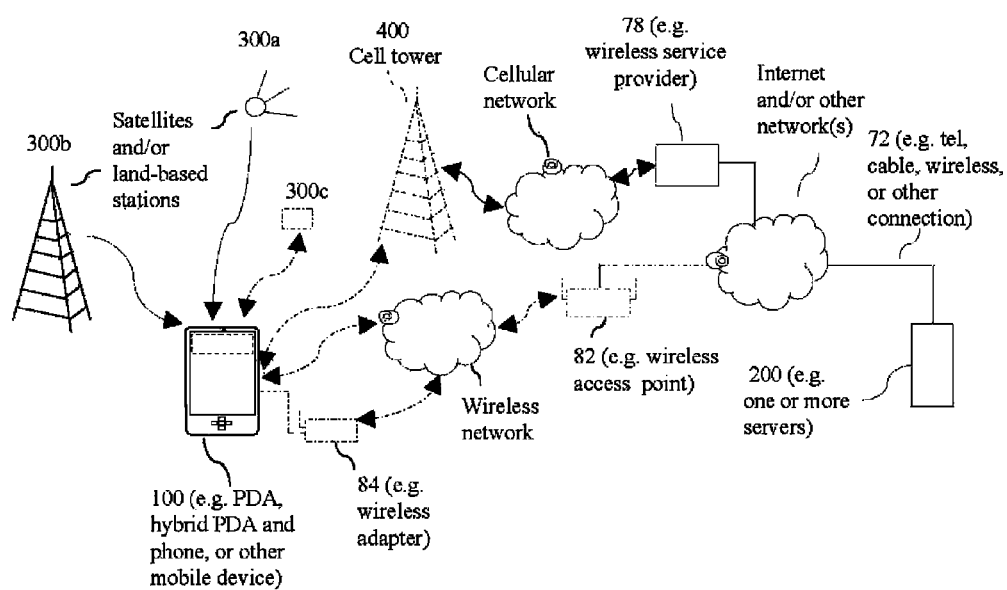
Figure 14C:
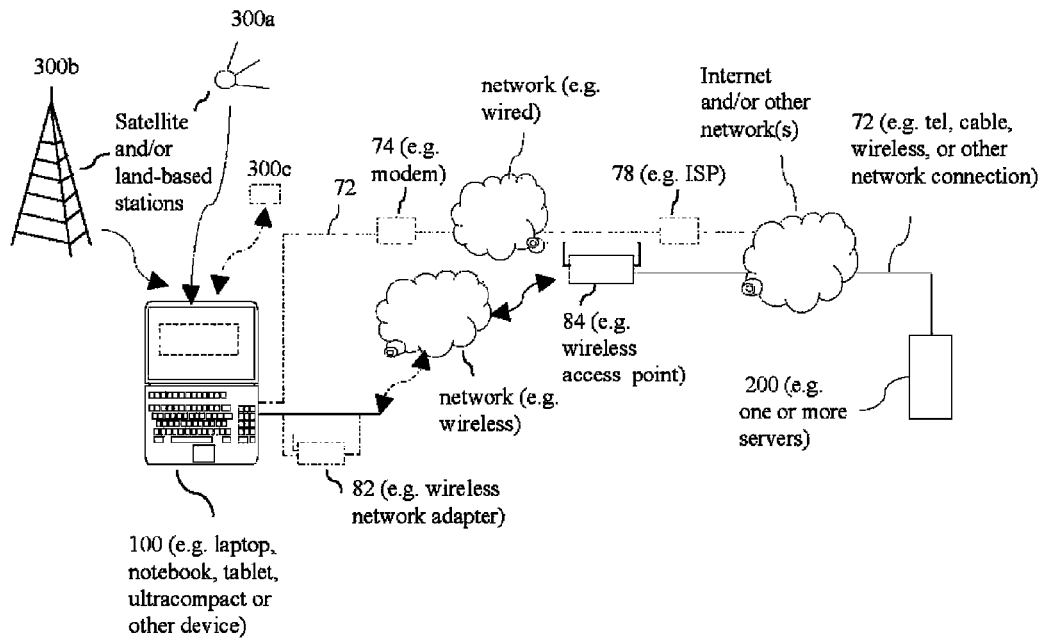
Figure 14D:
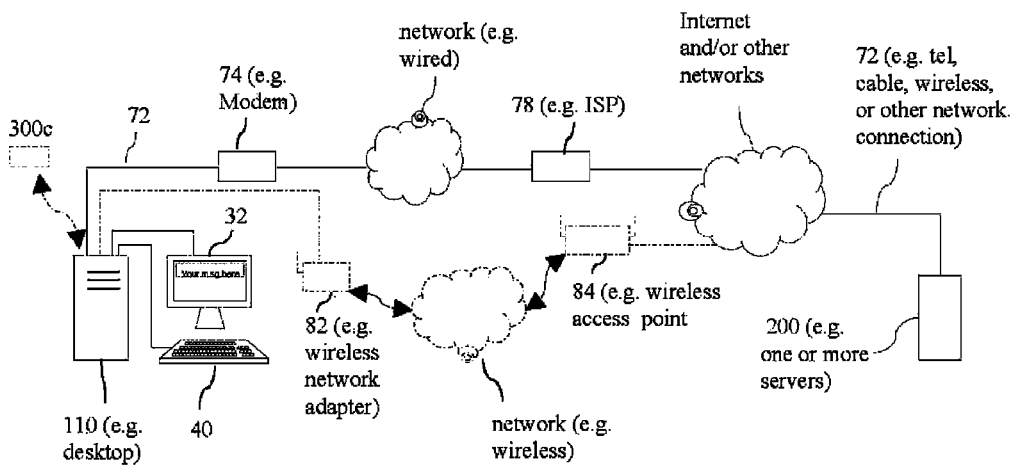
FIGS. 14D and 14E are schematic drawings of alternative networks for other electronic devices.
Figure 14E:
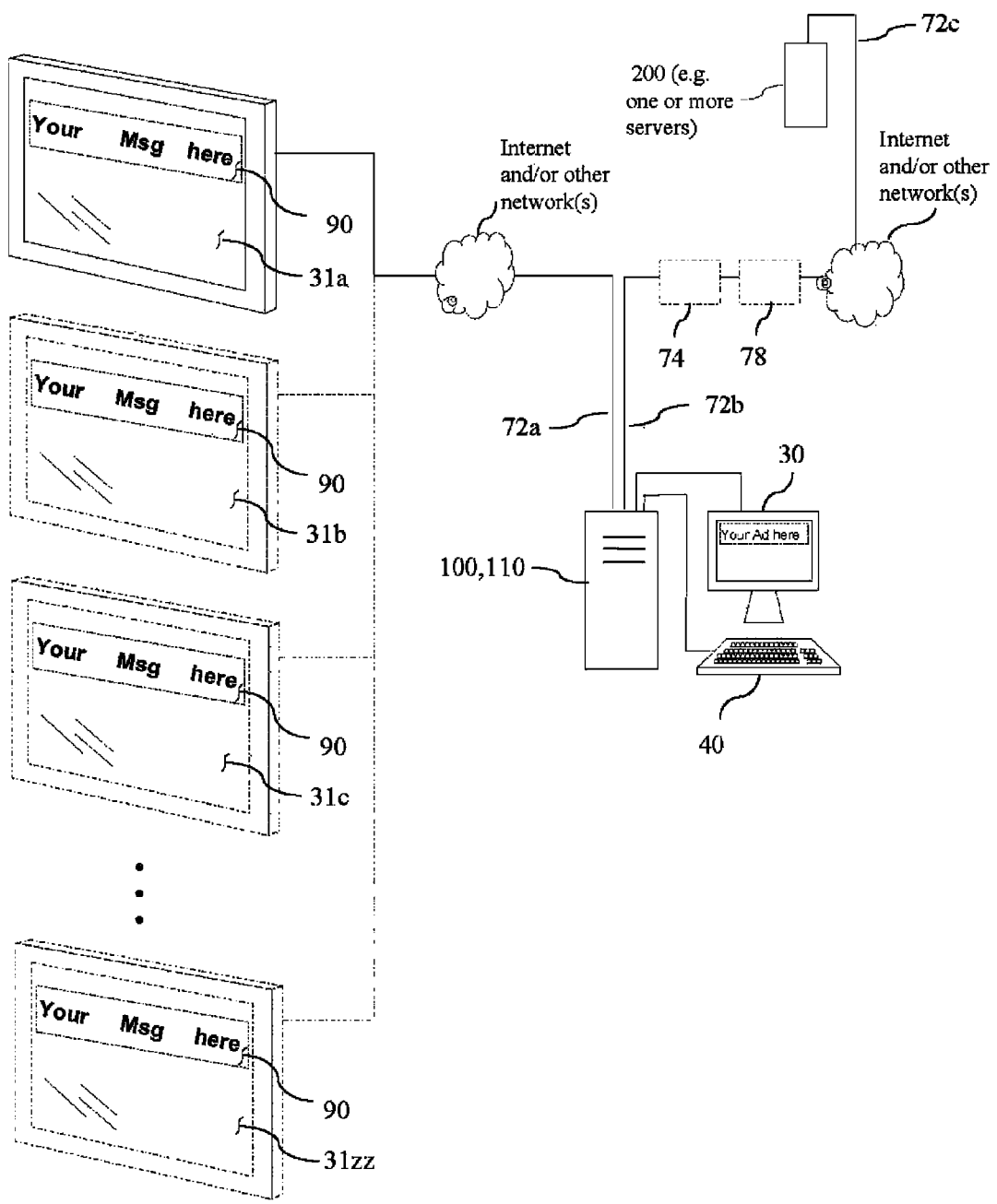

FIG. 13E is a perspective drawing of a stationary electronic device having a display 30, a speaker 32, at least one input device 40, and at least one message display area 500. In FIG. 13E, the message display area 500 is shown at or near the top of the display 30 but may be located elsewhere on the display 30 or may be enlarged to encompass the entire display 30 or shrunk to a smaller size. In FIG. 13D, the device has one input device 40 corresponding a keyboard.

The circuit and is powered by either an internal power source 15 or by an external source 62 of direct current (DC) power or alternating current (AC) power. Where the source is internal, the power source 15 may be including but not limited to a battery, a fuel cell, photovoltaic cell, and so on. Where the source is AC power, a transformer 60 is in communication with the source 62. The transformer may be a board-mounted transformer of the magnetic type manufactured by Hammond Manufacturing of Cheektowaga, N.Y. or a stand-alone power adapter of the type manufactured by Motorola Corporation of Schaumburg, Ill.

In one embodiment the storage medium(s) 20a . . . 20c1 may be a hard drive of the type manufactured by Quantum Corp. of Milpitas, Calif., and in another embodiment, the storage medium may be a flash memory device of the type manufactured by Sandisk. Alternatively, the central processor receives instructions and/or data from the storage medium 20 and/or a second storage medium 22. The second storage medium 22 may be a DVD, CDROM, memory stick, CF card, SD card, jump drive, programmable read only memory (PROM), electronically-alterable programmable memory (EPROM), or the like. In another embodiment, the second storage medium 22 is an integrated circuit housed within a game box. In still another embodiment, the second storage medium is a CDROM which is removeably connected to the circuit.

With reference to FIGS. 14A through 14E, a computer server is depicted by numeral 200. The computer server 200 may include any computer including a file server, a web server, and so on. Satellite-based positioning station(s) is/are depicted by numeral 300a, land-based positioning station(s) are depicted by numeral 300b, and source(s) using narrow cast or near field communications are depicted by numeral 300c. The positioning station(s) 300a may be located in geo-stationary orbit, the positioning station(s) 300b may be located in any fixed position on a temporary or permanent basis, and source(s) 300c may be located anyplace or located on anything, whether mobile or non-mobile, on a temporary or permanent basis. For example, source(s) 300c may be RFID tags, NFC chips, or the like.

Some examples to illustrate the methods and systems include the following non-exhaustive list of potential applications in Table 6 below:

TABLE 6

Potential Applications

| Potential Application | Media Type | | | | Interactivity | |
|---|---|---|---|---|---|---|
| | Music | Video | Image | Text | Yes | No |
| Mobile phone as MP3 player | X | | X | | | X |
| Mobile phone as Podcast player | X | X | | | | X |
| Mobile phone as portable TV | X | X | | | X | |
| Mobile phone as advertising platform | X | X | X | X | X | |
| Mobile phone as portable slide viewer | | | X | X | X | |
| Mobile phone as video phone | X | X | | | X | |
| Mobile phone as e-book reader | | | X | X | | X |
| Mobile phone as collaboration tool or as portable white board device | X | X | X | X | X | |
| Mobile phone as portable RSS viewer | X | X | X | X | X | |
| Mobile phone as voting machine or as polling/surveying device | | X | X | X | X | |
| Others . . . | X | X | X | X | X | |

The invention may be practiced on any computer or electronic device capable any manner or form of visual display. All types of computers, computer systems, and computer networks having the capability of a visual display can generally be programmed to operate computer games and interactive programs. Even those without capability of visual display can be programmed to operate a variety of computer games or interactive programs. In addition, many electronic devices can be programmed to operate a computer game or interactive program.

Electronic devices may include any type of computer and computer system such as personal computers, laptop computers, notebook computers, handheld computers, arcade game machines, handheld games, video game systems, video game consoles, video game boxes, personal digital assistants, mobile computing devices, cable boxes, telephones, telecomputing devices, and telecommunication devices. The processes, subprocesses, and algorithms may be processed on a single processor, an array of processors, separated into two portions corresponding to server side or device side, or split in any number of ways. The processor(s) may comprise one or more processors such as a single integrated circuit or multiple integrated circuits having different functions i.e. central processing unit (CPU), input-output (I/O) processing, video processing, audio processing, transmission, reception, and so on. The display(s) may be any type of analog or digital CRT display including monochrome or color monitor, TV, DTV, HDTV, and so on, and any combination of these such as array of CRTs; any flat panel display including but not limited to LCD, TFT, plasma, and so on, or any combination of these such as an array of LCDs; or a analog or digital projection system such as front projection or rear projection of the types manufactured by Sony Electronics of San Diego, Calif., and Da-Lite of Warsaw, Ind., or such as LCD or DLP of the type manufactured by InFocus of Wilsonville, Oreg., and so on.

The methods and systems of the present invention include processes, subprocesses, and modules which may be used separately, and also in conjunction with one another. Modules may comprise source that is interpreted or the source code may be compiled into executable code. The method and systems may use the results created by any process, subprocess and/or module of this invention for any purpose including but not limited to creating, adapting, or mobilizing web content for viewing on mobile devices.

The methods and systems of the invention also include processes and subprocesses, which may be used separately, and also in conjunction with one another. These may be run independently, in series, in parallel or in any combination. The methods and systems may use the results created by any process and/or subprocess of this invention for any purpose including distributing of targeted message(s), or advertising, marketing, or other promotion.

From the foregoing it will be appreciated that although specific embodiments of the technology have been described herein for purposes of illustration, various modifications may be made without deviating from the spirit and scope of the invention. For example, the user may lease products or services rather than purchase them outright. Also, the user may provide personal information as consideration in addition to or in lieu of payment for products and services. A message or information may be presented in ways other than visual display. For example, a message or information may be output in an audio form. Further, the invention can be used with mobile phones, desktop or personal computers, computer terminals, TVs and monitors, video game machines, video game boxes, web TV, cable TV, CCTV, video consoles, laptop computers, notebook computers, handheld computers, personal digital assistants, telephones, cell phones, pagers, and so on. Accordingly, the invention should be broadly construed and should not be limited.

What is claimed is:

1. A computer-implemented method of retrieving and playing digital media comprising:
a user of an electronic device in communication with a server via one or more networks wherein the electronic device has at least one browser and at least one media player wherein the browser and the media player may reside in a single software application or in separate applications;
upon the user initiating a command via the electronic device, the server sends the browser a page having at least one image or descriptor corresponding to the media file;
upon the user selecting the image or descriptor corresponding to the media file, the browser sends a request to the server for a URL wherein the request identifies the browser and identifies a string that is associated with the electronic device;
if the electronic device is a mobile phone or other electronic device in wireless communication with a network of a carrier, the request identifies an IP address that is associated with the carrier;
upon the browser server receiving the request from the browser, a MIME code and a codec are selected by the server based on 1) the browser and 2) the string and also 3) the IP address if the electronic device is a mobile phone or other electronic device in wireless communication with a network of the;
the media file is encoded using the codec resulting in an encoded wrapper file;
the server sends the MIME code and the encoded wrapper file to the browser; and upon the browser receiving the encoded wrapper file, the media file player plays the encoded wrapper file wherein the media player may download or stream the encoded wrapper file.

2. The method of claim 1 wherein the media file is a video file.

3. The method of claim 1 wherein the electronic device is a computer game controller.

4. A computer-implemented method of mobile search comprising:
a user of an electronic device in communication with a server via one or more wherein the electronic device has at least one browser and at least one media player wherein the browser and the media player may be within a single software application or separate applications;
upon the user selecting at least one keyword and initiating a command, retrieving an index of a plurality of media files;
parsing the index of the plurality of the media files;
displaying a plurality of images or descriptors corresponding to the media files;
upon the user selecting at least one of the images or descriptors, the browser sends a request for a URL wherein the request identifies the browser and identifies a string that is associated with the electronic device;
if the electronic device is a mobile phone or other electronic device in wireless communication with a network of a carrier, identifies an IP address that is associated with the carrier,
upon the server receiving the request from the browser, a MIME code and codec are determined based on 1) the browser and 2) the string and also 3) the IP address if the electronic device is a mobile phone or other electronic device in wireless communication with a network of a carrier;
the media file is retrieved and encoded using the codec resulting in an encoded wrapper file;
the server sends the MIME code and the encoded wrapper file to the browser;
upon the browser receiving the encoded wrapper file, the media player plays the encoded wrapper file wherein the media player may download or stream the encoded wrapper file.

5. The method of claim 4 wherein the method has the additional step of uploading the encoded file to a an online media center or saving the encoded file to a media library.

6. The method of claim 4 wherein the method has an additional step of sending the encoded file to an electronic device of another person other than the user.

7. The method of claim 4 wherein the method includes the additional step of concatenating an advertisement to the media file prior to encoding the media file and sending the encoded file to the browser.

8. The method of claim 7 wherein the method includes the additional step of concatenating an advertisement to the media file prior to encoding the media file and sending the encoded wrapper file to the browser.

9. The method of claim 7 wherein the method has the additional step of uploading the encoded wrapper file to a an online media center or saving the encoded wrapper file to a media library.

10. The method of claim 1 wherein the method has an additional step of sending the encoded wrapper file to an electronic device of another person other than the user.

* * * * *

UNITED STATES PATENT AND TRADEMARK OFFICE
CERTIFICATE OF CORRECTION

PATENT NO. : 8,375,019 B2
APPLICATION NO. : 13/288039
DATED : February 12, 2013
INVENTOR(S) : Robert Salinas and Iain Glendinning It is certified that error appears in the above-identified patent and that said Letters Patent is hereby corrected as shown below:

In the Claims:

At column 37, line 16, in Claim 1, delete "the media" and insert --a media--;

At column 37, line 27, in Claim 1, delete "browser server" and insert --server--;

At column 37, line 32, in Claim 1, delete "a network of the" and insert --the network of the carrier--;

At column 37, line 37, in Claim 1, delete "media file player" and insert --media player--;

At column 38, lines 19-20, in Claim 4, delete "a network of a carrier" and insert --the network of the carrier--;

At column 38, line 30, in Claim 5, delete "a an" and insert --an--;

At column 38, line 39, in Claim 8, delete "The method of Claim 7" and insert --The method of Claim 1--;

At column 38, line 43, in Claim 9, delete "The method of Claim 7" and insert --The method of Claim 1--;

At column 38, line 44, in Claim 9, delete "a an" and insert --an--.

Signed and Sealed this
Sixteenth Day of July, 2013

Teresa Stanek Rea
*Acting Director of the United States Patent and Trademark Office*